(12) United States Patent
Idem et al.

(10) Patent No.: US 7,824,656 B2
(45) Date of Patent: Nov. 2, 2010

(54) CATALYSTS FOR HYDROGEN PRODUCTION

(75) Inventors: Raphael Oyom Idem, Regina (CA);
Prashant Kumar, Regina (CA);
Yanping Sun, Waratah (AU)

(73) Assignee: University of Regina, Regina, Saskatchewan (CA)

( * ) Notice: Subject to any disclaimer, the term of this patent is extended or adjusted under 35 U.S.C. 154(b) by 1205 days.

(21) Appl. No.: 11/375,088

(22) Filed: Mar. 14, 2006

(65) Prior Publication Data

US 2006/0216227 A1 Sep. 28, 2006

Related U.S. Application Data

(60) Provisional application No. 60/664,641, filed on Mar. 24, 2005.

(51) Int. Cl.
| | |
|---|---|
| C01B 3/16 | (2006.01) |
| C01B 3/26 | (2006.01) |
| B01J 23/72 | (2006.01) |
| B01J 23/755 | (2006.01) |
| B01J 23/76 | (2006.01) |
| B01J 23/78 | (2006.01) |
| B01J 23/83 | (2006.01) |

(52) U.S. Cl. .................. 423/651; 423/655; 423/656; 502/60; 502/61; 502/73; 502/74; 502/244; 502/259; 502/302; 502/303; 502/304; 502/305; 502/306; 502/308; 502/309; 502/312; 502/313; 502/315; 502/318; 502/321; 502/322; 502/323; 502/324; 502/326; 502/327; 502/328; 502/331; 502/332; 502/335; 502/337; 502/340; 502/341; 502/345; 502/346

(58) Field of Classification Search .................. 502/337, 502/345, 304, 60, 73, 74, 244, 259, 302, 502/303, 305, 306, 308, 309, 312, 313, 315, 502/318, 321, 332, 335, 340, 341, 346; 423/655, 423/656, 651
See application file for complete search history.

(56) References Cited

U.S. PATENT DOCUMENTS 4,151,107 A * 4/1979 Singleton .................. 423/437.2

(Continued)

FOREIGN PATENT DOCUMENTS

WO WO 02/066380 8/2002

(Continued)

OTHER PUBLICATIONS

Avgouropoulos et al., "CuO-CeO$_2$ Mixed Oxide Catalysts for the Selective Oxidation of Carbon Monoxide in Excess Hydrogen," *Catalysis Letters* 73:33-40 (2001).

(Continued)

*Primary Examiner*—Wayne Langel
(74) *Attorney, Agent, or Firm*—Sean J. Edman; Clark & Elbing LLP

(57) ABSTRACT

The present invention relates to catalysts for the production of hydrogen using the water gas shift reaction and the carbon dioxide reforming of hydrocarbon-containing fuels. The catalysts nickel and/or copper on a ceria/zirconia support, where the support is prepared using a surfactant templating method. The invention also includes processes for producing hydrogen, reactors and hydrogen production systems utilizing these catalysts.

79 Claims, 25 Drawing Sheets

U.S. PATENT DOCUMENTS

| | | | | |
|---|---|---|---|---|
| 4,923,842 | A | * | 5/1990 | Summers .................... 502/261 |
| 6,090,312 | A | | 7/2000 | Ziaka et al. |
| 6,162,350 | A | * | 12/2000 | Soled et al. ................. 208/113 |
| 6,245,709 | B1 | * | 6/2001 | Clark et al. ................. 502/326 |
| 6,375,924 | B1 | * | 4/2002 | Towler et al. .............. 423/656 |
| 6,458,741 | B1 | * | 10/2002 | Roark et al. ................ 502/303 |
| 6,531,425 | B2 | * | 3/2003 | Golden ....................... 502/302 |
| 6,585,944 | B1 | * | 7/2003 | Nunan et al. ............ 423/239.1 |
| 7,238,333 | B2 | * | 7/2007 | Faur-Ghenciu et al. ...... 423/247 |
| 7,265,076 | B2 | * | 9/2007 | Taguchi et al. ............. 502/326 |
| 7,329,359 | B2 | * | 2/2008 | Roark ........................ 210/763 |
| 7,485,599 | B2 | * | 2/2009 | Muhammed et al. ........ 502/304 |
| 2002/0114762 | A1 | | 8/2002 | Wang et al. |
| 2002/0131925 | A1 | * | 9/2002 | Shore et al. ................. 423/247 |
| 2002/0141938 | A1 | | 10/2002 | Ruettinger et al. |
| 2002/0147103 | A1 | | 10/2002 | Ruettinger et al. |
| 2003/0026747 | A1 | | 2/2003 | Zhu et al. |
| 2003/0064887 | A1 | | 4/2003 | Korotkikh et al. |
| 2003/0186805 | A1 | * | 10/2003 | Vanderspurt et al. ........ 502/304 |
| 2003/0230029 | A1 | | 12/2003 | Ruettinger et al. |
| 2004/0126298 | A1 | * | 7/2004 | Stark et al. .................. 423/263 |
| 2004/0187384 | A1 | | 9/2004 | Dardas et al. |
| 2006/0128565 | A1 | * | 6/2006 | Flytzani-Stephanopoulos et al. ............................................................... 502/439 |
| 2006/0216227 | A1 | * | 9/2006 | Idem et al. .................. 423/651 |
| 2006/0229197 | A1 | * | 10/2006 | Stark et al. .................. 502/304 |
| 2007/0093382 | A1 | * | 4/2007 | Vanderspurt et al. ........ 502/304 |

FOREIGN PATENT DOCUMENTS

| | | |
|---|---|---|
| WO | WO 03/082461 | 10/2003 |
| WO | WO 03/082740 | 10/2003 |
| WO | WO 2004/087304 | 10/2004 |

OTHER PUBLICATIONS

Avgouropoulos et al., "Selective CO Oxidation Over CuO-CeO$_2$ Catalysts Prepared via the Urea-Nitrate Combustion Method," *Applied Catalysis A*: General 244:155-167 (2003).

Bunluesin et al., "Studies of the Water-Gas-Shift Reaction on Ceria-Supported Pt, Pd, and Rh: Implications for Oxygen-Storage Properties," *Applied Catalysis B. Environmental* 15:107-114 (1998).

Dias et al., "Influence of Calcium Content in Ni/CaO/γ-Al$_2$O$_3$ Catalysts for CO$_2$-Reforming of Methane," *Catalysis Today* 85:59-68 (2003).

Frusteri et al., "Potassium-Enhanced Stability of Ni/MgO Catalysts in the Dry-Reforming of Methane," *Catalysis Communications* 2:49-56 (2001).

Hao et al., "Zr-Laponite Pillared Clay-Based Nickel Catalysts for Methane Reforming with Carbon Dioxide," *Applied Catalysis A: General* 242:275-286 (2003).

Hilaire et al., "A Comparative Study of Water-Gas-Shift Reaction Over Ceria Supported Metallic Catalysts," *Applied Catalysis A: General* 215:271-278 (2001).

Hori et al., "Studies of the Oxygen Release Reaction in the Platinum-Ceria-Zirconia System," Catalysis Today 50:299-308 (1999).

Jacobs et al., "Water-Gas Shift: Comparative Screening of Metal Promoters for Metal/Ceria Systems and Role of the Metal," Applied Catalysis A: General 258:203-214 (2004).

Kapoor et al., "Methanol Decomposition Over Palladium Supported Mesoporous CeO$_2$-ZrO$_2$ Mixed Oxides," *Microporous and Mesoporious Materials* 44-45:565-572 (2001).

Li et al., "Low-Temperature Water-Gas Shift Reaction over Cu-and Ni-Loaded Cerium Oxide Catalysts," *Applied Catalysis B: Environmental* 27:179-191 (2000).

Martinez et al., "CO2 Reforming of Methane Over Coprecipitated Ni-Al Catalysts Modified with Lanthanum," *Applied Catalysis A: General* 274:139-149 (2004).

Nagaoka et al., "Carbon Deposition During Carbon Dioxide Reforming of Methane-Comparison Between Pt/Al2O3 and Pt/ZrO$_2$," *Journal of Catalysis* 197:34-42 (2001).

Newsome, "The Water-Gas Shift Reaction," *Catal. Rev.—Sci. Eng.* 21:275-318 (1980).

Noronha et al., "Catalytic Performance of Pt/ZrO2 and Pt/Ce-ZrO2 Catalysts on CO2 Reforming of CH4 Coupled with Steam Reforming or Under High Pressure," *Catalysis Letters* 90:13-21 (2003).

Osaki, "Effect of Reduction Temperature on the CO2-Reforming of Methane Over TiO2-Supported Ni Catalyst," J. Chem. Soc. Faraday Trans., 93:643-647 (1997).

Osaki et al., "Role of Potassium in Carbon-Free CO2 Reforming of Methane on K-Promoted Ni/Al$_2$O$_3$ Catalysts," Journal of Catalysis, *Journal of Catalysis* 204:89-97 (2001).

Potdar et al., "Carbon Dioxide Reforming of Methane Over Co-Precipitated Ni-Ce-ZrO$_2$ Catalysts," *Catalysis Letters* 84:95-100 (2002).

Qi et al., "Activity and Stability of Cu-CeO2 Catalysts in High-Temperature Water-Gas Shift for Fuel-Cell Applications," *Ind. Eng. Chem. Res.* 43:3055-3062 (2004).

Ratnasamy et al., "Influence of the Support on the Preferential Oxidation of CO in Hydrogen-Rich Steam Reformates Over the CuO-CeO$_2$-ZrO$_2$ System," Journal of Catalysis 221:455-465 (2004).

Rosso et al., "Development of A Zeolites-Supported Noble-Metal Catalysts for CO Preferential Oxidation: H$_2$ Gas Purification for Fuel Cell," Applied Catalysis B: Environmental 48:195-203 (2004).

Roh et al., "A Highly Active and Stable Catalyst for Carbon Dioxide Reforming of Methane: Ni/Ce-ZrO2/O-Al$_2$O$_3$," Catalysis Letters 81:147-151 (2002).

Roh et al., Carbon Dioxide Reforming of methane over Co-Precipitated Ni-CeO$_2$, Ni-ZrO$_2$ and Ni-Ce-ZrO$_2$ Catalysts,' Catalysis Today 93:39-44 (2004).

Seok et al., "Mn-Promoted Ni/Al2O3 Catalysts for Stable Carbon Dioxide Reforming of Methane," *Journal of Catalysis* 209:6-15 (2002).

Swartz et al., "Fuel Processing Catalysts Based on Nanoscale Ceria," Fuel Cells Bulletin No. 30 pp. 7-10 (2001).

Tanaka et al., "Water Gas Shift Reaction for the Reformed Fuels Over Cu/MnO Catalysts Prepared Via Spinel-Type Oxide," Journal of Catalysis 215:271-278 (2003).

Terribile et al., "The Preparation of High Surface Area CeO2-ZrO2 Mixed Oxides by a Surfactant-Assisted Approach," Catalysis Today 43:79-88 (1998).

Tomishige et al., "Development of Ultra—Stable Ni Catalysts for CO2 Reforming of Methane," Catalysis Today 45:35-39 (1998).

Usachev et al., "Heterogeneity of Cu-Ce-Zr-O Systems and their Catalytic Activity in CO Oxidation in H$_2$ rich Gases," Prepr. Pap. Am. Chem. Soc., div. Pet. Chem 49:358-361 (2004).

Wang et al., "Study of Sm$_2$O$_3$-Dopped CeO2/Al2O3-Supported Copper Catalyst for CO Oxidation," *Applied Catalysis A: General* 203:191-199 (2000).

Wang et al., "A Novel Highly Active Catalyst System for CO2 Reforming Of Methane and Higher Hydrocarbons," *Catalysis Communications* 4:147-151 (2003).

Wang et al., "Catalytic Activities and Coking Characteristics of Oxides-Supported Ni Catalysts for CH4 Reforming with Carbon Dioxide," Energy & Fuels 12:248-256 (1998).

Wang et al., "Role of CeO2 in Ni/CeO$_2$-Al$_2$O$_3$ Catalysts for Carbon Dioxide Reforming of Methane," *Applied Catalysis B: Environmental* 19:267-277 (1998).

Wang et al., "Deactiviation Mechanisms for Pd/Ceria During the Water-Gas-Shfit Reaction," Journal of Catalysis 212:225-230 (2002).

Wei et al., "Highly Active and Stable Ni/ZrO$_2$ Catalyst for Syngas Production by CO2 Reforming of Methane," Applied Catalysis A: General 196:L167-L172 (2000).

Xu et al., "Ultrafine NiO-La$_2$O$_3$0Al$_2$O$_3$ Aerogel: A Promising Catalyst for CH$_4$/CO$_2$ Reforming," *Applied Catalysis A: General* 213:65-71(2001).

Zalc et al., "Are Noble Metal-Based Water-Gas Shift Catalysts Practical for Automotive Fuel Processing?" *Journal of Catalysis* 206:169-171 (2002).

Zhu et al., "Catalytic Partial Oxidation of Methane to Synthesis Gas Over Ni-CeO2," *Applied Catalysis A: General* 208:403-417 (2001).

Chinese Office Action and translation for Chinese Patent Application No. 200680018018.8, dated Apr. 14, 2010.

Observation and amended claims for Chinese Patent Application No. 200680018018.8, dated Mar. 5, 2010.

Office Action for Canadian Patent Application No. 2,539,666, dated Mar. 11, 2010.

Taguchi et al., "Ordered mesoporous materials in catalysis," *Microporous and Mesoporous Materials* 77:1-45 (2005).

Hwang et al., "New Nickel Catalysts Supported on Highly Porous Alumina Intercalated Laponite for Methane Reforming with $CO_2$," *Catal. Today* 68:183-190 (2001).

Office Action for Chinese Patent Application No. 200680018018.8, issued Aug. 21, 2009.

English Language Translation of Office Action for Chinese Patent Application No. 200680018018.8, issued Aug. 21, 2009.

\* cited by examiner

PKC17-C B [0031]

Top: PKC17_Cu5_Ni3
Middle: PKC17_Ni5_Cu3
Bottom: PKC17

CATALYSTS FOR HYDROGEN PRODUCTION

This application claims the benefit under 35 USC §119(e) from U.S. Provisional patent application Ser. No. 60/664,641, filed Mar. 24, 2005.

FIELD OF THE INVENTION

The present invention relates to catalysts for hydrogen production, in particular catalysts for use in the water gas shift reaction and catalysts for use in the carbon dioxide ($CO_2$) reforming of natural gas. The invention also includes reactors and hydrogen production systems comprising these catalysts.

BACKGROUND OF THE INVENTION

Due to their high energy-efficiency and very low pollutant emissions, fuel cells are currently undergoing rapid development for both stationary and transportation applications. In the transportation sector, fuel cells could replace the internal combustion (IC) engines in cars, trucks, buses, etc., while meeting the most stringent emission regulations. The low temperature proton exchange membrane fuel cell (PEMFC) is under an advanced stage of development for portable devices, residential (heaters) and transportation applications.

Because the hydrogen used in fuel cells to produce electricity is not available in nature, a fuel processor is required to convert conventional carbon-bearing fuels into hydrogen. An environmentally sustainable and innovative process for $H_2$ production which satisfies fuel cell requirements is a procedure known as carbon dioxide reforming of natural gas which is described by the following equation:

$$CH_4 + CO_2 \leftrightarrows 2CO + 2H_2 \quad \Delta H_{298} = 247.3 \text{ kJ/mol} \tag{1}$$

This reaction is highly endothermic and is equally favored by a low pressure but requires a higher temperature. The $CO_2$ reforming (CDR) of natural gas is a gas phase process which can produce hydrogen cost-effectively and efficiently at the point of application. That is why it can meet the requirements of a hydrogen fuel cell. In addition, the CDR process can be combined with the water-gas shift reaction (see below) to produce additional $H_2$ and, in a membrane reactor for $CO_2$ capture to produce ultra pure hydrogen for fuel cell application. To date, there has been no established industrial technology for $CO_2$ reforming of natural gas due primarily to the problem of catalyst deactivation. Table 1 provides a summary of catalysts known in the art that have been investigated for use in CDR. Most of the catalysts known today are either used at high temperatures or suffer catalyst deactivation when used at reasonable reaction temperatures. Even the noble metal based catalysts require high reaction temperatures to maintain stability. Thus, the use of expensive noble metal catalysts, high reaction temperatures or the occurrence of deactivation at lower temperatures makes the existing catalysts unsuitable for use as commercial catalysts for CDR.

Generally, the reformate gas consists of $H_2$, CO, $CO_2$, $H_2O$ and a small amount of fuel, which in the case of natural gas is $CH_4$. However, it is required that the concentration of carbon monoxide (CO) be reduced to less than 100 ppm from the upstream of a low-temperature fuel cell, such as the PEM fuel cell, not only because it is a critical air pollutant, but also because it poisons the platinum anode catalyst, thus hampering the fuel cell performance.

The water gas shift reaction (WGSR) is an effective method for removing CO from the reformate gas stream by converting it to $CO_2$ and additional $H_2$ by reaction with water (steam) as follows:

$$CO + H_2O \leftrightarrows CO_2 + H_2 \tag{2}$$

It is widely accepted that a major impediment to the application of fuel processing to on-board hydrogen generation, is the lack of highly active and stable WGS catalysts. A list of some of the catalysts known in the art which were developed in particular for use in the WGSR is presented in Table 2. At least for this application, WGSR catalysts should be very active, stable in cyclic operations and in exposure to air and condensed water, and should also be of low cost. Since there are no existing catalysts and processes that meet these specifications, there is an urgent need for new CO clean-up technology and catalysts.

The current state-of-the-art WGS catalyst in chemical plants includes either high temperature shift (HTS) catalysts (350-450° C.) or low temperature shift (LTS) catalysts (160-250° C.). Conventional HTS catalysts (FeO/Cr) are inactive below 300° C., while conventional LTS catalysts (Cu—ZnO) degrade above 250° C. Both catalysts require activation by in-situ pre-reduction steps. These are specifically designed to catalyze reaction (2) and not any variant of this. For example, the shift reaction of CO by steam in presence of either $CO_2$, $H_2$ or $CH_4$ would be entirely different from the shift reaction without these variants and therefore would require a different set of catalysts and fuel processing systems. Accordingly, the presently available catalysts cannot be used in fuel processing systems since they do not meet the specifications. Moreover, they require careful reductive activation and can be irreversibly damaged by air after reduction. A variety of different materials tested for the regular WGSR have been reported in literature. For example, Au supported on $TiO_2$, $Fe_2O_3$ and $ZrO_2$, Pt on $CeO_2$ and $ZrO_2$, Ru on $Fe_2O_3$ and $La_2O_3$ demonstrated high activity for the regular water gas shift reaction. In addition, conventional shift reactors are the largest component of the fuel processor, impacting fuel processor size, weight and start-up time. These reactors have been assessed unsuitable for application in PEM fuel cells, especially for use in transportation. Therefore, advanced water-gas shift catalysts are needed to produce essentially CO-free hydrogen.

There are a number of research activities currently ongoing for the production of a catalyst for use in the WGS reaction in the presence of $CO_2$, $H_2$ and/or $CH_4$ together with CO and $H_2O$ in the feed (i.e. reformate gas streams). However, to date, no concrete catalysts or technology have been developed to solve this problem. Further, as mentioned above, there are at present no suitable catalysts for commercial use in CDR.

SUMMARY OF THE INVENTION

Nickel and/or copper based ceria/zirconia catalysts having a mesoporous support have been prepared for use as stable high temperature catalysts for the water gas shift reaction (WGSR). The catalysts comprise Ni and/or Cu, each in the range of about 1 to about 5 wt % and a first oxide in the range of about 50 to about 70 wt % doped with a second oxide in the range of about 30 to about 50 wt %. The thermally stable mesoporous support was obtained using a surfactant templating method. Further, nickel based ceria/zirconia catalysts having a mesoporous support have been prepared for use as stable low temperature catalysts for carbon dioxide reforming (CDR) of hydrocarbon fuels. These latter catalysts comprise Ni in the range of about 1 to about 20 wt % and a first oxide in the range of about 50 to about 95 wt % doped with a second oxide in the range of about 5 to about 50 wt %. The nickel based ceria/zirconia catalysts may further comprise an alkali metal on the support to improve thermal stability. The alkali metal may be any such metal, including but not limited to potassium, cesium or sodium. In these latter catalysts, the alkali metal may be in the range of about 0 to about 1 wt % of the catalysts. Once again, the thermally stable mesoporous support was obtained using a surfactant templating method.

Accordingly the present invention includes a water gas shift reaction (WGSR) catalyst comprising a catalytically effective amount of nickel and/or copper, or an oxide thereof, dispersed on a support, wherein the support comprises a suitable mixed bi-metal oxide and the support is prepared using a surfactant templating method.

The present invention also includes a WGSR catalyst for the production of hydrogen from an input gas stream comprising $H_2O$ and carbon monoxide comprising:

(a) an oxide support comprising a first oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), and a second oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), wherein the ratio of amount of first oxide to second oxide is in the range of about 50:50 to about 70:30 and the first and second oxides are different; and (b) about 1 to about 10 wt % of one or more metals, or oxides thereof, dispersed on the oxide support, wherein the one or more metals are selected from copper, nickel and mixtures thereof, wherein the support is prepared using a surfactant templating method.

The present invention also includes a process for producing hydrogen, comprising contacting an input gas stream comprising $H_2O$ and carbon monoxide with a WGSR catalyst above 300° C., wherein the WGSR catalyst comprises (a) an oxide support comprising a first oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), and a second oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), wherein the ratio of amount of first oxide to second oxide is in the range of about 50:50 to about 70:30 and the first and second oxides are different; and (b) about 1 to about 10 wt % of one or more metals, or oxides thereof, dispersed on the oxide support, wherein the one or more metals are selected from copper, nickel and mixtures thereof, wherein the support is prepared using a surfactant templating method.

In an embodiment of the present invention, the WGSR catalyst has the formula $Ni_yCu_z[A_xB_{(1-x)}]O_2$, wherein x is in the range of about 0.5 to about 0.7, y and z represent the weight percent of Ni and Cu, respectively, relative to each other on the support and are each, independently, in the range of about 1 to about 5%, and A and B are independently selected from the group consisting of Ce, Si, Th, Mg, Y, La, Zr, Al, Ti, Hf, Nb, Ta, Pr, Nd, Sm, Eu, Gd, Tb, Dy, Ho, Er, Tm, Yb, Lu, Mo, W, Re, Rh, Sb, Bi, Mn, Ga, Sr and Ba, with the proviso that A does not equal B.

In an embodiment of the present invention, the mixed bi-metal oxides were prepared to overcome methanation problems. The production of methane during the water gas shift reaction, also known as "methanation", is a side reaction that consumes hydrogen gas in an exothermic reaction. Thus, for applications where the water gas shift reaction is used to produce hydrogen gas and reduce CO concentration, the methanation reaction is a disadvantage related primarily to precious metal containing water gas shift reaction catalysts. Methanation can reduce the hydrogen yield from the water gas shift reaction by consuming hydrogen to form methane, and increase the temperature of the catalyst thereby lowering the efficiency of hydrogen production. Both Ni and Cu were loaded onto the doped oxide support to combine their individual properties of conversion and selectivity, respectively. Further, the present invention also takes advantage of the fact that Cu and Ni, as non-noble metals, are less expensive than noble metals such as Pt, Rh, Au, Pd and therefore are more cost-effective. Another problem generally associated with noble metal catalyst systems is deactivation.

In a further embodiment of the process of producing hydrogen using the WGSR catalyst of the present invention, the input gas stream further comprises, in addition to carbon monoxide and $H_2O$ other gases such as $CO_2$, $H_2$ and methane. Therefore, the present invention also relates to cleanup of CO that is coming out of a dry-reformer.

In another of its aspects, the present invention includes a carbon dioxide reforming (CDR) catalyst comprising a catalytically effective amount of nickel, or an oxide thereof, dispersed on a support, wherein the support comprises a suitable mixed bi-metal oxide and the support is prepared using a surfactant templating method.

In an embodiment of the present invention, the CDR catalysts further comprise an alkali metal or an oxide thereof dispersed on the support.

Further, the present invention includes a CDR catalyst for the production of hydrogen from an input gas stream comprising a hydrocarbon fuel, said catalyst comprising:

(a) an oxide support comprising a first oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), and a second oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), wherein the ratio of amount of first oxide to second oxide is in the range of about 95:5 to about 50:50 and the first and second oxides are different; and (b) about 1 to about 5 wt % of a nickel, or an oxide thereof, dispersed on the oxide support;

wherein the support is prepared using a surfactant templating method. The CDR catalysts may further comprise about 0.1 to about 1 wt % of an alkali metal, or an oxide thereof dispersed on the oxide support.

The present invention also includes a process for producing hydrogen, comprising contacting an input gas stream comprising a hydrocarbon fuel and carbon dioxide with a CDR catalyst between 550 and 700° C., wherein the CDR catalyst comprises (a) an oxide support comprising a first oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), and a second oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), wherein the ratio of amount of first oxide to second oxide is in the range of about 95:5 to about 50:50 and the first and second oxides are different; and (b) about 1 to about 5 wt % of nickel, or an oxide thereof, dispersed on the oxide support, wherein the support is prepared using a surfactant templating method. The CDR catalysts may further comprise about 0.1 to about 1 wt % of an alkali metal, or an oxide thereof dispersed on the oxide support.

In an embodiment of the present invention, the CDR catalyst has the formula $Ni-M[A_xB_{(1-x)}]O_2$, wherein M is an alkali metal in the amount of 0 to about 1 wt %, and wherein x is in the range of about 0.5 to about 0.9, A and B are independently selected from the group consisting of Ce, Si, Th, Mg, Y, La, Zr, Al, Ti, Hf, Nb, Ta, Pr, Nd, Sm, Eu, Gd, Tb, Dy, Ho, Er, Tm, Yb, Lu, Mo, W, Re, Rh, Sb, Bi, Mn, Ga, Sr and Ba, with the proviso that A does not equal B, M is an alkali metal and the nickel loading is about 5 wt %.

Also within the scope of the present invention is a process for producing hydrogen comprising: contacting a first input gas stream comprising a hydrocarbon fuel and carbon dioxide with a CDR catalyst of the present invention above 550 and 700° C. to produce a first output stream comprising carbon monoxide and hydrogen; and contacting a second input gas stream comprising $H_2O$ and carbon monoxide with a WGSR catalyst of the present invention above 300° C. to produce a second output stream comprising carbon dioxide and hydrogen. In a further embodiment of the present invention, the second output stream is contacted with a carbon monoxide oxidant.

Still further, within the scope of the present invention is a process for producing hydrogen comprising: contacting a first input gas stream comprising a hydrocarbon fuel and carbon dioxide with a CDR catalyst of the present invention above 550 and 700° C. to produce a first output stream comprising carbon monoxide and hydrogen, and subsequently contacting the first output gas stream with a WGSR catalyst of the present invention in the presence of $H_2O$ above 300° C. to produce a second output stream comprising carbon dioxide and hydrogen. In a further embodiment of the present invention, the second output stream is contacted with a carbon monoxide oxidant.

The present invention also includes a method of preparing a WGSR catalyst or a CDR catalyst comprising (a) preparing a mixed bi-metalic oxide support using a surfactant templating method; and (b) dispersing a catalytically effective amount of nickel and/or copper, or an oxide thereof, onto the support.

In an embodiment of the invention, the surfactant templating method further comprises step (c) in which the WGSR catalyst or the CDR catalyst is shaped into a suitable form. More particularly, the form of the WGSR catalyst or the CDR catalyst may be selected from tablet, extrudate, pellet, bead, cylinder, hollow cylinder, powder, washcoat composition deposited on monolith substrate, high mechanical strength particulate and high heat capacity particulate.

In an embodiment of the invention, the surfactant templating method in step (a) above, comprises: combining aqueous solutions of metal oxide precursors, with an aqueous solution of at least one surfactant; stirring the combination for a suitable time; adding a suitable base to adjust the pH of the combined solutions to about 10 to about 13 to produce a slurry comprising precipitated support; allowing the slurry to sit at elevated temperatures for a suitable time; isolating the precipitated support from the slurry; and optionally washing the isolated support to remove residual solvent.

In an embodiment of the invention, the surfactant is an oligomeric surfactant or a tetraalkyl ammonium salt.

The present invention also includes a reactor comprising the inventive catalysts of the present invention. Typically the reactor comprises a reactor inlet, a reaction chamber and a reactor exhaust outlet.

In another aspect, the invention relates to an apparatus for supplying hydrogen to a PEM fuel cell with a hydrocarbon reformer reactor, a water-gas shift reactor and optionally, a selective carbon monoxide oxidation reactor. The hydrocarbon reformer reactor is upstream and in train with the water-gas shift reactor, and the selective carbon monoxide oxidation reactor is downstream and in train with the WGS reactor. In one embodiment of the apparatus, the hydrocarbon reformer reactor contains a CDR catalyst according to the present invention and the WGS reactor contains a WGSR catalyst according to the present invention.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The invention will now be described in relation to the drawings in which.

DETAILED DESCRIPTION OF THE INVENTION

Definitions

Figure 1:
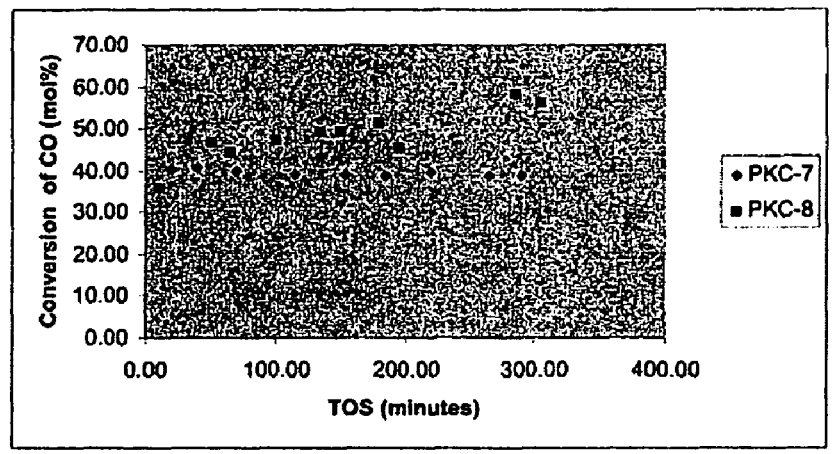
FIG. 1 is a graph showing WGS conversion of CO at $W/F_{A0(CO)}=0.014$ Kg(cat)-s-mmol$^{-1}$, temperature=400° C. for samples PKC-7 and PKC-8.

The following definitions, unless otherwise, stated apply to all embodiments and aspects of the present invention.

The term "surfactant templating method" as used herein refers to the method of preparing the mixed bi-metal oxide supports of the present invention.

The term "the first and second oxides are different" as used herein means that the first oxide comprises a metal that is not the same as that in the second metal oxide.

It should be noted that if the first or second oxide is an oxide of Al, the resulting alumina is activated alumina which is a high BET surface area alumina, for example greater than 10 $m^2/g$, suitably greater than 150 $m^2/g$, having primarily one or more of gamma, theta and delta aluminas.

The term "BET surface area" as used herein means the Brunauer, Emmett, Teller method for determining surface area by $N_2$ adsorption. Unless otherwise stated, all reference to a surface area herein refer to the BET surface area.

The term "supports" or "catalyst support" as used herein refers to particulate materials that are part of the catalyst composition. The support is present in the catalyst in amounts greater than about 90 wt %.

The term "catalytically effective amount" as used herein means that the amount of material present is sufficient to affect the rate of the reaction being catalyzed by the material.

The term "wt %." or "percent by weight" as used herein refers to the relative weight each of the components of the catalysts of the invention contributes to the combined total weight of those catalysts, including the support.

The term "input gas stream" means a gas stream prior to passing through a catalytic region or prior to initial contact with a catalyst composition.

The term "hydrocarbon fuel" as used herein refers to any form of fossil fuels such as natural gas, diesel, gasoline, heavy residue, and mixtures thereof. It also refers to the product derived from coal gasification processes and/or petroleum coke gasification processes. Still further, it refers to non-fossil fuels such as mixed biomass including crude ethanol, wood waste and agricultural waste residue, municipal solid waste, pulp sludge and grass straw. In an embodiment of the present invention, the hydrocarbon fuel is methane ($CH_4$).

The term "about" as used herein means within experimental error.

Description

Improved ceria/zirconia based catalysts have been prepared for use in catalyzing the water gas shift reaction and the carbon dioxide reforming of hydrocarbon fuels such as methane. It has been found that surfactant-mediated preparation of the support provides a mesoporous, thermally stable material that, in combination with appropriate metal loadings of Ni and/or Cu, leads to highly active and stable catalysts for both the water gas shift reaction and the carbon dioxide reforming of hydrocarbon fuels.

Accordingly the present invention includes a water gas shift reaction (WGSR) catalyst comprising a catalytically effective amount of nickel and/or copper, or an oxide thereof, dispersed on a support, wherein the support comprises a suitable mixed bi-metal oxide and the support is prepared using a surfactant templating method.

The present invention also includes a WGSR catalyst for the production of hydrogen from an input gas stream comprising $H_2O$ and carbon monoxide comprising:

(a) an oxide support comprising a first oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), and a second oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), wherein the ratio of amount of first oxide to second oxide is in the range of about 50:50 to about 70:30 and the first and second oxides are different; and (b) about 1 to about 10 wt % of one or more metals, or oxides thereof, dispersed on the oxide support, wherein the one or more metals are selected from copper, nickel and mixtures thereof, wherein the support is prepared using a surfactant templating method.

In an embodiment of the invention, the oxide support for the WGSR catalyst comprises a first oxide selected from the group consisting of zeolites and oxides of cerium (Ce), silicon (Si), thorium (Th), magnesium (Mg), yttrium (Y), lanthanum (La), zirconium (Zr) and aluminum (Al), and a second oxide selected from the group consisting of zeolites and oxides of cerium (Ce), silicon (Si), thorium (Th), magnesium (Mg), yttrium (Y), lanthanum (La), zirconium (Zr) and aluminum. In further embodiments of the invention, the first oxide is an oxide of cerium and the second oxide is an oxide of zirconium. In still further embodiments of the invention the oxide support comprises $CeO_2$ (ceria) as the first oxide, which is doped with $ZrO_2$ (zirconia) as the second oxide.

As stated above, the WGSR catalysts of the present invention comprise about 1 to about 10 wt % of one or more metals, or oxides thereof, dispersed on the oxide support, wherein the one or more metals are selected from copper, nickel and mixtures thereof. In an embodiment of the invention the WGSR catalysts comprises both copper and nickel, each being present in an amount in the range of from about 1 to about 5 wt %. In a further embodiment of the invention, the copper and nickel are present in an amount in the range of from about 3 to about 5 wt %. In still further embodiments of the invention, the WGSR catalysts comprise about 5 wt % copper and about 3 wt % nickel.

In an embodiment of the present invention, the WGSR catalyst is represented by the formula $Ni_yCu_z[A_xB_{(1-x)}]O_2$, wherein x is in the range of about 0.5 to about 0.7, y and z represent the weight percent of Ni and Cu, respectively, relative to each other on the support and are each, independently, in the range of about 1 to about 5% and A and B are independently selected from the group consisting of Ce, Si, Th, Mg, Y, La, Zr, Al, Ti, Hf, Nb, Ta, Pr, Nd, Sm, Eu, Gd, Tb, Dy, Ho, Er, Tm, Yb, Lu, Mo, W, Re, Rh, Sb, Bi, Mn, Ga, Sr and Ba, with the proviso that A does not equal B. In embodiments of the invention y and z are each, independently, in the range of about 3 to about 5, x is about 0.5 and A is Ce and B is Zr.

The ratio of A to B (A:B) in the WGSR catalysts of the present invention is in the range of about 70:30 to about 50:50. In embodiments of the invention, the A:B ratio is about 60:40 to about 50:50. In further embodiments of the present invention, the A:B ratio is 50:50.

In a further embodiment of the present invention, the WGSR catalyst is represented by a formula selected from the group consisting of:

$Ni(3)Cu(5)[Ce_{0.70}Zr_{0.30}]O_2$;

$Ni(5)Cu(3)[Ce_{0.70}Zr_{0.30}]O_2$;

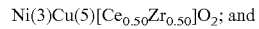
$Ni(3)Cu(5)[Ce_{0.50}Zr_{0.50}]O_2$; and

$Ni(5)Cu(3)[Ce_{0.50}Zr_{0.50}]O_2$.

In still further embodiments of the present invention, the WGSR catalyst is $Ni(3)Cu(5)[Ce_{0.50}Zr_{0.50}]$.

The WGSR catalyst may be formed into any size or shape depending on the specific applications of the WGSR catalyst, as would be known to those skilled in the art.

In an embodiment of the invention, the WGSR catalyst is in a form selected from tablet, extrudate, pellet, bead, cylinder, hollow cylinder, powder, washcoat composition deposited on monolith substrate, high mechanical strength particulate and high heat capacity particulate.

The present invention also includes a process for producing hydrogen, comprising contacting an input gas stream comprising $H_2O$ and carbon monoxide with a WGSR catalyst above 300° C., wherein the WGSR catalyst comprises (a) an oxide support comprising a first oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafnium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), and a second oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafnium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), wherein the ratio of amount of first oxide to second oxide is in the range of about 50:50 to about 70:30 and the first and second oxides are different; and (b) about 1 to about 10 wt % of one or more metals, or oxides thereof, dispersed on the oxide support, wherein the one or more metals are selected from copper, nickel and mixtures thereof, wherein the support is prepared using a surfactant templating method.

In an embodiment of the above process for producing hydrogen using a WGSR catalyst of the invention, the input gas stream comprising $H_2O$ and carbon monoxide is contacted with a WGSR catalyst at a temperature between about 300° C. and about 700° C., suitably between about 400° C. and 650° C.

In a further embodiment of the above process of producing hydrogen using a WGSR catalyst of the present invention, the input gas stream further comprises, in addition to carbon monoxide and $H_2O$, other gases such as $CO_2$, $H_2$ and a hydrocarbon fuel. Therefore, the present invention also relates to cleanup of CO that is coming out of a dry-reformer.

The WGSR catalysts of the present invention work in the temperature range of 600-700° C., without any methane formation and in the presence of reformate, accordingly they are ideally suited for combination downstream of a dry reforming unit in which the exothermic heat of the WGSR is used to supply the endothermic heat required for the CDR reaction.

In another of its aspects, the present invention includes a CDR catalyst comprising a catalytically effective amount of nickel, or an oxide thereof, dispersed on a support, wherein the support comprises a suitable mixed bi-metal oxide and the support is prepared using a surfactant templating method.

Further, the present invention includes a CDR catalyst for the production of hydrogen from an input gas stream comprising a hydrocarbon fuel and carbon dioxide, said catalyst comprising:

(a) an oxide support comprising a first oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafnium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), and a second oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafnium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), wherein the ratio of amount of first oxide to second oxide is in the range of about 95:5 to about 50:50 and the first and second oxides are different; and (b) about 1 to about 5 wt % of nickel or an oxide thereof, dispersed on the oxide support;

wherein the support is prepared using a surfactant templating method.

The CDR catalysts may further comprise about 0.1 to about 1 wt % of an alkali metal, or an oxide thereof. The alkali metal may be any such metal, including, but not limited to, potassium, cesium or sodium.

In an embodiment of the invention, the oxide support for the CDR catalyst comprises a first oxide selected from the group consisting of zeolites and oxides of cerium (Ce), silicon (Si), thorium (Th), magnesium (Mg), yttrium (Y), lanthanum (La), zirconium (Zr) and aluminum (Al), and a second oxide selected from the group consisting of zeolites and oxides of cerium (Ce), silicon (Si), thorium (Th), magnesium (Mg), yttrium (Y), lanthanum (La), zirconium (Zr) and aluminum. In further embodiments of the invention, the first oxide is an oxide of cerium and the second oxide is an oxide of zirconium. In still further embodiments of the invention the oxide support comprises $CeO_2$ (ceria) as the first oxide, which is doped with $ZrO_2$ (zirconia) as the second oxide.

As stated above, the CDR catalysts of the present invention comprise about 1 to about 5 wt % of nickel, or oxides thereof, dispersed on the oxide support. In an embodiment of the invention the CDR catalysts comprises about 5 wt % nickel.

In an embodiment of the present invention, the CDR catalyst is represented by the formula Ni-M[$A_xB_{(1-x)}$]$O_2$, wherein M is an alkali metal in the amount of 0 to about 1 wt %, and wherein x is in the range of about 0.5 to about 0.9, A and B are independently selected from the group consisting of Ce, Si, Th, Mg, Y, La, Zr, Al, Ti, Hf, Nb, Ta, Pr, Nd, Sm, Eu, Gd, Tb, Dy, Ho, Er, Tm, Yb, Lu, Mo, W, Re, Rh, Sb, Bi, Mn, Ga, Sr and Ba, with the proviso that A does not equal B and M is an alkali metal. In embodiments of the invention, M is selected from the group consisting of potassium, cesium and sodium. In embodiments of the invention, M is in the amount of 0 wt %, x is about 0.6 and A is Ce and B is Zr.

The ratio of A to B (A:B) in the CDR catalysts of the present invention may be in the range of about 95:5 to about 50:50. In embodiments of the invention, the A:B ratio is about 92:8 to about 60:40. In further embodiments of the present invention, the A:B ratio is 60:40.

In a further embodiment of the present invention, the CDR catalyst is represented by a formula selected from the group consisting of:

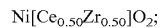

Ni[$Ce_{0.50}Zr_{0.50}$]$O_2$;

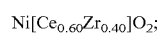

Ni[$Ce_{0.60}Zr_{0.40}$]$O_2$;

Ni[$Ce_{0.68}Zr_{0.32}$]$O_2$;

$Ni[Ce_{0.78}Zr_{0.22}]O_2$;

$Ni[Ce_{0.85}Zr_{0.15}]O_2$; and $Ni[Ce_{0.92}Zr_{0.08}]O_2$.

In still further embodiments of the present invention, the CDR catalyst is $Ni[Ce_{0.60}Zr_{0.40}]O_2$.

Moreover, the CDR catalyst is stable at a gas hourly space velocity (GHSV) of equal or less than 91200 ml/(h·g-cat) at 600° C., 121200 ml/(h·g-cat) at 650° C., and 302400 ml/(h·g-cat) at 700° C.

The CDR catalyst may be formed into any size or shape depending on the specific applications of the CDR catalyst as would be known to those skilled in the art.

In an embodiment of the invention, the CDR catalyst is in a form selected from tablet, extrudate, pellet, bead, cylinder, hollow cylinder, powder, washcoat composition deposited on monolith substrate, high mechanical strength particulate and high heat capacity particulate. Other forms of the CDR catalyst of the invention, as recognized in the art, are also possible and even desirable depending on the specific applications of the CDR catalyst.

The present invention also includes a process for producing hydrogen, comprising contacting an input gas stream comprising a hydrocarbon fuel and carbon dioxide with a carbon dioxide reforming (CDR) catalyst between 550 and 700° C., wherein the CDR catalyst comprises (a) an oxide support comprising a first oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), and a second oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), wherein the ratio of amount of first oxide to second oxide is in the range of about 95:5 to about 50:50 and the first and second oxides are different; and (b) about 1 to about 5 wt % of nickel or an oxide thereof, dispersed on the oxide support, wherein the support is prepared using a surfactant templating method. The CDR catalysts may further comprise about 0.1 to about 1 wt % of an alkali metal, or an oxide thereof dispersed on the oxide support.

Also within the scope of the present invention is a process for producing hydrogen comprising: contacting a first input gas stream comprising a hydrocarbon fuel and carbon dioxide with a carbon dioxide reforming (CDR) catalyst of the present invention between 550 and 700° C. to produce a first output stream of carbon monoxide and hydrogen; and contacting a second input gas stream comprising $H_2O$ and carbon monoxide with a WGSR catalyst of the present invention above 300° C. to produce a second output stream of carbon dioxide and hydrogen.

In a further embodiment of the present invention, the second output stream is contacted with a carbon monoxide oxidant.

More particularly, when the hydrocarbon fuel is natural gas, the natural gas and carbon dioxide are in a molar ratio of about 1:1.

Still further, within the scope of the present invention is a process for producing hydrogen comprising: contacting a first input gas stream comprising a hydrocarbon fuel and carbon dioxide with a carbon dioxide reforming (CDR) catalyst of the present invention above 550 and 700° C. to produce a first output stream comprising carbon monoxide and hydrogen, and subsequently contacting the first output gas stream with a WGSR catalyst of the present invention in the presence of $H_2O$ above 300° C. to produce a second output stream comprising carbon dioxide and hydrogen. In a further embodiment of the present invention, the second output stream is contacted with a carbon monoxide oxidant.

The present invention also includes a method of preparing a WGSR catalyst or a CDR catalyst comprising (a) preparing a mixed bi-metalic oxide support using a surfactant templating method; and (b) dispersing a catalytically effective amount of nickel and/or copper, or an oxide thereof, onto the support.

In an embodiment of the invention, the method further comprises step (c) in which the WGSR catalyst or the CDR catalyst is shaped into a suitable form. The form of the WGSR catalyst or the CDR catalyst may be selected from tablet, extrudate, pellet, bead, cylinder, hollow cylinder, powder, washcoat composition deposited on monolith substrate, high mechanical strength particulate and high heat capacity particulate. Other forms of the WGSR catalyst or the CDR catalyst of the invention, as recognized in the art, are of course also possible and even desirable depending on the specific applications of the WGSR catalyst or the CDR catalyst.

In an embodiment of the invention, the surfactant templating method in step (a) above, comprises: (i) combining aqueous solutions of metal oxide precursors, with an aqueous solution of at least one surfactant; (ii) stirring the combination for a suitable time; (iii) adding a suitable base to adjust the pH of the combined solutions to about 10 to about 13 to produce a slurry comprising precipitated support; (iv) allowing the slurry to sit at elevated temperatures for a suitable time; (v) isolating the precipitated support from the slurry; and (vi) optionally washing the isolated support to remove residual solvent.

In an embodiment if the invention, the solutions of metal oxide precursors and surfactant are combined and mixed at room temperature. Particularly, in embodiments of the invention, the combined solution is mixed for about 30 to 130 minutes. More particularly, in embodiments of the invention, the combined solution is mixed for about 60 to 120 minutes. Still more particularly, in embodiments of the invention, the combined solution is mixed for about 90 minutes.

In an embodiment of the invention, the base used in the surfactant templating method is ammonia. More particularly, the pH of the combined solution is adjusted to about 11 to about 12 by the addition of the base. Optionally, the pH of the slurry may be readjusted by the addition of a base after step (iv).

In an embodiment of the invention, the slurry is heated to about 80 to 100° C., suitably about 90° C. in step (iv). Further, in an embodiment of the invention, the slurry is heated for about 1 to 10 days in step (iv). Suitably, in an embodiment of the invention, the slurry is heated for about 5 to 8 days in step (iv). In an embodiment of the invention, the slurry is cooled prior to isolation of the support.

In an embodiment of the invention, the precipitated support is separated from the slurry in step (v) by filtration.

Suitable surfactants for use in the surfactant templating method include, but are not limited to, oligomeric surfactants and tetraalkyl ammonium salts, in which the length of the alkyl group varies from C6 to C18, in which C6 represents an alkyl group containing six carbon atoms in the alkyl chain and C18 represents an alkyl group containing 18 carbon atoms in the alkyl chain. The alkyl chain may be straight or branched or may contain double or triple bonds. Suitably, the length of the alkyl group is C16, which is also known as cetyl or hexadecyl. In an embodiment of the invention, the tetraalkylammonium salt is, for example, a alkyltrimethyl ammonium salt, such as a alkyltrimethyl ammonium chloride, bromide or hydroxide. In a further embodiment of the invention, the tetraalkylammonium salt is cetyl trimethyl ammonium bromide. Still more suitably, the surfactant cetyl trimethyl ammonium bromide is used. In an embodiment of the invention, the molar ratio of metal oxide precursors to the tetraalkylammonium salt is about 0.7 to 0.9, suitably about 0.8.

In another embodiment of the invention, the surfactant for preparing the support is oligomeric and includes co-polymers such as pluronics. These amphiphilic polymers consist of polypropylene oxide block (PO) which is surrounded by two hydrophilic polyethylene oxide blocks (EO). The general formula of the amphiphilic polymer is represented as $(EO)_a$—$(PO)_b$-$(EO)_c$. There are a number of different pluronics which are available, each with a different molecular weight and a EO/PO molar ratio. In a specific embodiment of the invention, the triblock copolymer Pluronic™ 123 (P-123) is used, which has the schematic structure of $(EO)_{20}$—$(PO)_{70}$-$(EO)_{20}$. In an embodiment of the invention, the molar ratio of metal oxide precursors to the oligomeric surfactant is of a molar ratio of about 2.5 to 3.0, suitably about 2.8.

The surfactant templating method of preparing mixed metal oxide materials for applications other than catalysts for the WGSR or for CDR is described in Terribile, D. et al. Catalyst Today, 1998, 79-88, the contents of which are incorporated herein by reference.

The dispersion of the nickel and/or copper on the mixed bi-metalic support may be done using any known technique, for example, using the incipient impregnation method, deposition-precipitation, decantation and co-precipitation. When co-precipitation is used as the dispersion method, an aqueous solution of a suitable salt of the nickel and/or copper metal is combined with the aqueous solutions metal oxide precursors during the preparation of the support using the surfactant templating protocol.

The present invention also includes a reactor comprising the inventive catalysts of the present invention. Typically the reactor comprises a reactor inlet, a reaction chamber and a reactor exhaust outlet.

In another aspect, the invention relates to an apparatus for supplying hydrogen to a PEM fuel cell with a hydrocarbon reformer reactor, a water-gas shift reactor and optionally, a selective carbon monoxide oxidation reactor. The hydrocarbon reformer reactor is upstream and in train with the water-gas shift reactor, and the selective carbon monoxide oxidation reactor is downstream and in train with the WGS reactor. In one embodiment of the apparatus, the hydrocarbon reformer reactor contains a CDR catalyst according to the present invention and the WGS reactor contains a WGSR catalyst according to the present invention.

Typical reactors and corresponding processing systems for supplying hydrogen to fuel cells are described in the art, for example, but not limited to, in PCT Patent Application publication number WO 2004/087304, U.S. Pat. No. 6,090,312 and PCT Patent Application publication number WO 02/066380, the contents of which are incorporated herein by reference in their entirety.

The following non-limiting examples are illustrative of the present invention:

EXAMPLES (A) Water Gas Shift Reaction Catalysts

Example 1

Preparation of Support Sample PKC-2

On a basis of 15.0 g $CeO_2$, about 37.85 g of $Ce(NO_3)_3 \cdot 6H_2O$ (Aldrich, 99.5%) and 120 g urea (Aldrich) were dissolved in 450.0 ml of deionized water, and to that solution about 15 ml of $NH_4OH$ (Fluka, 25% $NH_3$) was added dropwise (~1 ml/min). Initial pH before adding the ammonia solution was 7.8. The mixture was then boiled at 100° C. for 3 h with constant stirring until precipitation occurred. The final pH before filtration was 8.7. Further, the precipitate was filtered, washed with copious amount of de-ionized water and dried in an oven (110° C.) overnight. The dried precipitate was then crushed and calcined in a furnace at 400° C. for 4 h. The support obtained was pale yellow in colour and was in the form of fine powder in appearance. This was designated as PKC-2.

Example 2

Preparation of Support Sample PKC-3A

On a basis of 5.3 g of the catalyst support, this support was prepared by dissolving 13.35 g of $Ce(NH_4)_2(NO_3)_6$ (Aldrich), 3.6 g of $ZrO(NO_3)_2 \cdot XH_2O$ (Aldrich) and 290 g of urea in 2.5 L of de-ionized water. The solution was heated to its boiling temperature while stirring until co-precipitation was observed. The mixture was then aged at its boiling temperature for 7 h and was then left stirring at room temperature overnight. The mixture obtained was filtered while washing with copious amounts of hot water. Subsequently, the filter cake obtained was refluxed with isopropanol for 45 minutes and filtered again. The washed filtrate was then dried at 70° C. overnight and calcined at 500° C. for 4 h. The support obtained was pale yellow in colour and was in the form of fine powder in appearance. This was designated as PKC-3A.

Example 3

Preparation of Catalyst Sample PKC-7

On a basis of 6.6 g sample, this catalyst support was prepared by dissolving 17.25 g of $Ce(NH_4)_2(NO_3)_6$ (Aldrich), 5.84 g of $La(NO_3)_3$ and 1.163 g of $Cu(NO_3)_3 \cdot 2.5H_2O$ in 225 ml of water in the presence of 30.0 g of urea. The solution was heated to 90° C. for 7 h and continuously mixed using a rotavapour. After co-precipitation, the resulting gels of Ce and La were diluted using 1 L of de-ionized water and vigorously boiled to remove the excess urea, if any, and left for aging at room temperature overnight. After aging, the precipitate was filtered, washed twice in boiling de-ionized water, and dried in a pre-heated oven at 90° C. overnight. The dried sample was crushed and calcined in air at 650° C. for 4 h. The material obtained was brown in colour and was in the form of fine powder. This was designated as PKC-7.

Example 4

Preparation of Catalyst Sample PKC-8

On a basis of 12.1 g sample, this catalyst was prepared by dissolving 37.5 g of $Ce(NH_4)_2(NO_3)_6$ (Aldrich), 14.1 g of $ZrO(NO_3)_2$ (35% solution in water, Aldrich) and 2.326 g of $Cu(NO_3)_2.2.5H_2O$ in 500 ml of water in the presence of 65.6 g of urea. The solution was refluxed at 90° C. for 90 h. After co-precipitation the resulting gels of Ce and Zr were diluted using 1 L of de-ionized water and vigorously boiled to remove the excess urea, if any, and left for aging at room temperature overnight. After aging, the precipitate was filtered, washed twice in boiling de-ionized water, and dried in a pre-heated oven at 90° C. overnight. The dried sample was crushed and calcined in air at 650° C. for 4 h. The material obtained was brown in colour and was in the form of fine powder. This was designated as PKC-8.

Example 5

Preparation of Catalyst Sample PKC-9

On a basis of 5.0 g sample, this catalyst was prepared by dissolving 12.5 g of $Ce(NO_3)_3.6H_2O$ in 300 ml of de-ionized water. Another solution of 0.146 g of $Cu(NO_3)_2.2.5H_2O$ was dissolved in 6.5 g of deionized water. These two solutions were mixed together and added dropwise to a continuously stirred solution of KOH (5.6 in 1 L of deionized water) placed on a water bath at 80° C. at pH 10. The cations were precipitated in the form of their hydroxides. The mixture was digested at this temperature for another 4 h and then cooled to room temperature. The precipitate was filtered and washed with copious amount of water and dried overnight in an air oven at 120° C. The dried material was further calcined at 500° C. for 5 h. The material obtained was shining brown in appearance and was designated as PKC-9.

Example 6

Preparation of Support Sample PKC-1A

On a basis of 2.5 g sample, the catalyst was prepared by separate dissolution of 6.5 g of $Ce(NO_3)_3.6H_2O$ and 4.8 g of cetyltrimethyl ammonium bromide (CTAB) in de-ionized water and mixing the resulting solutions together (molar ratio of Ce/CTAB=1.2). The total volume of water added was 275 ml. An aqueous solution of ammonia (125 ml) was then slowly added to the above solution over a period of 90 minutes. The initial pH before adding ammonia solution was 4.8 (temperature 34° C.), which increased to 11.2 after the complete addition of ammonia solution. This caused the precipitation of hydrous cerium oxide as a gelatinous pale yellow solid. After precipitation, the slurry was sealed in a glass vessel and placed in an oven maintained at 90° C. for 90 h in a static position. The mixture was then cooled to room temperature and the precipitate filtered and washed, first with copious amounts of water and then acetone to remove the free surfactant not incorporated within the oxide. The resulting yellow powder was dried at 90° C. overnight and calcined in the furnace at 450° C. for 4 h under air flow to remove the surfactant. The yield calculated based on the composition was 92%. The powder was characterized and designated as PKC1A.

Example 7

Preparation of Support Sample PKC-1B

On a basis of 2.5 g sample, this catalyst support was prepared by separately dissolving 6.5 g of $Ce(NO_3)_3.6H_2O$ and 4.8 g of cetyltrimethyl ammonium bromide (CTAB) in de-ionized water and mixing the resulting solutions together (molar ratio of Ce/CTAB=1.2). The total volume of water added was 275 ml. An aqueous solution of ammonia (125 ml) was then slowly added to the above solution over a period of 90 minutes. The initial pH before adding ammonia solution was 4.8 (temperature 34° C.), which increased to 11.2 after the complete addition of ammonia solution. This caused the precipitation of hydrous cerium oxide as a gelatinous pale yellow solid. After precipitation, the slurry was sealed in a glass vessel and placed in an oven maintained at 90° C. for 120 h in static position. The mixture was then cooled to room temperature and the precipitate filtered and washed, first with copious amount of water and then acetone to remove the free surfactant not incorporated within the oxide. The resulting yellow powder was dried at 90° C. overnight and calcined in the furnace at 450° C. for 4 h under air flow to remove the surfactant. The yield calculated based on the composition was 92%. The powder was characterized and designated as PKC1B.

Example 8

Preparation of Support Sample PKC-4A

Based on the 7.5 g of sample of Ce:Zr::68:32 (atom %) in a solid solution, 14.75 g of $Ce(NO_3)_3.6H_2O$ was dissolved in 500 ml of de-ionized water and 5.3 g of $ZrOCl_3.8H_2O$ was separately dissolved in 500 ml de-ionized water. The two solutions were mixed together to form a clear solution. 24.45 g of cetyltrimethyl ammonium bromide (CTAB) was dissolved in 1000 ml of de-ionized water and this solution was then slowly mixed together with the earlier solution (molar ratio of Ce+Zr/CTAB=0.8) and stirred at room temperature for 90 minutes. An aqueous solution of ammonia (1200 ml) was then slowly added to the above solution over a period of 120 minutes. The initial pH before adding ammonia solution was 2.0 (temperature 34° C.), which increased to 11.45 after the complete addition of ammonia solution. This caused the precipitation of hydrous cerium-zirconium oxide as a gelatinous yellow-brown solid. After precipitation, the slurry was stirred for 1 h and then sealed in a glass vessel and placed in an oven maintained at 90° C. for 5 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was 95%. The powder was characterized and designated as PKC4A.

Example 9

Preparation of Support Sample PKC-4B

Based on the 7.5 g of sample of Ce:Zr::68:32 (atom %) in a solid solution, 14.75 g of $Ce(NO_3)_3.6H_2O$ was dissolved in 500 ml of de-ionized water and 5.3 g of $ZrOCl_3.8H_2O$ was separately dissolved in 500 ml de-ionized water. The two solutions were mixed together to form a clear solution. 24.45 g of cetyltrimethyl ammonium bromide (CTAB) was dissolved in 1000 ml of de-ionized water and this solution was then slowly mixed together with the earlier solution (molar ratio of Ce+Zr/CTAB=0.8) and stirred at room temperature for 90 minutes. An aqueous solution of ammonia (1200 ml) was then slowly added to the above solution over a period of 120 minutes. The initial pH before adding ammonia solution was 2.0 (temperature 34° C.), which increased to 11.45 after the complete addition of ammonia solution. This caused the precipitation of hydrous cerium-zirconium oxide as a gelatinous yellow-brown solid. After precipitation, the slurry was stirred for 1 h and then sealed in a glass vessel and placed in an oven maintained at 90° C. for 8 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was 95%. The powder was characterized and designated as PKC4B.

Example 10

Preparation of Support Sample PKC-18

Based on the 13.2 g of sample of Ce:Zr::85:15 (atom %) in a solid solution, 31.6 g of $CeCl_3.7H_2O$ was dissolved in 500 ml of de-ionized water. Also 10.31 g of $ZrOCl_3.XH_2O$ was separately dissolved in 500 ml de-ionized water. The two solutions were mixed together to form a clear solution. 24.45 g of cetyltrimethyl ammonium bromide (CTAB) was dissolved in 1000 ml of de-ionized water and this solution was then slowly mixed together with the earlier solution (molar ratio of Ce+Zr/CTAB=0.8) and stirred at room temperature for 90 minutes. An aqueous solution of ammonia (1200 ml) was then slowly added to the above solution over a period of 120 minutes. The initial pH before adding ammonia solution was 2.0 (temperature 34° C.), which increased to 11.45 after the complete addition of ammonia solution. This caused the precipitation of hydrous cerium-zirconium oxide as a gelatinous yellow-brown solid. After precipitation, the slurry was stirred for 1 h and then sealed in a glass vessel and placed in an oven maintained at 90° C. for 5 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was 95%. The powder was characterized and designated as PKC18.

Example 11

Preparation of Support Sample PKC-17

Based on the 25 g of sample of Ce:Zr::70:30 (atom %) in a solid solution, 60.8 g of $Ce(NO_3)_3.6H_2O$ was dissolved in 500 ml of de-ionized water. Also 13.87 g of $ZrOCl_3.8H_2O$ was separately dissolved in 500 ml de-ionized water. The two solutions were mixed together to form a clear solution. 91.0 g of cetyltrimethyl ammonium bromide (CTAB) was dissolved in 1000 ml of de-ionized water and this solution was then slowly mixed together with the earlier solution (molar ratio of Ce+Zr/CTAB=0.8) and stirred at room temperature for 90 minutes. An aqueous solution of ammonia (1200 ml) was then slowly added to the above solution over a period of 120 minutes. The initial pH before adding ammonia solution was 2.0 (temperature 34° C.), which increased to 11.6 after the complete addition of ammonia solution. This caused the precipitation of hydrous cerium-zirconium oxide as a gelatinous yellow-brown solid. After precipitation, the slurry was stirred for 1 h and then sealed in a glass vessel and placed in an oven maintained at 90° C. for 5 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was 95%. The powder was characterized and designated as PKC17.

Example 12

Preparation of Support Sample PKC-17B

Based on the 6.0 g of sample of Ce:Zr::70:30 (atom %) in a solid solution, 15.2 g of $Ce(NO_3)_3.6H_2O$ was dissolved in 200 ml of de-ionized water. Also 5.3 g of $ZrOCl_3.8H_2O$ was separately dissolved in 200 ml de-ionized water. The two solutions were mixed together to form a clear solution. 22.6 g of cetyltrimethyl ammonium bromide (CTAB) was dissolved in 1000 ml of de-ionized water and this solution was then slowly mixed together with the earlier solution (molar ratio of Ce+Zr/CTAB=0.8) and stirred at room temperature for 90 minutes. An aqueous solution of ammonia (1200 ml) was then slowly added to the above solution over a period of 120 minutes. The initial pH before adding ammonia solution was 2.0 (temperature 34° C.), which increased to 11.6 after the complete addition of ammonia solution. This caused the precipitation of hydrous cerium-zirconium oxide as a gelatinous yellow-brown solid. After precipitation, the slurry was stirred for 1 h and then sealed in a glass vessel and placed in an oven maintained at 90° C. for 8 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was 95%. The powder was characterized and designated as PKC17B.

Example 13

Preparation of Support Sample PKC-20

This sample is a co-precipitated preparation of nickel containing ceria-zirconia mixed oxide. Based on the 11.7 g of sample of Ce:Zr:Ni::70:25:5 (atom %) in a solid solution this catalyst was prepared by separately dissolving 24.6 g of $CeCl_3.7H_2O$ in 400 ml of de-ionized water, 5.48 g of $ZrOCl_3.XH_2O$ dissolved in 400 ml de-ionized water as well as 1.45 g of $Ni(NO_3)_3.6H_2O$ in 200 ml of de-ionized water. These solutions were mixed together to form a clear solution. 45.55 g of cetyltrimethyl ammonium bromide (CTAB) dissolved in 1000 ml of de-ionized was then slowly mixed together with the earlier mixture (molar ratio of Ce+Zr/CTAB=0.8) and stirred at room temperature for 90 minutes.

An aqueous solution of ammonia (1200 ml) was then slowly added to the above solution over a period of 120 minutes. The initial pH before adding ammonia solution was 2.0 (temperature 34° C.), which increased to 11.0 after the complete addition of ammonia solution. This caused the precipitation of hydrous cerium-zirconium oxide as a gelatinous yellow-brown solid. After precipitation, the slurry was stirred for 1 h and then sealed in a glass vessel and placed in an oven maintained at 363 K for 5 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was 95%. The powder was characterized and designated as PKC20.

Example 14

Preparation of Support Sample PKC-21

Based on the 11.5 g of sample of Ce:Zr::50:50 (atom %) in a solid solution, 21.71 g of $Ce(NO_3)_3.6H_2O$ was dissolved in 500 ml of de-ionized water. Also 11.43 g of $ZrOCl_3.8H_2O$ was separately dissolved in 500 ml de-ionized water. The two solutions were mixed together to form a clear solution. 45.55 g of cetyltrimethyl ammonium bromide (CTAB) was dissolved in 1000 ml of de-ionized water and this solution was then slowly mixed together with the earlier solution (molar ratio of Ce+Zr/CTAB=0.8) and stirred at room temperature for 90 minutes. An aqueous solution of ammonia (1200 ml) was then slowly added to the above solution over a period of 120 minutes. The initial pH before adding ammonia solution was 2.0 (temperature 34° C.), which increased to 11.6 after the complete addition of ammonia solution. This caused the precipitation of hydrous cerium-zirconium oxide as a gelatinous yellow-brown solid. After precipitation, the slurry was stirred for 1 h and then sealed in a glass vessel and placed in an oven maintained at 90° C. for 8 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was 95%. The powder was characterized and designated as PKC21.

Example 15

Preparation of Support Sample PKC-22

Based on the 12.0 g of sample of Ce:Zr::60:40 (atom %) in a solid solution, 26.05 g of $Ce(NO_3)_3.6H_2O$ was dissolved in 500 ml of de-ionized water. Also 9.25 g of $ZrOCl_3.8H_2O$ was dissolved separately in 500 ml de-ionized water. The two solutions were mixed together to form a clear solution. 45.55 g of cetyltrimethyl ammonium bromide (CTAB) was dissolved in 1000 ml of de-ionized water and this solution was then slowly mixed together with the earlier solution (molar ratio of Ce+Zr/CTAB=0.8) and stirred at room temperature for 90 minutes. An aqueous solution of ammonia (1200 ml) was then slowly added to the above solution over a period of 120 minutes. The initial pH before adding ammonia solution was 2.0 (temperature 34° C.), which increased to 11.6 after the complete addition of ammonia solution. This caused the precipitation of hydrous cerium-zirconium oxide as a gelatinous yellow-brown solid. After precipitation, the slurry was stirred for 1 h and then sealed in a glass vessel and placed in an oven maintained at 90° C. for 8 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was 95%. The powder was characterized and designated as PKC22.

Example 16

Preparation of Support Sample PKC-23

Based on the 11.5 g of sample of Ce:Y::50:50 (atom %) in a solid solution, 21.71 g of $Ce(NO_3)_3.6H_2O$ was dissolved in 500 ml of de-ionized water and 19.17 g of $Y(NO_3)_3.6H_2O$ was separately dissolved in 500 ml de-ionized water. The two solutions were mixed together to form a clear solution. 45.55 g of cetyltrimethyl ammonium bromide (CTAB) was dissolved in 1000 ml of de-ionized water and this solution was then slowly mixed together with the earlier solution (molar ratio of Ce+Y/CTAB=0.8) and stirred at room temperature for 90 minutes. An aqueous solution of ammonia (1100 ml) was then slowly added to the above solution over a period of 120 minutes. The initial pH before adding ammonia solution was 4.5 (temperature 34° C.), which increased to 10.8 after the complete addition of ammonia solution. This caused the precipitation of hydrous cerium-zirconium oxide as a gelatinous yellow-white solid. After precipitation, the slurry was stirred for 1 h and then sealed in a glass vessel and placed in an oven maintained at 90° C. for 5 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was 95%. The powder was characterized and designated as PKC23.

Example 17

Preparation of Support Sample PKC-24

Based on the 5.7 g of sample of La:Y::50:50 (atom %) in a solid solution, 10.83 g of $La(NO_3)_3.6H_2O$ was dissolved in 500 ml of de-ionized water and 9.58 g of $Y(NO_3)_3.6H_2O$ was separately dissolved in 500 ml de-ionized water. The two solutions were mixed together to form a clear solution. 30.5 g of cetyltrimethyl ammonium bromide (CTAB) was dissolved in 700 ml of de-ionized water and this solution was then slowly mixed together with the earlier solution (molar ratio of La+Y/CTAB=0.8) and stirred at room temperature for 90 minutes. An aqueous solution of ammonia (900 ml) was then slowly added to the above solution over a period of 120 minutes. The initial pH before adding ammonia solution was 5.2 (temperature 34° C.), which increased to 11.1 after the complete addition of ammonia solution. This caused the precipitation of hydrous cerium-zirconium oxide as a gelatinous white solid. After precipitation, the slurry was stirred for 1 h and then sealed in a glass vessel and placed in an oven maintained at 90° C. for 5 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was about 95%. The powder was characterized and designated as PKC24.

Example 18

Preparation of Support Sample PKC-25

Based on the 5.75 g of sample of Ce:Zr::68:32 (atom %) in a solid solution, 10.85 g of $Ce(NO_3)_3.6H_2O$ was dissolved in 500 ml of de-ionized water and 5.71 g of $Zr(NO_3)_2.XH_2O$ was separately dissolved in 500 ml de-ionized water. The two solutions were mixed together to form a clear solution and was called solution A. 5.6 g of poly (ethylene glycol)-block-poly(propylene glycol)-block-poly(ethylene glycol) (P123) was dissolved in 250 ml of 2(M) solution of hydrochloric acid to get a clear solution. This clear solution of P123 was then slowly mixed together with the solution A and stirred at room temperature for 90 minutes. An aqueous solution of ammonia (1500 ml) was then slowly added to the above solution over a period of 120 minutes. The initial pH before adding ammonia solution was 1.0 (temperature 34° C.), which increased to 11.0 after the complete addition of ammonia solution. This caused the precipitation of hydrous cerium-zirconium oxide as a gelatinous yellow-brown solid. After precipitation, the slurry was stirred for 1 h and then sealed in a glass vessel and placed in an oven maintained at 90° C. for 1 day in a static position. After the completion of day 1 under hydrothermal condition the pH was again increased from 9.5 to 10.5 by adding another 500 ml of ammonia solution under stirred condition. The mixture was gain placed in an oven maintained at 90° C. for another 4 days in a static position. The mixture was then cooled to room temperature and the precipitate filtered and washed, first with copious amount of water and then acetone to remove the free surfactant not incorporated within the oxide. The resulting light yellow powder was dried at 90° C. overnight and calcined in the furnace at 450° C. for 4 h under air flow to remove the surfactant. The yield calculated based on the composition was more than 95%. The powder was characterized and designated as PKC25.

Discussion 1: Loading of Metals on Prepared Support

The final preparation of the catalyst involves the metal loading (Cu, Ni) on the support. Four different techniques were used for metal loading. The incipient wetness impregnation method (WI) works well for many metal oxide combinations, especially for low metal loadings. By varying the properties of the impregnation solution (concentration, temperature, pH), the control of final catalyst properties is theoretically possible. Impregnation also allows for predetermination of the final catalyst properties through careful selection of the support material in the desired specification, size and shape. However, it is difficult to prepare a high concentration of metals in the catalysts, and to obtain an even dispersion of catalyst components on the surface with impregnation. So, in this work, the supports ($CeO_2$ or $CeO_2$: $ZrO_2$) were impregnated with a solution of a metal nitrate of appropriate concentration (not more than 10 wt %), whose volume equals the total pore volume of the support. After impregnation, the samples were degassed in a vacuum controlled rotavapour to slowly remove the water and to let the metal salt solution fully fill the pores of the support. After drying in an oven at 110° C. overnight, the samples were then crushed and calcined in air for 3 h at predefined temperatures. Deposition-precipitation (DP) was also used to load the metals using 50-100 ml of 1(M) ammonium carbonate solution. The idea here is to hydrolyze the salt solution (Ni or Cu) in a controlled environment. Another technique was the decantation approach in which fixed amount of the supports were soaked in a fixed amount of metal salt solution overnight. Metal loading was varied by changing the metal salt concentration in water. In each case, after the soaking was completed, the excess solution was decanted. A calibration curve then reveals the amount of loading present in the support. The metals were also co-precipitated along with the support while preparing the catalyst. Co-precipitation was used in preparing samples PKC-7, PKC-8 and PKC-9 (Examples 3, 4, and 5, respectively). A variety of different combinations were thus prepared as illustrated in the Table 3.

A summary of the catalysts prepared along with the proposed formula structure and the typical activity data based on WGSR is presented for easy comparison in Table 4.

Discussion 2: Effect of Doping in the Prepared Support

Figure 2:
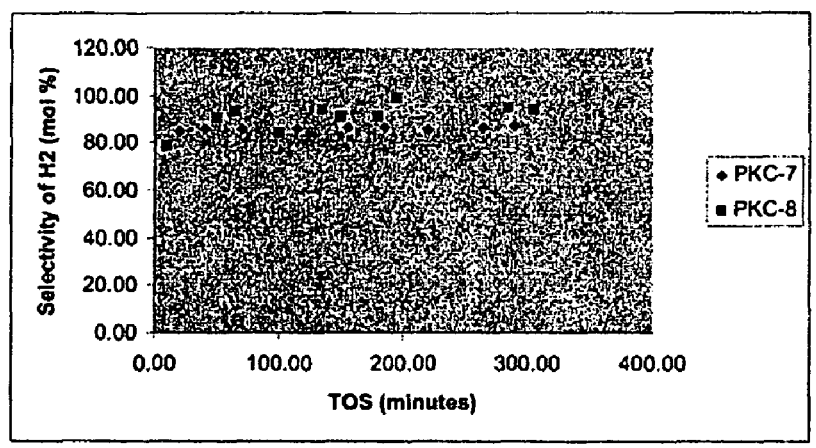
FIG. 2 is a graph showing WGS selectivity to hydrogen at $W/F_{A0(OC)}=0.014$ Kg(cat)-s-mmol$^{-1}$, temperature=400° C. for samples PKC-7 and PKC-8.
Figure 3:
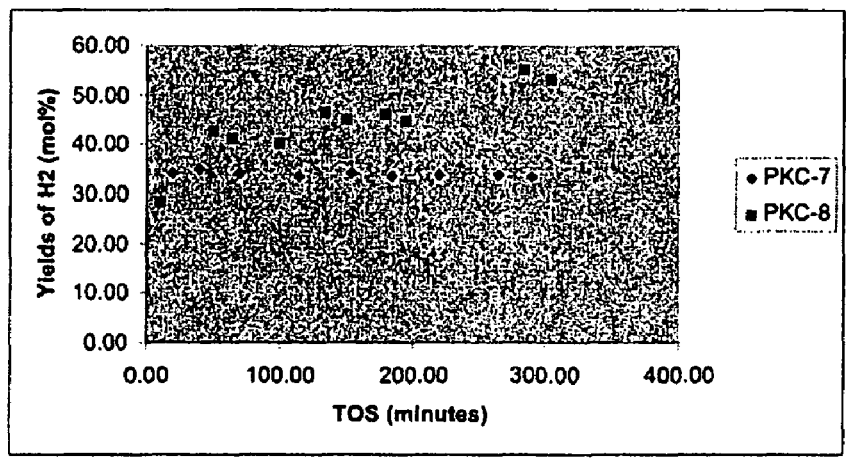
FIG. 3 is a graph showing WGS yield of hydrogen at $W/F_{A0(CO)}=0.014$ Kg(cat)-s-mmol$^{-1}$, temperature=400° C. for samples PKC-7 and PKC-8.

The effect of doping was evaluated with co-precipitated copper containing doped ceria samples. The doping material was either La or Zr. The result in terms of conversion of carbon monoxide (CO), selectivity to hydrogen and yields to hydrogen obtained from catalysts PKC7 and PKC8 are presented in FIGS. 1, 2 & 3 respectively. These experiments were done in a stoichiometric molar $H_2O/CO$ ratio of 2 at 400° C. Based on the CO conversion it can be said that the Zr doped sample is more active and has very high $H_2$ selectivity. While not wishing to be limited by theory, the substitution of the smaller crystal ionic radius of $Zr^{4+}$ into the $CeO_2$ lattice appears to induce a highly defective structure and lattice strain and causes high ionic mobility. This fact is also corroborated by the fact that the particle size is reduced more by Zr than by La as measured by X-ray diffraction (XRD). As a result, more active oxygen species are available for Zr doped catalysts than La doped catalysts during CO adsorption. Accordingly, the higher activity and selectivity to $H_2$ can be attributed to a high number of oxygen vacancies created by $Zr^{4+}$ substitution.

Discussion 3: Effect of Mineralizing Media

Figure 4:
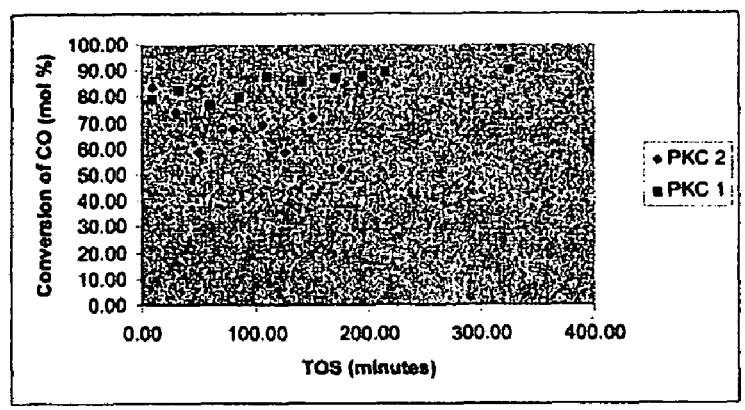
FIG. 4 is a graph showing WGS conversion CO at $W/F_{A0(CO)}=0.014$ Kg(cat)-s-mmol$^{-1}$, temperature=400° C. for samples PKC-1 and PKC-2.
Figure 5:
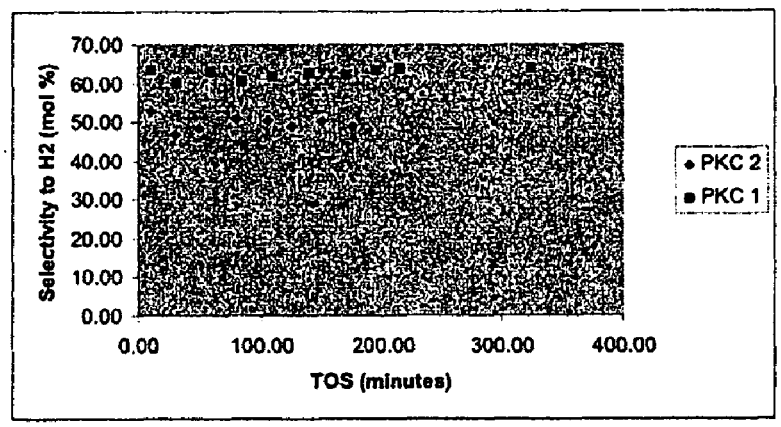
FIG. 5 is a graph showing WGS selectivity to hydrogen at $W/F_{A0(CO)}=0.014$ Kg(cat)-s-mmol$^{-1}$, temperature=400° C. for samples PKC-1 and PKC-2.
Figure 6:
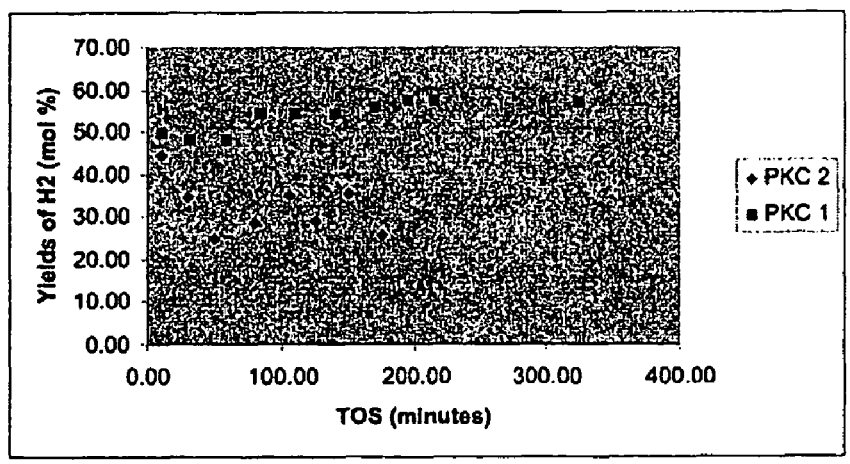
FIG. 6 is a graph showing WGS yields of hydrogen at $W/F_{A0(CO)}=0.014$ Kg(cat)-s-mmol$^{-1}$, temperature=400° C. for samples PKC-1 and PKC-2.

Ceria or doped ceria support materials with nano-porous oxides in mesoporous range have been synthesized. The WGSR activity has been tested on both urea- and CTAB-mediated pure ceria onto which Ni has been loaded by using wetness impregnation technique. These catalysts were evaluated for activity and $H_2$ selectivity and the results obtained on sample PKC1 and PKC2 are presented in FIGS. 4, 5 and 6 respectively. As is apparent from the results, the synthesis approach has an impact on the WGSR activity under similar conditions. The CTAB aided ceria support results into a mesoporous ceria which in turn results into high monolayer dispersion of Ni as compared to urea, and hence higher activity. It seems the physico-chemical and textural properties of support can influence the catalyst preparation and subsequently the activity.

Discussion 4: Effect of Metal

Figure 7:
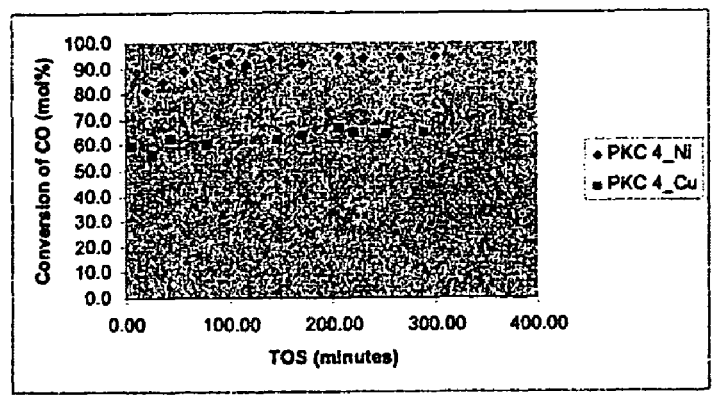
FIG. 7 is a graph showing WGS conversion of CO at $W/F_{A0(CO)}=0.014$ Kg(cat)-s-mmol$^{-1}$, temperature=400° C. for samples PKC4A and PKC4B.
Figure 8:
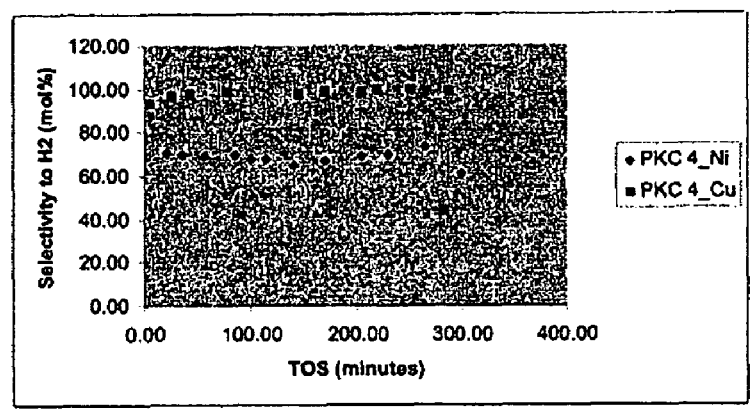
FIG. 8 is a graph showing WGS selectivity to hydrogen at $W/F_{A0(CO)}=0.014$ Kg(cat)-s-mmol$^{-1}$, temperature=400° C. for samples PKC4A and PKC4B.
Figure 9:
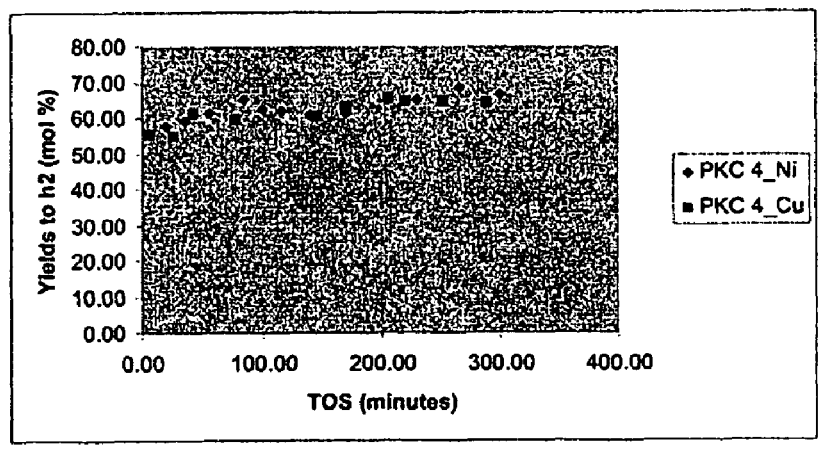
FIG. 9 is a graph showing WGS yield of hydrogen at $W/F_{A0(CO)}=0.014$ Kg(cat)-s-mmol$^{-1}$, temperature=400° C. for samples PKC4A and PKC4B.

The presence of Ni or Cu in the Zr doped ceria prepared using the surfactant (CTAB) aided approach improves the conversion of CO. This can be seen in the results obtained from Ni/PKC4A and Cu/PKC4B as presented in FIGS. 7, 8 and 9 respectively. For the purpose of comparison, all the experiments were conducted under the same conditions as those defined in Discussion 1. It is apparent from the results that the WGSR takes place at the metal-ceria or metal-zirconia/ceria interface. At the interface of support and metal the adsorption of CO takes place during the reaction. While not wishing to be limited by theory, it appears that the high surface area of the support results in monolayer dispersion of nickel and copper and helps to catalyze the reduction of surface ceria. This not only involves the shifting of the reduction temperature to lower temperature but also the degree or quantity of reduction. The larger the extent of reduction of the surface ceria, the more active geminal OH groups are generated on the surface of the ceria which facilitates the formation of surface formate upon addition of CO. Water addition then decomposes the formate to give $H_2$ and $CO_2$. Based on the conversion data, it can be inferred that nickel has the ability to reduce the surface ceria-more than copper, at high temperature resulting in higher activity.

Discussion 5: Effect of Method of Preparing Single Oxide (Ceria) Support

Figure 10:
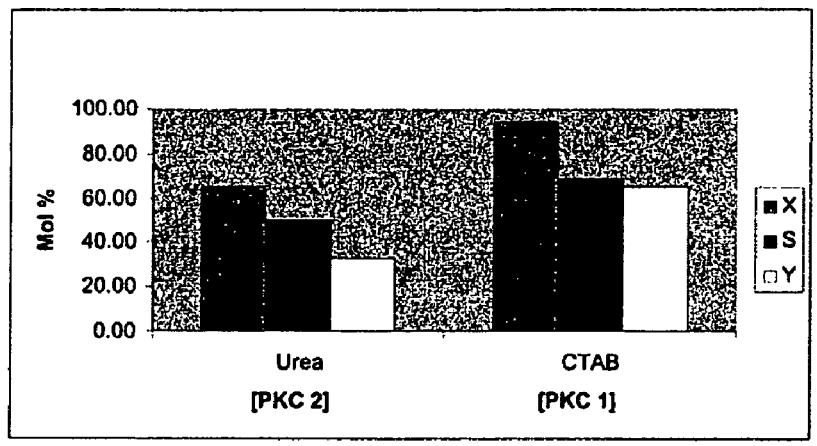
FIG. 10 is a bar graph showing the WGS activity of Ni (5 wt %) on $CeO_2$ prepared using urea vs CTAB as the mineralizing medium at $W/F_{A0(CO)}=0.014$ Kg (cat)-s-mmol$^{-1}$, temperature=400° C. X, S and Y are as defined in Table 2.

The preparation of support using different mineralizing media, such as urea and CTAB, has an effect on the overall activity under similar conditions. Although both urea (PKC2) and CTAB (PKC1) results in mesoporosity of the support, the molecular-level synthesis of thermally stable metal oxide is made possible by surfactant templating chemistry of CTAB. While not wishing to be limited by theory, it appears that the presence of surfactant induces surface tension reduction during the drying and calcination processes resulting in a better material as compared to urea. In FIG. 10 the effect on the method of preparing ceria can be seen. Overall, the conversion, selectivity and yields are better in the CTAB mediated support preparation.

Discussion 6: Effect of Ni Loading

Figure 11:
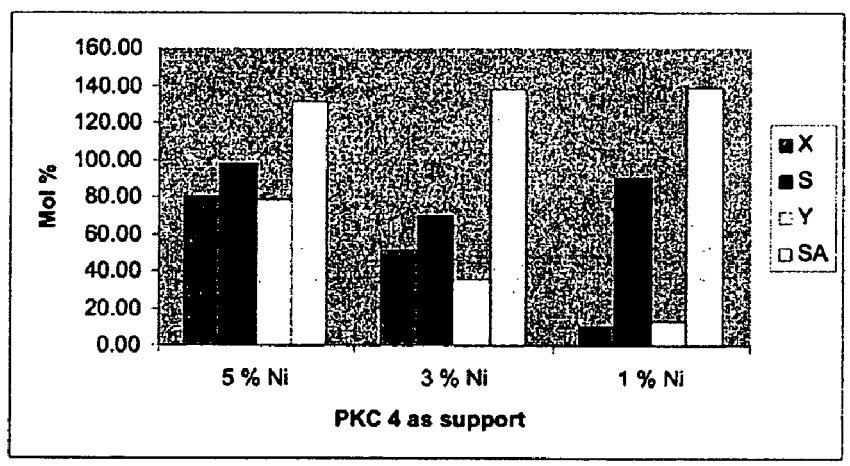
FIG. 11 is a bar graph showing WGS activity at $W/F_{A0(CO)}=0.014$ Kg(cat)-s-mmol$^{-1}$, temperature=400° C. with different concentrations of Ni loaded on to PKC4 as the support. X, S, Y and SA are as defined in Table 2.

The Amount of nickel on the support is directly connected with the conversion of CO and selectivity to methane. The optimum loading of nickel was determine using the DP technique on support (PKC4). The results can be seen in FIG. 11. As is apparent, the surface area drops are negligible in the case of CTAB, which suggest the robust mesoporosity in CTAB mediated samples and a monolayer distribution of nickel. Although the conversion is more or less same in 5% and 3% Ni loading, the better nickel dispersion results into higher selectivity. The different loading of nickel on PKC4 gives a linear correlation, the conversion increases with nickel loading. This suggests better mesoporosity of the support materials as indicated from the high surface area and better nickel dispersion. It is assumed that the support material is present in the nano-crystalline nature of $Ce_{0.68}Zr_{0.32}O_2$ which induces strong interaction with finely dispersed the nano-sized $NiO_x$ crystallite resulting in high conversion and selectivity. Based on this result, the probability of incorporating more nickel loading on PKC4 should be possible. This therefore gives ample scope to manoeuvre and optimize the catalyst for other applications.

Discussion 7: Effect of Zirconia Amount in Support

Figure 12:
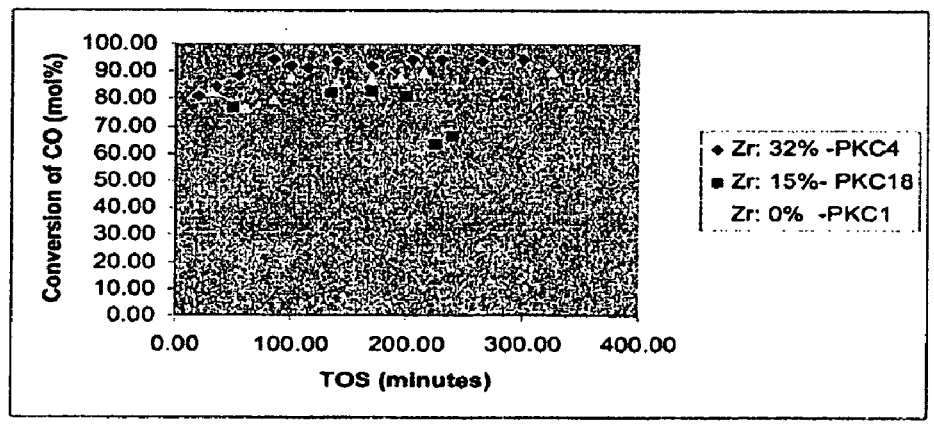
FIG. 12 is a graph showing WGS conversion of CO with a Ni containing catalyst with different zirconia concentrations in the support at $W/F_{A0(CO)}=0.014$ Kg(cat)-s-mmol$^{-1}$, temperature=400° C.
Figure 13:
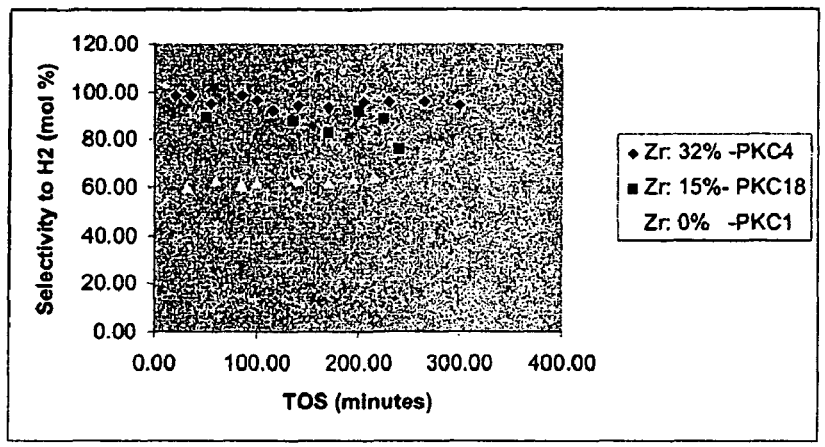
FIG. 13 is a graph showing WGS selectivity to hydrogen with a Ni containing catalyst with different zirconia concentrations in the support at $W/F_{A0(CO)}=0.014$ Kg(cat)-s-mmol$^{-1}$, temperature=400° C.
Figure 14:
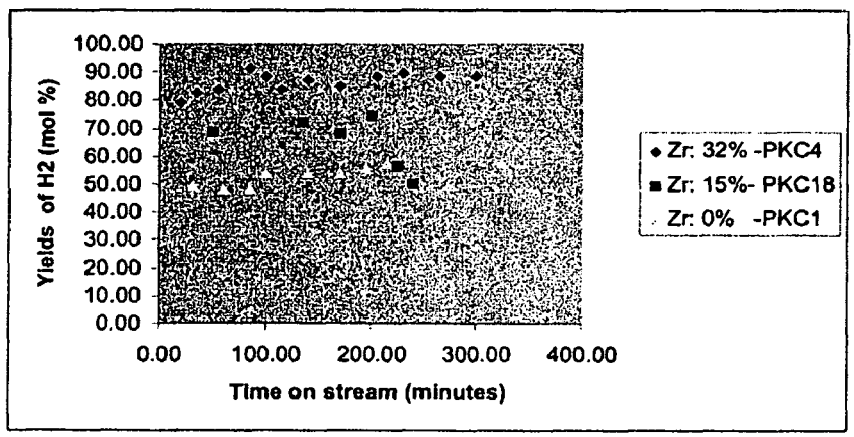
FIG. 14 is a graph showing WGS yields of hydrogen with a Ni containing catalyst with different zirconia concentrations in the support at $W/F_{A0(CO)}=0.014$ Kg(cat)-s-mmol$^{-1}$, temperature=400° C.

The role of zirconia in ceria as a dopant is not only to improve the oxygen storage capacity (OSC) of $CeO_2$, but also to promote the metal dispersion. The redox property and thermal resistance of the catalysts are also effected by the zirconia content in the support. While not wishing to be limited by theory, this property is attributed to partial substitution of $Ce^{4+}$ with $Zr^{4+}$ in the lattice of $CeO_2$, which results in a solid solution formation as explained above. Moreover, the cubic phase of $CeO_2$—$ZrO_2$ combinations such as 0.5 and 0.6 generally has a larger OSC than other ceria oxide. In the present invention the range of cubic phase formation was varied from 0.5 to 1. As a representative example, a comparison of three different zirconia concentrations in the support having a cubic structure are presented in FIGS. 12, 13 and 14 respectively. The sample PKC4 (0.68 Ce) gave a better performance than PKC18 (0.85 Ce). It is expected that PKC18 (0.85 Ce) would have less OSC compared to PKC4 (0.68 Ce) and accordingly affect the WGS activity test. The overall conversion of CO and selectivity to $H_2$ is highest in PKC4 having 32% zirconia. The higher concentration of zirconia improves the overall OSC, which helps to improve the hydrogen selectivity. Methane formation is high in PKC18 which could be related to the poor nickel dispersion and low interaction with the support probably due to a lower concentration of zirconia (15%) in the support.

Discussion 8: Comparisons of Nickel and Copper

Figure 15:
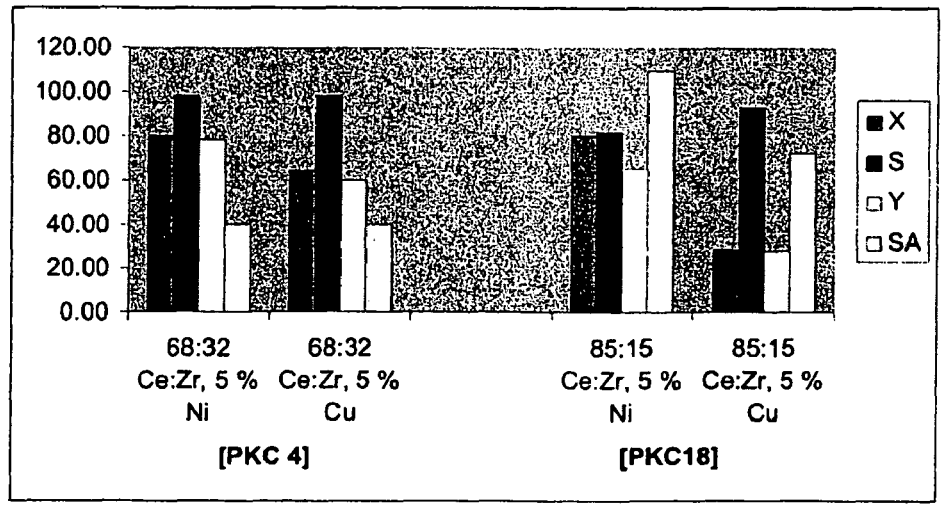
FIG. 15 is a bar graph showing WGS activity of Ni- and Cu-containing PKC samples with different zirconia concentrations at $W/F_{A0(CO)}=0.014$ Kg(cat)-s-mmol$^{-1}$, temperature=400° C.

Both copper and nickel supported on ceria or doped ceria has inherent properties, such as the formation of surface oxygen vacancies, improvement of the redox characteristics of mixed oxides and generation of highly active centers that exist at the interface between metal and support. These facts are manifested in the experimental results on WGSR as presented in FIG. 15 where the results for two different zirconia containing ceria (PKC4 & PKC18) with the same Ni and Cu impregnated samples are presented. It is clear that the high conversion is obtained with nickel containing samples indicating that Ni generally drives the conversion. Selectivity to hydrogen is more or less similar for both the metals except Ni tends to form methane when it exceeds a certain concentration. Cu in general is not a methanation catalyst, which is also proven in the present reaction conditions. It is apparent that the maintenance of surface heterogeneity by these metals on Ce—Zr oxide is one of the reasons for the good activity of these catalysts.

Discussion 10: Effect of Bi-functional Catalyst

The experimental conditions established above clearly gives an indication that the conversion of CO is directly connected with the nickel loading while selectivity to hydrogen is connected to the copper loaded on to the catalyst. Therefore, a catalytic system based, on both of these metals was developed to explore the possibility of a bi-functional catalytic system. Both Ni and Cu were loaded on PKC17, PKC 17B, PKC 21 and PKC 22 in the concentration range of 1, 3 and 5 wt %. The physico-chemical properties of the bifunctional catalysts developed and the average catalytic activities are presented in Table 5.

Figure 16:
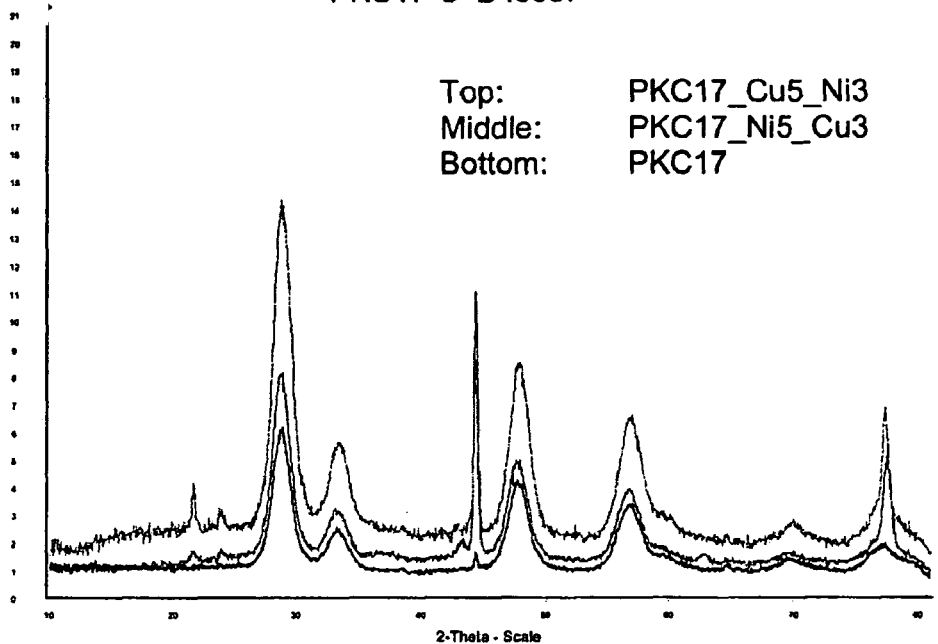
FIG. 16 is a XRD profile of the support and bi-functional catalysts. Top trace=orange=PKC17-Cu5-Ni3; Middle trace=blue=PKC17-Ni5-Cu3; Bottom trace=Red=PKC17.
Figure 17:
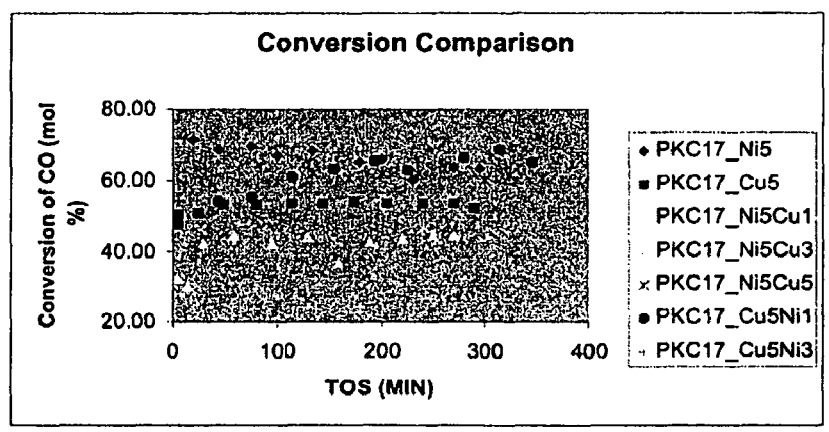
FIG. 17 is a graph showing the conversion of CO on bifunctional catalysts for WGS activity, at $W/F_{A0(CO)}=0.014$ Kg(cat)-s-mmol$^{-1}$, temperature=400° C.
Figure 18:
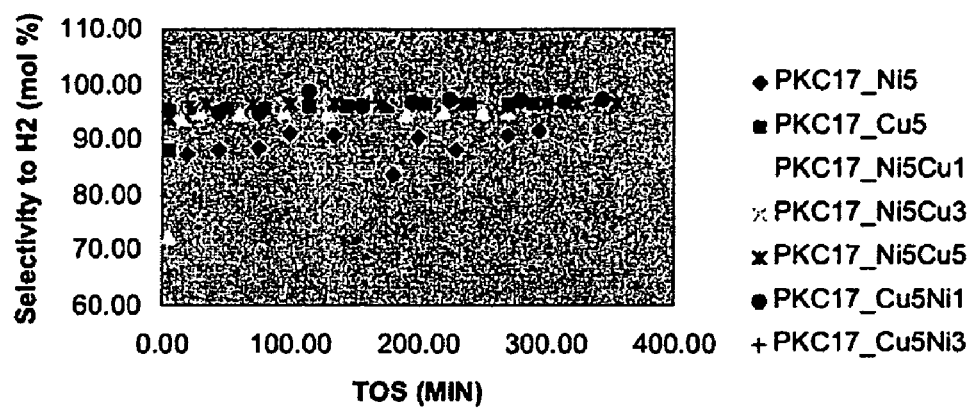
FIG. 18 is a graph showing selectivity to $H_2$ on bi-functional catalysts for WGS activity, at $W/F_{A0(CO)}=0.014$ Kg(cat)-s-mmol$^{-1}$, temperature=400° C.
Figure 19:
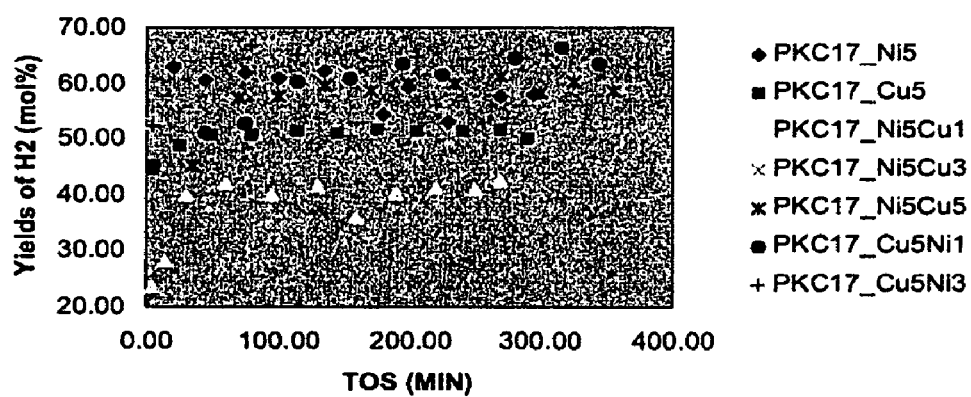
FIG. 19 is a graph showing yields to $H_2$ on bifunctional catalysts for WGS activity, at $W/F_{A0(CO)}=0.014$ Kg(cat)-s-mmol$^{-1}$, temperature=400° C.

It can be seen that the bi-functional catalysts thus prepared are more active compared to the mono-functional catalysts even though certain compositions give better conversions of CO and selectivity to $H_2$ compared to others, which means the bifunctional metals act as better catalysts. In fact, the X-ray diffraction patterns (FIG. 16) of the best catalysts showed that species such as Ni(5)Cu(3)-[$Ce_{0.70}Zr_{0.30}$]$O_2$ and Ni(3)Cu(5)-[$Ce_{0.70}Zr_{0.30}$]$O_2$ are remarkably similar to support PKC17. The X-ray diffraction patterns show that there is no crystallite formation of either Cu or Ni on the support, which indicates monolayer formation of the metals deposited. A comparison of the conversion, selectivity and yields on PKC 17 catalysts with respect to time on stream (TOS) are presented in FIGS. 17, 18 and 19 respectively.

The conversion of CO seems to be connected with the nickel content in the catalyst but only at a certain conversion. For example, Ni(5)-Cu(1) gives the lowest conversion among all. This indicates that the amount of metal loading is a factor to consider when preparing a bi-functional catalyst on Ce—Zr support.

On the other hand, the selectivity to hydrogen appears to depends on Cu. As one can see the Ni only containing catalyst gives the lowest selectivity, which improves upon Cu addition. This fact is also corroborated on other Ce—Zr compositions. However, it was only at certain bifunctional concentration that the selectivity to hydrogen is at its best. Interestingly, the catalyst Ni(3)Cu(5)-[Ce$_{0.70}$Zr$_{0.30}$]O$_2$, which is found to be better, has no crystallite formation of either of the metals, which in turn, implies the presence of a monolayer of the metals without forming any clusters or aggregation.

The yields, which are a function of both conversion and selectivity, were best on Ni(3)Cu(5)-[Ce$_{0.70}$Zr$_{0.30}$]O$_2$, although the other Cu containing catalysts also gave comparative performances. Based on these results, under the established reaction conditions, it can be concluded that the bi-functional catalyst formulation is an efficient way to improve the selectivity to hydrogen as well as the conversion of CO under water-gas shift reaction conditions.

Discussion 10: Effect of Temperature

The aim of the present work is to develop a high temperature water-gas shift catalyst. WGSR is an exothermic reaction. High temperature should be favourable to the rate. However, this reaction is also limited by equilibrium at high temperatures. The reduced equilibrium at high temperature is overcome by product removal by any method, for example, membrane separation. Accordingly, the efficiency of the catalyst developed and tested at high temperature is an important consideration. Only the best catalysts (using all the criteria of performance) under established reaction conditions were used for the high temperature test. A summary of the results at high temperature is presented in Table 6.

The effect of temperature on conversion can be observed from the results presented in Table 6. Methane formation was escalated at the same loading of nickel at high temperature (500° C.) compared to 400° C. This suggests that nickel alone is a methanation catalyst at high temperature. Copper also produced methane at 500° C. but to a lesser extent (200 ppm). The bi-functional system on the other hand also produced methane depending on the nickel content. The lowest average methane production (60 ppm) was observed at 400° C. with the catalyst formula of Ni(3)Cu(5)-[Ce$_{0.70}$Zr$_{0.30}$]O$_2$. This is consistent with the XRD result where no metal crystallite formation on the surface of the support was observed. The bi-functional catalysts having the formula of Ni(3)Cu(5)-[Ce$_{0.70}$Zr$_{0.30}$]O$_2$ and Ni(5)Cu(3)-[Ce$_{0.70}$Zr$_{0.30}$]O$_2$, were found to have very similar activity at 500° C. although conversion was relatively higher for Ni(5)Cu(3)-[Ce$_{0.70}$Zr$_{0.30}$]O$_2$, as expected, at the expense of methane production. In general, the activity at 500° C. was better than at 400° C., but at 600° C., the conversion dropped, meaning the optimum temperature should be less than 600° C. Selectivity to hydrogen was very similar in all catalyst systems. On the other hand, a similar metal loading on a support with higher zirconia content had some effect in methane mitigation at high temperature, although there was not much difference in the conversion and selectivity. This implies that zirconia has a role to play in the support, especially for methane mitigation. The conversion at lower temperature, for example at 400° C., seems to be dependent on the Ce:Zr composition as is seen in Table 6. The higher zirconia containing (meaning 0.7-0.6) catalysts seem to perform better than those with lower contents (e.g. 0.5). However, at higher temperatures there was not much difference in conversion. Based on these studies a zirconia content in the range of 0.5-0.7 appears to be optimum for relatively higher temperature studies of WGSR on ceria-zirconia supported catalysts. At relatively low temperatures (300° C.), the conversion was low suggesting that these catalysts work better at high temperatures, for example between 400-650° C. Even at 700° C. the catalysts showed remarkable activity with very high selectivity, which reflects the fact that these catalysts are excellent candidates for a high temperature WGSR. Methane formation was reduced dramatically to 40 ppm at 700° C., indicating that steam reforming of methane was taking place, as expected at 700° C. The ceria-zirconia catalysts with molar composition of cerium in the range of 0.5-0.7 seems to be optimum. Further, ceria-zirconia with molar composition of 0.5 each, along with a bi-functional metal comprising 5% Cu and 3% Ni was found to be the optimum at the high temperatures, under the present conditions.

Discussion 11: Effect of Reformate as Feed

Figure 20:
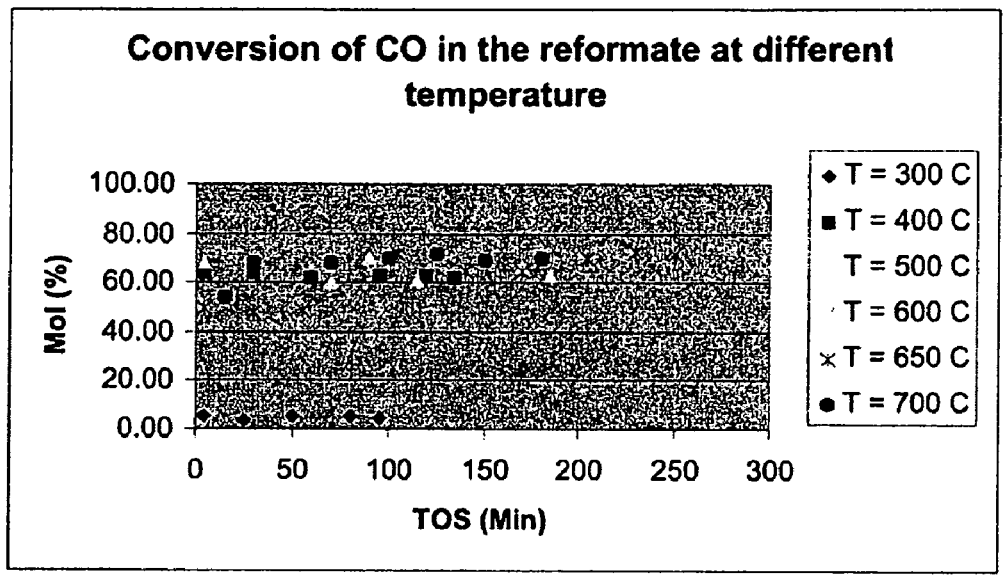
FIG. 20 is a graph showing the conversion profile of CO in reformate at different temperatures in presence of water, at $W/F_{A0(CO)}=0.014$ Kg(cat)-s-mmol$^{-1}$ for the catalyst Ni(3)Cu(5)-[$Ce_{0.50}Zr_{0.50}]O_2$.

It was envisaged that the catalysts of the present invention could be utilized in a process which is part of a CO clean up system downstream of a dry-reformer. The reformate coming immediately after a dry reformer will contain CO along with other gases generally found in such streams. Such gases consist primarily of hydrogen, methane, nitrogen and carbon dioxide. The irreversible reduction of supports materials leading to the deactivation of the catalyst in such environments has been previously reported [5]. It is expected that the catalysts of the present invention should work ideally in such environments. A reformate gas having a composition (in mol %) of H$_2$=2.4%, CO=24%, CH$_4$=2.1%, CO$_2$=1.5% and N$_2$=70% was therefore tested under the same reaction conditions established above for the catalyst Ni(3)Cu(5)-[Ce$_{0.50}$Zr$_{0.50}$]O$_2$ at temperatures ranging from 300 to 700° C. The results are shown in FIG. 20 in which a comparison of the conversion of CO present in reformate is presented at different temperatures.

Figure 21:
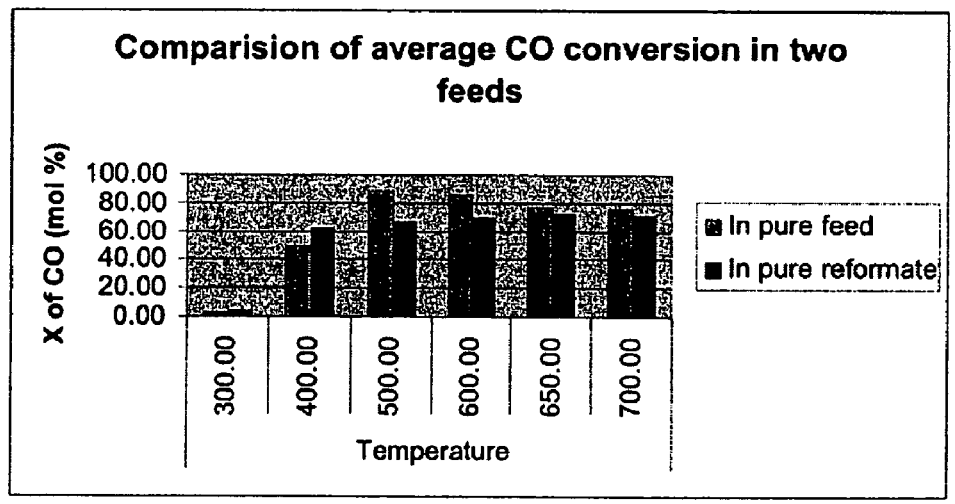
FIG. 21 is a bar graph showing a comparison profile of CO conversion in two different feeds at different temperatures in presence of water, at $W/F_{A0(CO)}=0.014$ Kg(cat)-s-mmol$^{-1}$ for the catalyst Ni(3)Cu(5)-[$Ce_{0.50}Zr_{0.50}]O_2$.
Figure 22:
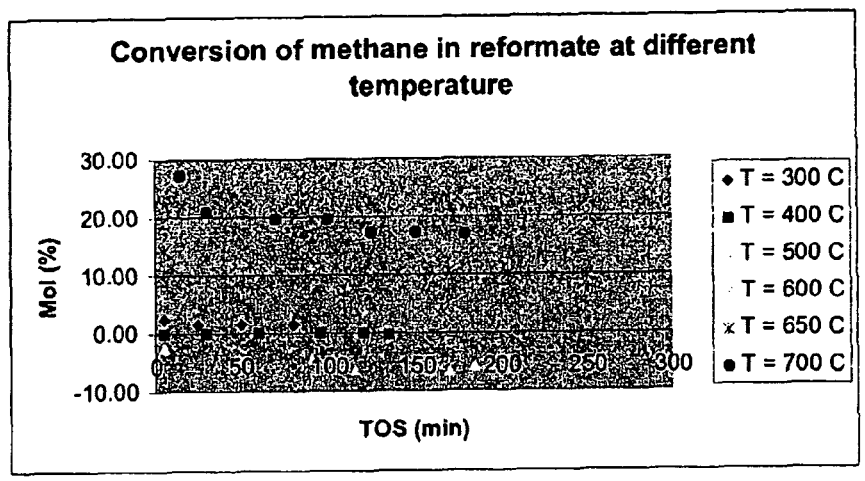
FIG. 22 is a bar graph showing a comparison profile of $CH_4$ conversion in reformate at different temperatures in presence of water, at $W/F_{A0(CO)}=0.014$ Kg(cat)-s-mmol$^{-1}$ for the catalyst Ni(3)Cu(5)-[$Ce_{0.50}Zr_{0.50}]O_2$.

The CO conversion in reformate increased with temperature as expected. The catalyst performed excellently at temperatures in the range of 400-700° C. A comparison of the same catalyst which was tested under similar conditions with pure CO is presented in FIG. 21. The average conversion of CO was very comparable in both cases which means that the catalyst is active under reformate conditions as well. Generally, the Ni based catalyst produces methane at high temperature however, the presence of methane in reformate would inhibit the formation of methane at high temperature due to thermodynamics and the occurrence of steam reforming of methane. That is, a part of the catalyst is being used for steam reforming of methane at high temperature in the presence of reformate resulting in slightly lower conversion of CO as compared to the situation when only CO was present in the feed. However, the aggregate conversion involving the sum of both CO conversion and methane conversion in the reformate system was better or the same as the CO conversion in the pure CO system. The bi-functional catalysts developed were not producing methane as can be seen in FIG. 22 where it can be seen that there was no methane formation at temperatures between 600-700° C. However, we have observed some methane formation at temperatures 400-500° C. At 400° C., methane formation was very small compared to at 500° C. This implies that the catalyst of the present invention are suitable for use in a temperature range between 600-700° C. without any methane formation in the presence of reformate. This makes these catalysts very suitable for combining the WGSR of reformate gas downstream of a dry reforming unit in which the exothermic heat of the WGSR is used at the same temperature (between 600-700° C.) as the dry reforming unit to supply the endothermic heat required for the latter reaction.

(B) Catalysts for Carbon Dioxide Reforming Reaction (i) Catalyst Preparation

Except the $Ni/ZrO_2$, which was prepared by co-precipitation, all Ni based catalysts were prepared by wet impregnation of aqueous solutions of $Ni(NO_3)_2.6H_2O$ onto supports in specified concentrations. The resulting solution was stirred at room temperature for 24 h and the water evaporated using a rotary evaporator at 70° C. and dried in an oven at 110° C. overnight. The samples were then calcined in flowing air at 650° C. for 5 h.

(ii) Support Preparation

Supports were prepared by a variety of methods summarized below:

a) 3.8 mol % $CeO_2$—$ZrO_2$ (Alcogel) and $Ce_xZr_{1-x}O_2$ (Alcogel), $ZrO_2$ (Hydrogel), $ZrO_2$ (Alcogel) and $Ni/ZrO_2$ (Co-Precipitation)

Figure 23:
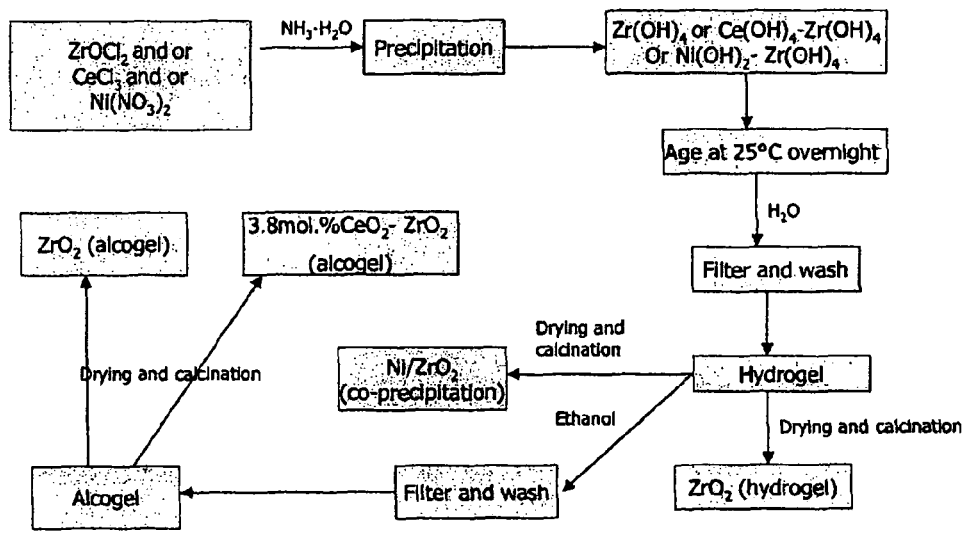
FIG. 23 is schematic showing the procedures for synthesis of $ZrO_2$ (alcogel), 3.8 mol. % $CeO_2$—$ZrO_2$ (alcogel), $Ce_xZ_{1-x}O_2$ (alcogel) and Ni/$ZrO_2$ (co-precipitation) for the CDR catalysts.

The synthesis of 3.8 mol. % $CeO_2$—$ZrO_2$ (alcogel) and $Ce_xZr_{1-x}O_2$ (alcogel), $ZrO_2$ (hydrogel), $ZrO_2$ (alcogel) and $Ni/ZrO_2$ (co-precipitation) followed the procedure shown in FIG. 23.

$ZrO_2$ (hydrogel) was prepared by addition of a certain volume of $ZrOCl_2$ solution to 2.5 wt % aqueous ammonia under vigorous stirring with careful control of pH=10. The precipitated $Zr(OH)_4$ hydrogel was stirred for another 2 h and then left to age overnight at room temperature. The resulting gel was filtered and washed with deionized water until it was free of Cl⁻ ions. The "wet cake" was divided into two parts. The first part was dried in an oven at 110° C. overnight and then calcined in flowing air at 650° C. for 5 h to obtain $ZrO_2$ (hydrogel). In order to obtain $ZrO_2$ (alcogel), the other part was washed with ethanol and filtered several times to convert $Zr(OH)_4$ hydrogel into $Zr(OH)_4$ alcogel. The resulting $Zr(OH)_4$ alcogel was dried in flowing nitrogen at 270° C. overnight and then calcined in flowing air at 650° C. for 5 h to obtain $ZrO_2$ (alcogel).

3.8 mol. % $CeO_2$—$ZrO_2$ (alcogel) and $Ce_xZr_{1-x}O_2$ (alcogel) were prepared by co-precipitation. Pre-determined amounts of $CeCl_3.7H_2O$ (Aldrich) and $ZrOCl_2.8.33H_2O$ (Aldrich) were used to make an aqueous solution and the solution was added to a 2.5 wt. % ammonia water to make a co-precipitate of $Ce(OH)_4$—$Zr(OH)_4$. The co-precipitate was then washed with ethanol and filtered several times to convert $Ce(OH)_4$—$Zr(OH)_4$ hydrogel into $Ce(OH)_4$—$Zr(OH)_4$ alcogel. The resulting $Ce(OH)_4$—$Zr(OH)_4$ alcogel was dried in flowing nitrogen at 270° C. overnight and then calcined in flowing air at 650° C. for 5 h to obtain 3.8 mol. % $CeO_2$—$ZrO_2$ (alcogel) or $Ce_xZr_{1-x}O_2$ (alcogel).

Figure 24:
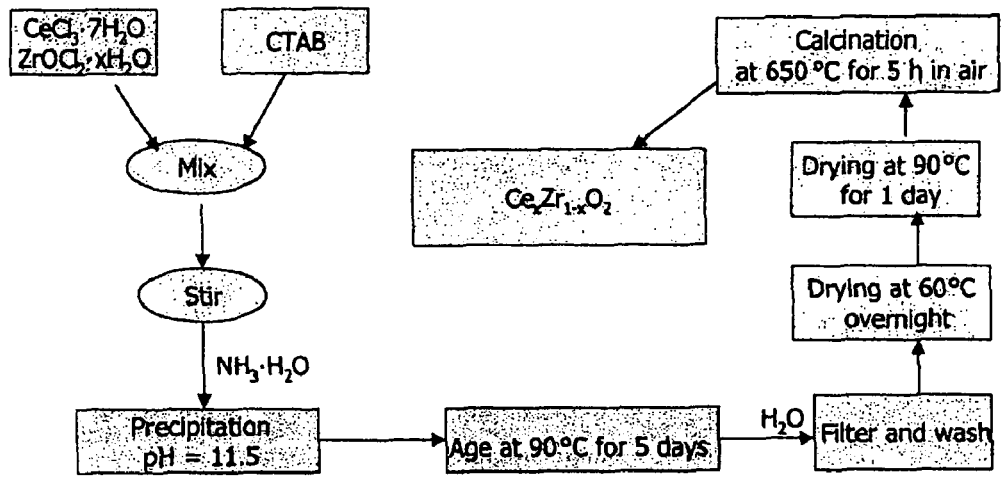
FIG. 24 is a schematic showing the procedures for synthesis of $CeO_2$ (CTAB) and $Ce_xZr_{1-x}O_2$ supports for the CDR catalysts.

$Ni/ZrO_2$ (co-precipitation) catalyst was synthesized by the co-precipitation technique. A pre-determined amount of $Ni(NO_3)_2$ and $ZrOCl_2$ was used to make an aqueous solution and the solution was dropped into a 2.5 wt. % ammonia water under vigorous stirring to make a co-precipitate of $Ni(OH)_2$—$Zr(OH)_4$. This co-precipitate was stirred for 2 h, followed by aging at 25° C. overnight. Then, the resulting precipitate was washed with deionized water until it was free of Cl⁻ ions. The above precursor was dried in an oven at 110° C. overnight and then calcined in flowing air at 650° C. for 5 h.

b) $Ni/ZrO_2$ Using Commercial $ZrO_2$ Support $Ni/ZrO_2$ catalyst using commercial $ZrO_2$ support was prepared by wet impregnation of commercial zirconia (Aldrich, 99.9%) calcined in flowing air at 800° C. for 6 h, using an aqueous solution of nickel nitrate as a precursor in the desired concentration. The resulting solution was stirred at room temperature for 24 h, the water evaporated at 100° C. and dried in an oven at 110° C. overnight. The sample was then calcined in flowing air at 650° C. for 5 h.

c) $CeO_2$ and $Ce_xZr_{1-x}O_2$ Supports $CeO_2$ (CTAB) and a series of $Ce_xZr_{1-x}O_2$ (CTAB) supports were prepared by following the procedures shown in FIG. 24. Starting compositions had Ce/Zr (mol %) of 100/0, 92/8, 85/15, 78/22, 68/32, 50/50, 40/60 and 60/40. A series of $CeO_2$—$ZrO_2$ solid solutions were prepared by reaction of a cationic surfactant with the hydrous mixed oxide produced by co-precipitation under basic conditions. In a standard experiment, the materials were prepared by adding an aqueous solution of appropriate concentrations of cetyltrimethylammonium bromide, $C_{16}$ (0.1 M, Aldrich) to an aqueous solution containing stoichiometric quantities of $CeCl_3.7H_2O$ (Aldrich) and $ZrOCl_2.8.33H_2O$ (Aldrich) ([Ce]+[Zr]=0.1 M). The mixture was stirred for 40 min and then aqueous ammonia (28~30%) was added drop-wise under vigorous stirring until the pH reached 11.5. The mixture was stirred for 2 h in a glass reactor, then sealed and placed in an oven at 90° C. for 5 days. After that, the mixture was filtered and washed with hot water until it was free of chlorine. The light-yellow powder was dried at 90° C. for 1 day and then calcined at 650° C. for 5 h.

(iii) Catalyst Characterization a) BET

The BET surface areas of the samples were measured using the nitrogen adsorption technique at ~196° C. with a Micromeritics ASAP 2010 instrument. The samples were degassed at 200° C. for 8 h before the adsorption measurement.

b) XRD

The crystal structure of catalysts were evaluated by the powder X-ray diffraction (XRD) technique using Bruker D8 Discover with GADDS X-ray Diffractometer using Cu—Kα radiation (λ=1.5418 Å) at 40 kV and 40 mA, and collecting the diffractogram from 2θ in the range of 20~82 with a 0.05° step size.

c) TPR

The Temperature Program Reduction (TPR) analyses were conducted for the calcined catalysts using Quantachrome equipment (ChemBET 300, made by Quantachrome Corporation, FL, USA). A catalyst sample of about 0.15 g was loaded in a U shaped glass tube. The sample was then degassed for 2 h at 200° C. on an electric furnace and then heated from room temperature to 1100° C. at a linearly programmed rate of 15° C./min. at atmospheric pressure in a reduction gas stream of 5% $H_2$ with balanced $N_2$ (obtained from Praxair, Canada) at a flow rate of 80 ml/min. The TPR profile is plotted using an on-line data acquisition system.

(iv) Catalyst Activity Testing

Figure 25:
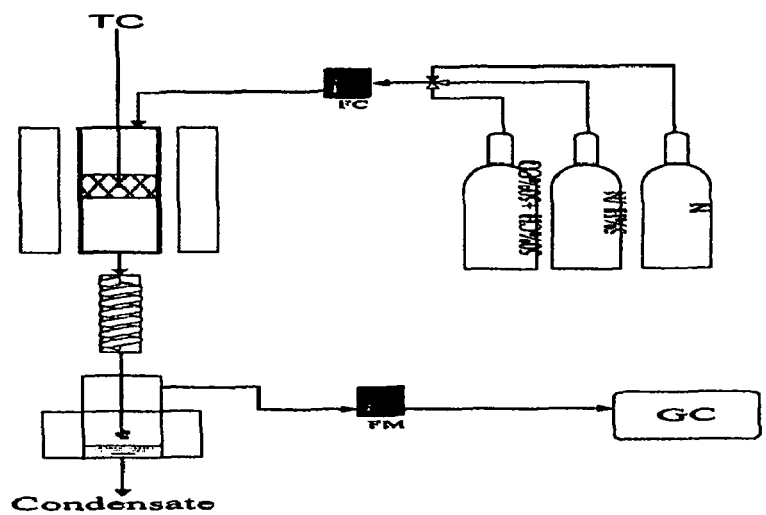
FIG. 25 is a schematic drawing of a fixed bed tubular reactor experimental set-up used for CDR catalysts activity testing.

The experiments were conducted in a fixed bed reactor system as shown in FIG. 25. The reforming reaction was performed in a fixed bed reactor consisting of a stainless steel tube with an inner diameter of 1.27 cm and the length of 47 cm. In each run, 0.15 g of calcined catalysts (50~70 mesh) diluted with 17.8 g quartz sand (50~70 mesh, Aldrich), which is inert under the reaction conditions, was loaded into the reactor. Prior to reaction, the catalyst was reduced in situ in 5% $H_2/N_2$ (200 ml/min) at 710° C. for 3 h, purged by flowing $N_2$ (80 ml/min.) and then cooled down to 700° C. in $N_2$. The reactions were performed at 700° C. with a $CH_4$:$CO_2$ ratio of 1:1 and a flow rate of $3.76 \times 10^4$ ml/(h·g-cat). The outlet gas was cooled by ice water and analyzed by an on-line gas chromatograph (Agilent Technologies 6890N Network GC system made in USA), equipped with a thermal conductivity detector, a Hayessep Q column and a molecular sieve 13× column, which allowed for separation of $H_2$, CO, $CO_2$ and $CH_4$. The carrier gas used was helium. Calibration of the GC using varying ratios of the reactants and products resulted in a mol/area ratio for each gas. The activity of the catalysts was evaluated by the following parameters a. $\text{Conversion}(CH_4)\% = \dfrac{(CH_4)\text{in} - (CH_4)\text{out}}{(CH_4)\text{in}} \times 100$ b. $\text{Yeild}(H_2)(\%) = \dfrac{(H_2)\text{out}}{2 \times (CH_4)\text{in}} \times 100$ c. $\text{Selectivity of } H_2(\%) = \dfrac{(H_2)\text{out}}{(CH_4)\text{in} - (CH_4)\text{out}} \times \dfrac{100}{2}$ (v) Activity Evaluation Test Results of $MA_xB_{1-x}O_2$ Catalysts and Discussion (a) $Ni/ZrO_2$ Catalysts $ZrO_2$ has been frequently reported to be a unique support for a number of catalyst systems in various catalytic reactions because it has a high thermal stability as a catalyst support and has both acid and basic properties. Hence, $Ni/ZrO_2$ catalysts were first investigated using a variety of preparation methods for synthesis of the $ZrO_2$ support.

(b) Characterization of $Ni/ZrO_2$ Catalysts

Table 7 summarizes surface area, pore volume and pore diameters of $ZrO_2$ supports and $Ni/ZrO_2$ catalysts from different preparations. All the samples were calcined in flowing air at 650° C. for 5 h before measurement except the commercial $ZrO_2$ which was calcined at 800° C. for 6 h. The results in Table 7 clearly suggest that the preparation method of $ZrO_2$ support has a strong effect on the surface area, pore volume and pore size of $ZrO_2$ samples. The preparation method of $ZrO_2$ (alcogel) gives a large BET surface area of $ZrO_2$. In addition, the surface areas of catalysts were reduced to different extents after Ni was loaded into the support.

(c) Catalytic Activity of $Ni/ZrO_2$ Catalysts for $CO_2$ Reforming of Methane

Figure 26:
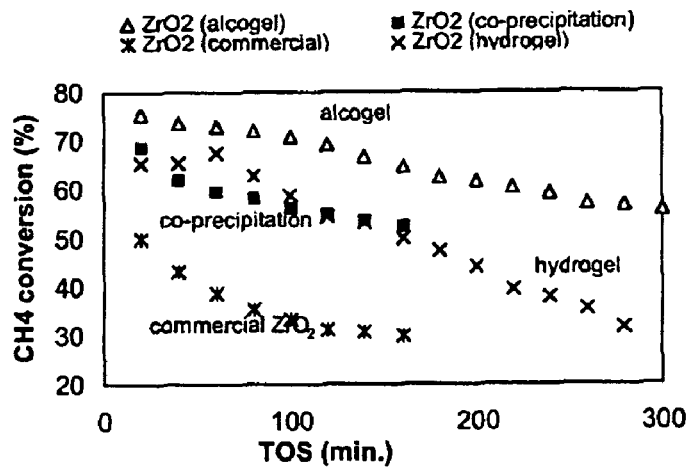
FIG. 26 is a graph showing the effect of $ZrO_2$ preparation methods on $CH_4$ conversion over 13 wt. % Ni/$ZrO_2$ catalysts for CDR at 700° C. with a feed ($CH_4/CO_2$=1:1) rate of $3.76 \times 10^4$ ml/(h·g-cat).
Figure 27:
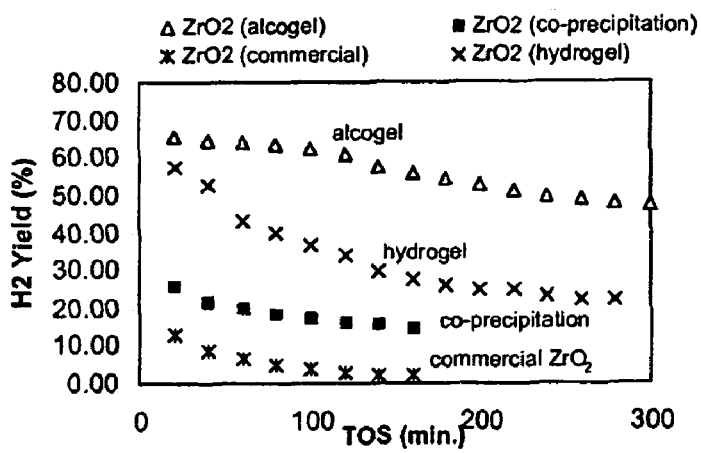
FIG. 27 is a graph showing the effect of $ZrO_2$ preparation methods on $H_2$ yield over 13 wt. % Ni/$ZrO_2$ catalysts for CDR at 700° C. with a feed ($CH_4/CO_2$=1:1) rate of $3.76 \times 10^4$ ml/(h·g-cat).
Figure 28:
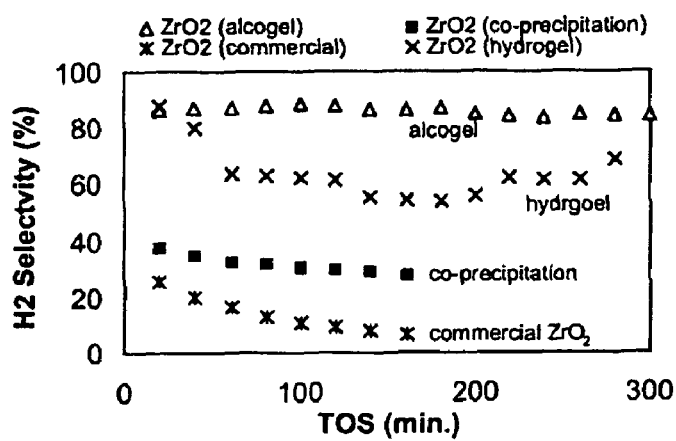
FIG. 28 is a graph showing the effect of $ZrO_2$ preparation methods on $H_2$ selectivity over 13 wt. % Ni/$ZrO_2$ catalysts for CDR at 700° C. with a feed ($CH_4/CO_2$=1:1) rate of $3.76 \times 10^4$ ml/(h·g-cat).
Figure 29:
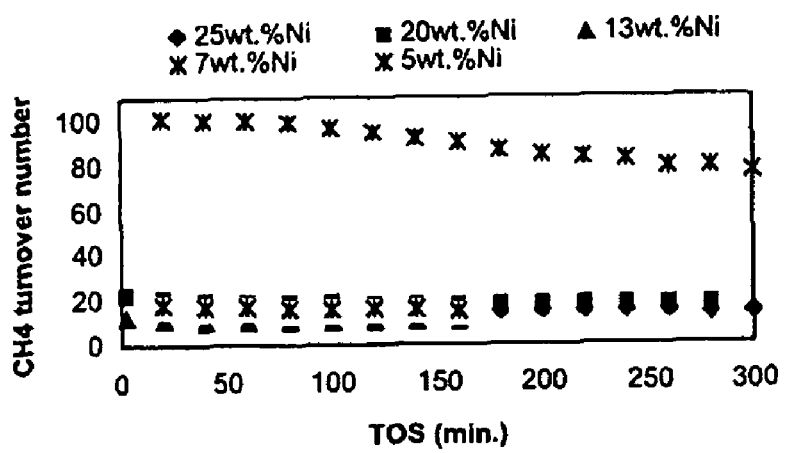
FIG. 29 is a graph showing the effect of Ni loading on catalyst activity over Ni/$ZrO_2$ (alcogel) catalysts for CDR at 700° C. with a feed ($CH_4/CO_2$=1:1) rate of $3.76 \times 10^4$ ml/(h·g-cat).

Catalytic activity of $Ni/ZrO_2$ catalysts was evaluated by $CH_4$ conversion, $H_2$ yield and $H_2$ selectivity. At first, 13 wt % $Ni/ZrO_2$ catalysts were tested for CDR and the results are shown in FIGS. 26-29. FIG. 26 shows that $Ni/ZrO_2$ (alcogel) catalyst has the highest $CH_4$ conversion and stability among the $Ni/ZrO_2$ catalysts. However, its activity still decreases with time on stream. FIG. 27 shows that $Ni/ZrO_2$ (alcogel) catalyst has the highest $H_2$ yield as well as stability among the $Ni/ZrO_2$ catalysts. However, this also decreases with time on stream. FIG. 28 shows $Ni/ZrO_2$ (alcogel) catalyst has the highest $H_2$ selectivity and stability among the $Ni/ZrO_2$ catalysts. These results indicate that the catalytic activity and stability of $Ni/ZrO_2$ catalyst depends largely on the catalyst preparation method, in particular on the preparation of the support. $ZrO_2$ (alcogel) is the best catalyst support of $Ni/ZrO_2$ catalysts so far tested in the present experiments for CDR. Also, the effect of Ni loading of $Ni/ZrO_2$ (alcogel) was evaluated in terms of turnover number (TON) for $CH_4$ conversion (TON). The results are plotted in FIG. 29. The results show that the 5 wt. % $Ni/ZrO_2$ (alcogel) catalyst had the largest TON compared to the other nickel loadings. This indicates that a nickel loading of 5 wt. % on $ZrO_2$ (alcogel) is sufficient to obtain a high initial activity.

In summary, the preparation methods of $ZrO_2$ affect activity and stability of $Ni/ZrO_2$ catalysts. Among the tested $Ni/ZrO_2$ catalysts, $Ni/ZrO_2$ (alcogel) catalyst showed the highest stable activity and had the best resistance to deactivation. However, deactivation was not completely eliminated since its activity still declined with time on stream. In addition, 5 wt. % $Ni/ZrO_2$ (alcogel) catalyst was the most effective among the Ni loadings used in the $Ni/ZrO_2$ (alcogel) catalysts.

(d) Ni/3.8 mol. % $CeO_2ZrO_2$ (Alcogel) Catalyst

In order to improve the stability of $Ni/ZrO_2$ catalysts, 3.8 mol % $CeO_2$ was added to $ZrO_2$ support using a sol-gel method and this led to the preparation of the Ni/3.8 mol % $CeO_2$—$ZrO_2$ catalyst. The effect of the addition of Ce into $ZrO_2$ (alcogel) on structure and catalytic activity of catalysts was then investigated.

(e) Characterization of Ni/3.8 mol. % $CeO_2ZrO_2$ (Alcogel) Catalyst

BET

Table 8 summarizes the BET surface area, pore volume and pore average diameters of $ZrO_2$ (alcogel), 3.8 mol. % $CeO_2$—$ZrO_2$ (alcogel), $CeO_2$ (CTAB) and their 5 wt % Ni catalysts. All the samples were calcined in air at 650° C. for 5 h before the measurements were made. The data in Table 8 indicate that the addition of 3.8 mol % $CeO_2$ into $ZrO_2$ (alcogel) using the sol-gel method increases the BET surface area of the support from 56.3 to 60.3 ($m^2/g$). The BET surface areas of catalysts were reduced to different extents after 5 wt. % Ni was loaded into the supports.

XRD

Figure 30:
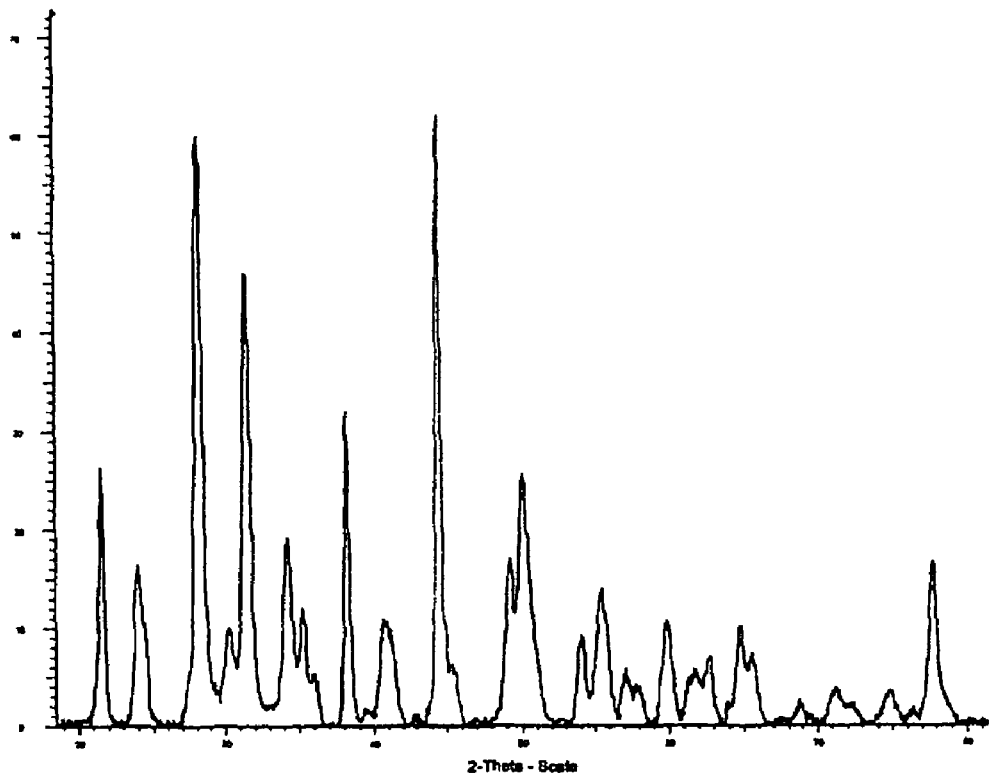
FIG. 30 shows XRD patterns of $ZrO_2$ (alcogel) with monoclinic structure after calcination at 650° C. for 5 h.
Figure 31:
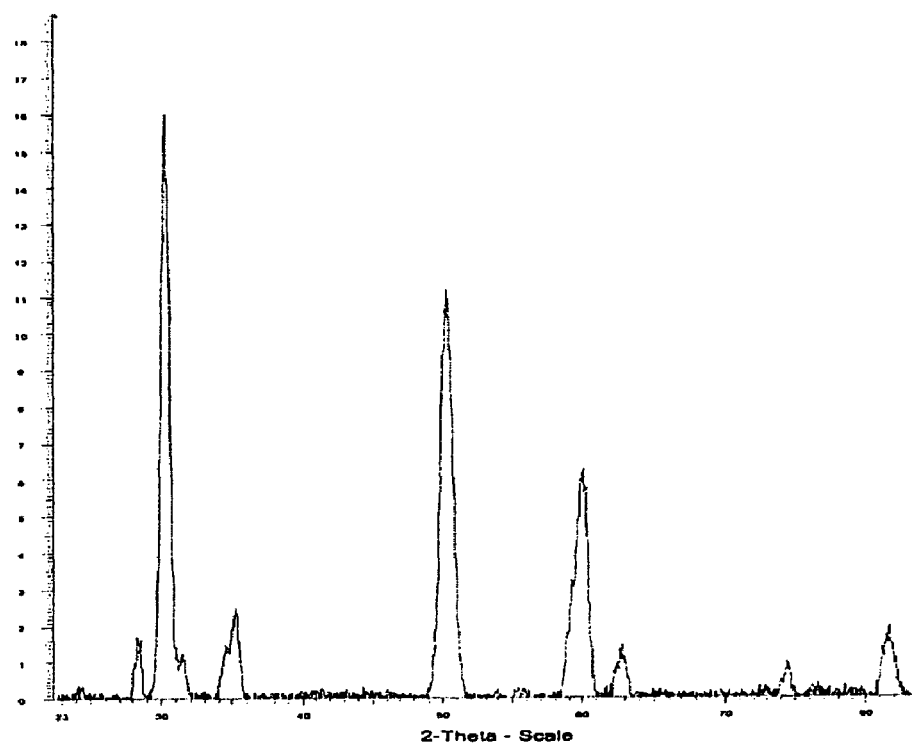
FIG. 31 shows XRD patterns of 3.8 mol. % $CeO_2$—$ZrO_2$ (alcogel) with tetragonal structure after calcination at 650° C. for 5 h.

The XRD patterns of $ZrO_2$ (alcogel) and 3.8 mol. % $CeO_2$—$ZrO_2$ (alcogel) are shown in FIG. 30 and FIG. 31, respectively. When the XRD pattern of 3.8 mol. % $CeO_2$—$ZrO_2$ (alcogel) is compared with the XRD of $ZrO_2$ (alcogel), it is seen that the addition of 3.8 mol. % Ce into zirconia clearly changed the phase diagram of $ZrO_2$ (alcogel). $ZrO_2$ (alcogel) has monoclinic structure while 3.8 mol. % $CeO_2$—$ZrO_2$ (alcogel) possesses a tetragonal structure. The addition of 3.8 mol. % $CeO_2$ therefore stabilizes the tetragonal structure of $ZrO_2$, which would have changed to the monoclinic structure if heated in the absence of $CeO_2$ to 650° C. during calcinations and cooled to room temperature as is the case in FIG. 30 for pure $ZrO_2$.

Figure 32:
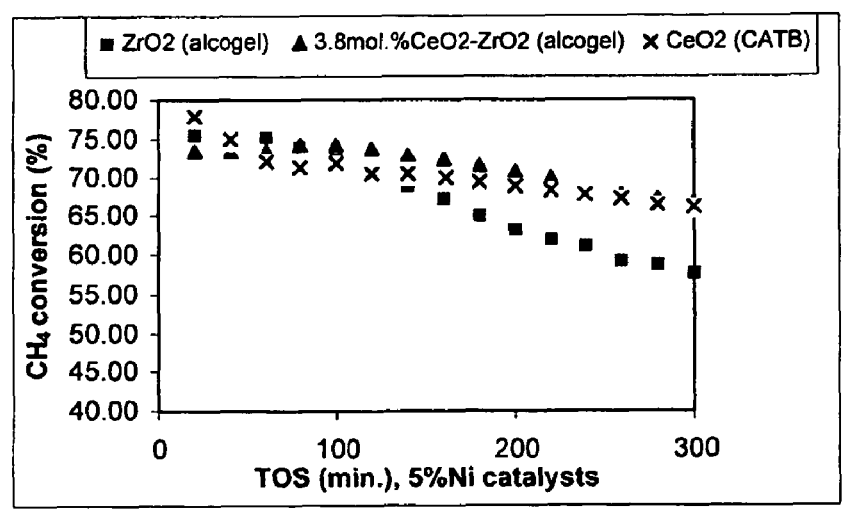
FIG. 32 is a graph showing the effect of the addition of Ce into $ZrO_2$ (alcogel) on $CH_4$ conversion over 5 wt. % Ni (alcogel) catalysts for CDR at 700° C. with a feed ($CH_4/CO_2$=1:1) rate of $3.76 \times 10^4$ ml/(h·g-cat).
Figure 33:
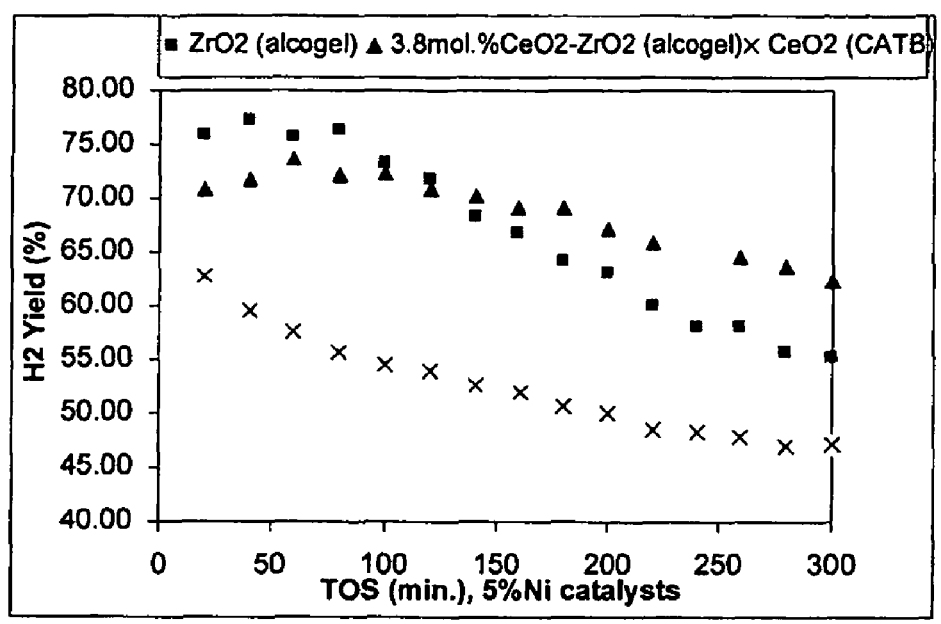
FIG. 33 is a graph showing the effect of the addition of Ce into $ZrO_2$ (alcogel) on $H_2$ yield over 5 wt. % Ni (alcogel) catalysts for CDR at 700° C. with a feed ($CH_4/CO_2$=1:1) rate of $3.76 \times 10^4$ ml/(h·g-cat).
Figure 34:
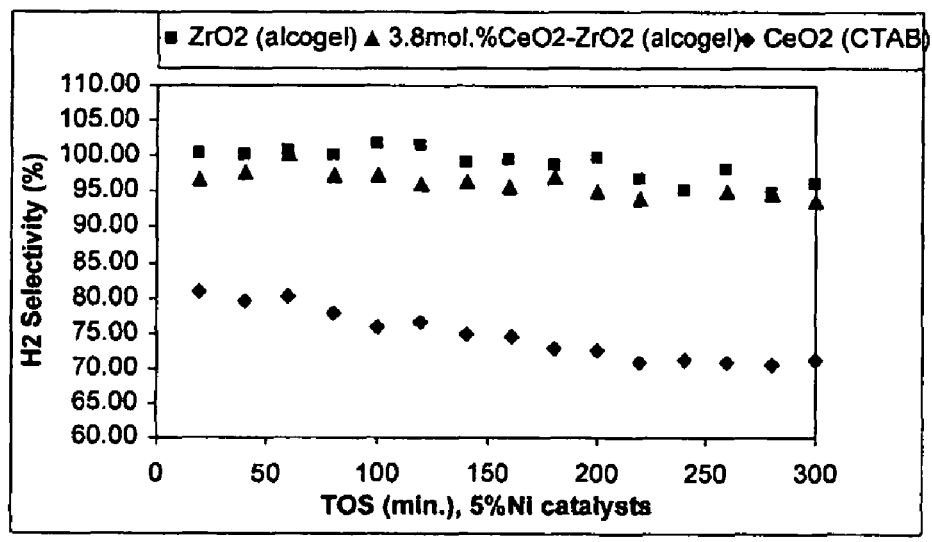
FIG. 34 is a graph showing the effect of the addition of Ce into $ZrO_2$ (alcogel) on $H_2$ selectivity over 5 wt. % Ni (alcogel) catalysts for CDR at 700° C. with a feed ($CH_4/CO_2=1:1$) rate of $3.76\times10^4$ ml/(h·g-cat).

(f) Catalytic Activity of Ni/3.8 mol. % $CeO_2$—$ZrO_2$ (Alcogel) and $Ni/CeO_2$ (CTAB) Catalysts for $CO_2$ Reforming of Methane In order to determine the effect of the addition of Ce into $ZrO_2$ (alcogel) on catalytic activity of $Ni/ZrO_2$ (alcogel) catalysts, the CDR activity results of 5 wt. % $Ni/ZrO_2$ (alcogel) and those of 5 wt. % Ni/3.8 mol. % $CeO_2$—$ZrO_2$ (alcogel) and 5% $Ni/CeO_2$ (CTAB) catalysts have been plotted in FIGS. 32-34. FIG. 32 and FIG. 33 indicate that the addition of 3.8 mol % $CeO_2$ into $ZrO_2$ (alcogel) can enhance the stability of both $CH_4$ conversion and $H_2$ yield of $Ni/ZrO_2$ (alcogel) catalyst. However, deactivation is not completely eliminated since the $CH_4$ conversion and $H_2$ yield over 5 wt % Ni/3.8 mol. % $CeO_2$—$ZrO_2$ (alcogel) catalyst still decline with time on stream. In contrast, 5 wt % $Ni/CeO_2$ (CTAB) catalyst exhibits a high $CH_4$ conversion at the early stage of the $CO_2$ reforming reaction, but the catalyst shows a deactivation behavior similar to that for 5 wt % Ni/3.8 mol % $CeO_2$—$ZrO_2$ (alcogel) catalyst as a function of the reaction time. FIG. 34 shows that the addition of 3.8 mol. % $CeO_2$ into $ZrO_2$ (alcogel) does not affect $H_2$ selectivity over $Ni/ZrO_2$ (alcogel) catalyst. However, 5 wt % $Ni/CeO_2$ (CTAB) catalyst exhibits the lowest $H_2$ selectivity.

In summary, the addition of 3.8 mol. % $CeO_2$ into $ZrO_2$ (alcogel) enhances the activity and stability of $Ni/ZrO_2$ (alcogel) catalyst, but this is not sufficient to completely eliminate deactivation as the activity of 5 wt. % Ni/3.8 mol. % $CeO_2$—$ZrO_2$ (alcogel) catalyst still declines with time on stream. Thus, 5 wt % $Ni/CeO_2$ (CTAB) is not an optimal catalyst for CDR.

(g) $Ni/Ce_xZr_{1-x}O_2$ Catalysts

The previous results have indicated that the addition of 3.8 mol. % $CeO_2$ into $ZrO_2$ (alcogel) can enhance the activity and stability of $Ni/ZrO_2$ (alcogel) catalyst, but the activity of 5 wt. % Ni/3.8 mol. % $CeO_2$—$ZrO_2$ (alcogel) catalyst still declines with time on stream. In order to further improve the stability of $Ni/ZrO_2$ catalysts larger concentrations of ceria were added into zirconia using the surfactant-assisted method (CTAB) to synthesize $Ce_xZr_{1-x}O_2$ supports and then the effect of the ratio of Ce:Zr in the $Ce_xZr_{1-x}O_2$ support on the structure and activity of $Ni/Ce_xZr_{1-x}O_2$ catalysts was investigated.

(h) Characterization of $Ni/Ce_xZr_{1-x}O_2$ (CTAB) Catalysts

BET

A series of $Ce_xZr_{1-x}O_2$ supports were prepared using the surfactant-assisted method (CTAB). The BET surface areas and pore size of supports and catalysts were measured by nitrogen adsorption. The results are given in Table 9, which summarizes the BET surface areas, pore volumes and average pore diameters. All samples were calcined in flowing air at 650° C. for 5 hours before the measurements. It is seen that the series of oxides show similar textural properties. Their high surface areas are associated with their appreciable pore volume and small average pore diameters. In comparison with their corresponding $Ce_xZr_{1-x}O_2$ supports, the surface areas of catalysts loaded with 5 wt. % Ni decreased to some extent.

While not wishing to be limited by theory, it appears that the high BET surface areas of $Ce_xZr_{1-x}O_2$ materials relate to the surfactant effect that reduces the surface tension inside the pores by decreasing capillary stress during drying and calcinations processes. Better thermal stability is related to the structural arrangement and the morphology of the inorganic-organic composites which are produced by an exchange between the deprotonated hydroxyl group of the oxides and the alkyl ammonium cation upon drying and calcinations. These features also contribute to the enhanced textural stability of these materials in comparison with those prepared by the conventional precipitation methods. The high surface area of $Ce_xZr_{1-x}O_2$ (CTAB) materials is beneficial for obtaining high oxygen storage capacity (OSC) because the OSC is basically limited to the surface.

XRD

Figure 35:
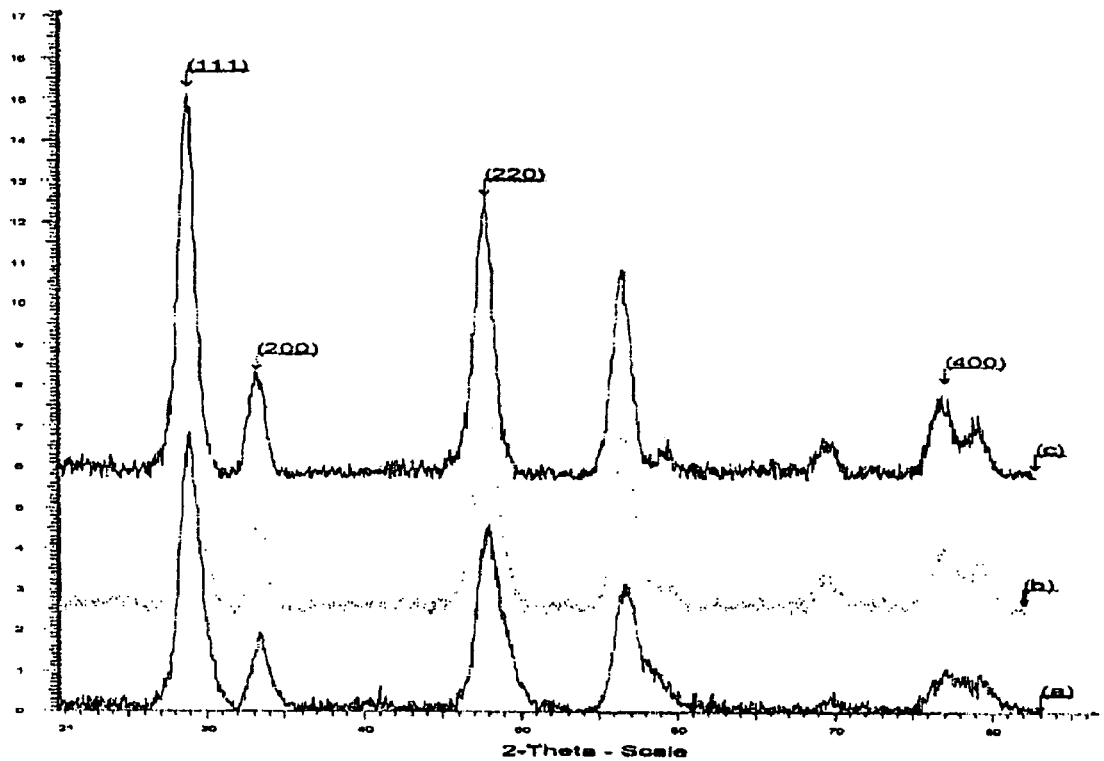
FIG. 35 shows XRD patterns of $Ce_xZr_{1-x}O_2$ (CTAB) after calcination at 650° C. for 5 h. a. $Ce_{0.6}Zr_{0.4}O_2$, b. $Ce_{0.78}Zr_{0.22}O_2$, c. $Ce_{0.92}Zr_{0.08}O_2$.

The XRD patterns of $Ce_xZr_{1-x}O_2$ (CTAB) (a:x=0.6, b:x=0.78, c:x=0.92) solid solution after calcinations at 650° C. for 5 hours are shown in FIG. 35. The patterns indicate the presence of a true mixed-oxide phase with cubic fluorite structure and show reflections corresponding to (111), (200), (220), (311), (222) and (400) planes. There is no indication of the presence of other phases such as $ZrO_2$ or $CeO_2$. This also is indicative of the fact that Ce and Zr ions are homogeneously mixed. When x changes from 0.40 to 0.92 in $Ce_xZr_{1-x}O_2$ (CTAB) the XRD pattern has a little shift in the reflections for all peaks toward higher angles due to the insertion of $Zr^{4+}$ ions in the lattice of $CeO_2$, but all XRD patterns clearly show the presence of cubic $Ce_xZr_{1-x}O_2$ (CTAB). The cubic phase of Ce—$ZrO_2$ has more oxygen capacity and is more easily reducible than the tetragonal phase. Also, it has been demonstrated that Ni loading does not affect the structure of $Ce_xZr_{1-x}O_2$ (CTAB).

Figure 36:
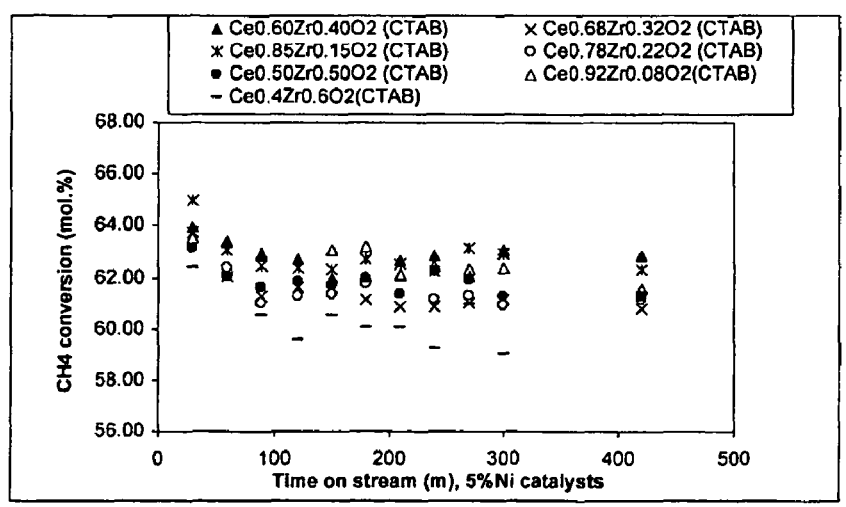
FIG. 36 is a graph showing the effect of the ratio of Ce:Zr in $Ce_xZr_{1-x}O_2$ (CTAB) support on $CH_4$ conversions over 5 wt. % $Ni/Ce_xZr_{1-x}O_2$ (CTAB) catalysts for CDR at 700° C. with a feed ($CH_4:CO_2:N_2=2:2:1$) rate of $4.70\times10^4$ ml/(h·g-cat).
Figure 37:
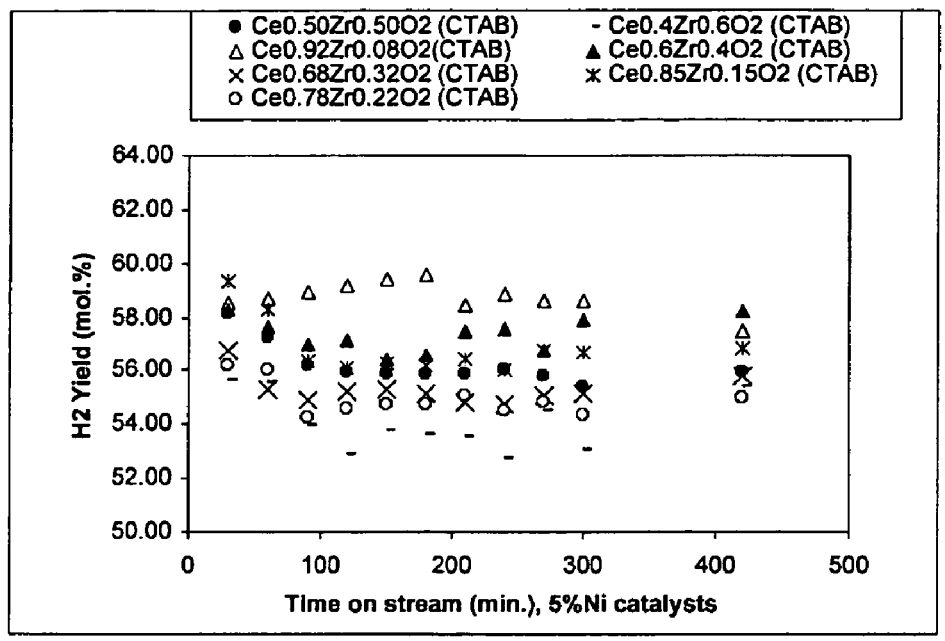
FIG. 37 is a graph showing the effect of the ratio of Ce:Zr in $Ce_xZr_{1-x}O_2$ (CTAB) support on $H_2$ yield over 5 wt. % $Ni/Ce_xZr_{1-x}O_2$ (CTAB) catalysts for CDR at 700° C. with a feed ($CH_4:CO_2:N_2=2:2:1$) rate of $4.70\times10^4$ ml/(h·g-cat).
Figure 38:
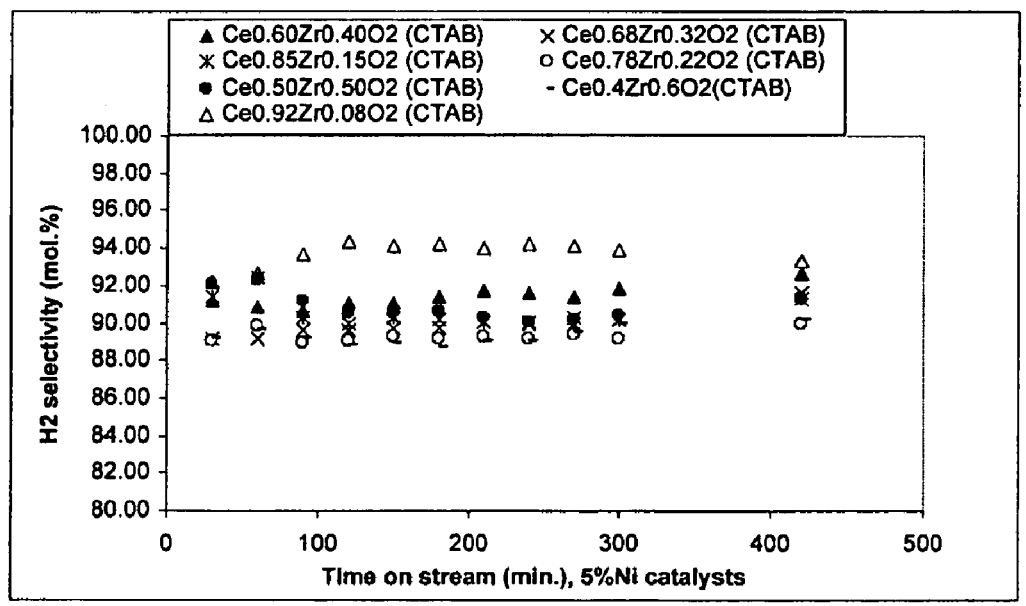
FIG. 38 is a graph showing the effect of the ratio of Ce:Zr in $Ce_xZr_{1-x}O_2$ (CTAB) support on $H_2$ selectivity over 5 wt. % $Ni/Ce_xZr_{1-x}O_2$ (CTAB) catalysts for CDR at 700° C. with a feed ($CH_4:CO_2:N_2=2:2:1$) rate of $4.70\times10^4$ ml/(h·g-cat).
Figure 39:
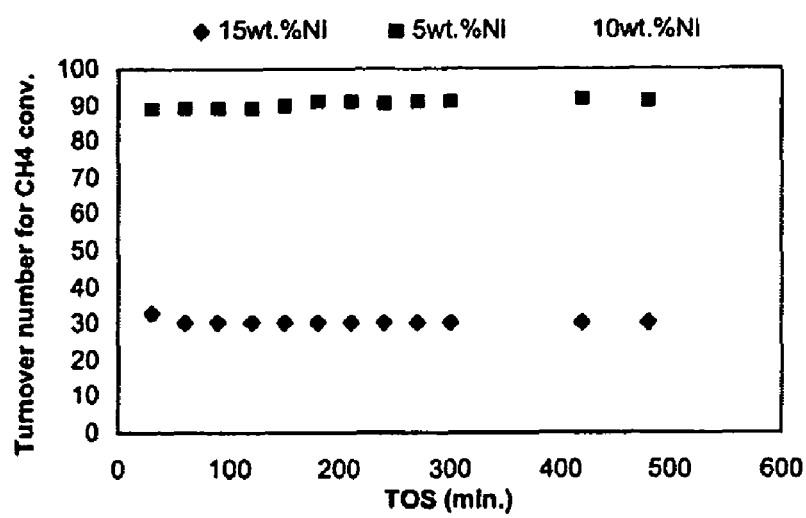
FIG. 39 is a graph showing the effect of Ni loading on the TON of $Ni/Ce_{0.6}Zr_{0.40}O_2$ (CTAB) catalysts for CDR at 700° C. with a feed ($CH_4/CO_2=1:1$) rate of $3.76\times10^4$ ml/(h·g-cat).

(i) Catalytic Activity of $Ni/Ce_xZr_{1-x}O_2$ (CTAB) Catalysts for $CO_2$ Reforming of Methane The effect of the ratio of Ce:Zr in $Ce_xZr_{1-x}O_2$ (CTAB) support on catalytic activity of $Ni/Ce_xZr_{1-x}O_2$ (CTAB) catalysts is shown in FIGS. 36-38. FIG. 36 shows that the ratio of Ce:Zr in $Ce_xZr_{1-x}O_2$ (CTAB) support affects $CH_4$ conversions as well as the deactivation characteristics of $Ni/Ce_xZr_{1-x}O_2$ (CTAB) catalysts during the $CO_2$ reforming of methane. When x is in the range of 0.50 to 0.92, $CH_4$ conversions are very stable and do not show any decrease with time on stream. Outside this range, $CH_4$ conversions decline with time on stream. $CH_4$ conversion of $Ce_xZr_{1-x}O_2$ (CTAB) supported Ni catalysts was of the order: $Ce_{0.6}Zr_{0.4}O_2$ (CTAB)~$Ce_{0.85}Zr_{0.15}O_2$ (CTAB)>$Ce_{0.5}Zr_{0.5}O_2$ (CTAB)~$Ce_{0.68}Zr_{0.32}O_2$ (CTAB)~$Ce_{0.78}Zr_{0.22}O_2$ (CTAB)~$Ce_{0.92}Zr_{0.08}O_2$ (CTAB)>$Ce_{0.4}Zr_{0.6}O_2$ (CTAB). FIG. 37 shows that the ratio of Ce:Zr in $Ce_xZr_{1-x}O_2$ (CTAB) support affects the $H_2$ yield of the $Ni/Ce_xZr_{1-x}O_2$ (CTAB) catalysts for $CO_2$ reforming of methane. When x is in the range of 0.50 to 0.92, $H_2$ yields are very stable and do not show any decrease with time on stream. Outside this range, $H_2$ yields decline with time on stream. $H_2$ yield of $Ce_xZr_{1-x}O_2$ (CTAB) supported Ni catalysts was of the order: $Ce_{0.6}Zr_{0.4}O_2$ (CTAB)~$Ce_{0.92}Zr_{0.08}O_2$ (CTAB)~$Ce_{0.85}Zr_{0.15}O_2$ (CTAB)>$Ce_{0.5}Zr_{0.5}O_2$ (CTAB)~$Ce_{0.68}Zr_{0.32}O_2$ (CTAB)~$Ce_{0.78}Zr_{0.22}O_2$ (CTAB)>$Ce_{0.4}Zr_{0.6}O_2$ (CTAB). FIG. 38 shows that the ratio of Ce:Zr in $Ce_xZr_{1-x}O_2$ (CTAB) support affects $H_2$ selectivity of $Ni/Ce_xZr_{1-x}O_2$ (CTAB) catalysts for $CO_2$ reforming of methane. When x is in the range of 0.50 to 0.92, $H_2$ selectivity is very stable and does not show any decrease with time on stream. Outside the range, $H_2$ selectivities are low but remain constant with time on stream. $H_2$ selectivity of $Ce_xZr_{1-x}O_2$ (CTAB) supported Ni catalysts was of the order: $Ce_{0.6}Zr_{0.4}O_2$ (CTAB)~$Ce_{0.92}Zr_{0.08}O_2$ (CTAB)>$Ce_{0.85}Zr_{0.15}O_2$ (CTAB)~$Ce_{0.5}Zr_{0.5}O_2$ (CTAB)~$Ce_{0.68}Zr_{0.32}O_2$ (CTAB)>$Ce_{0.78}Zr_{0.22}O_2$ (CTAB)~$Ce_{0.4}Zr_{0.6}O_2$(CTAB). FIG. 39 shows the effect of Ni loading on the activity of $Ni/Ce_{0.6}Zr_{0.40}O_2$ (CTAB) catalysts for $CO_2$ reforming of methane. The results in the figure indicate that 5 wt. % $Ni/Ce_{0.6}Zr_{0.40}O_2$ (CTAB) catalyst is the most effective among three Ni loadings of $Ni/Ce_{0.6}Zr_{0.40}O_2$ (CTAB) catalysts.

In summary, the ratio of Ce:Zr in $Ce_xZr_{1-x}O_2$ (CTAB) affects activity and stability of $Ni/Ce_xZr_{1-x}O_2$ (CTAB) catalysts. When x is in the range of 0.50 to 0.92, catalyst activity is both high and very stable without deactivation with time on stream. Outside this range, the activity is low and decreases with time on stream. In addition, catalysts with 5 wt. % Ni loading provide the most effective activity from among 5 wt %, 10 wt % and 15 wt % Ni loadings so far studied for $Ni/Ce_{0.6}Zr_{0.40}O_2$ (CTAB) catalysts.

Figure 40:
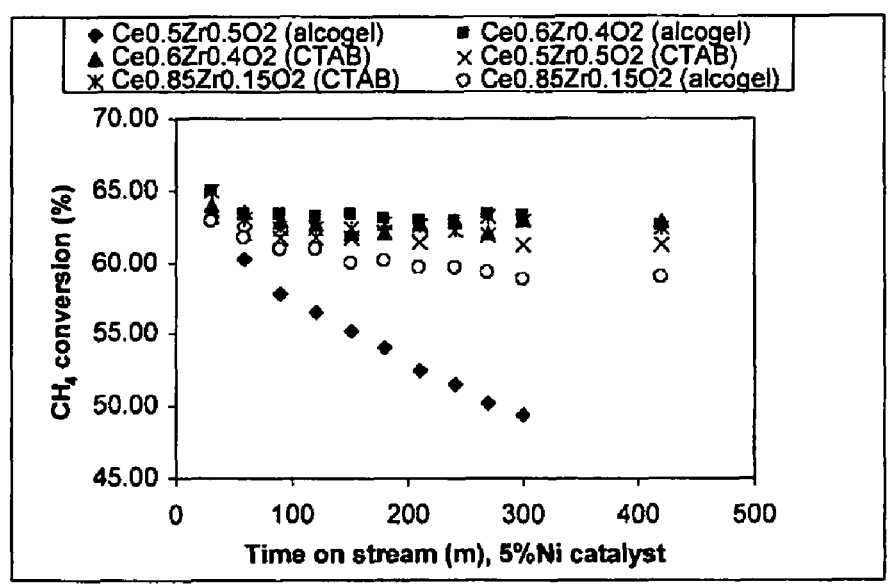
FIG. 40 is a graph showing the effect of the preparation method for the $Ce_xZr_{1-x}O_2$ support on $CH_4$ conversions over 5 wt. % $Ni/Ce_xZr_{1-x}O_2$ catalysts for CDR at 700° C. with a feed ($CH_4:CO_2:N_2=2:2:1$) rate of $4.70\times10^4$ ml/(h·g-cat).
Figure 41:
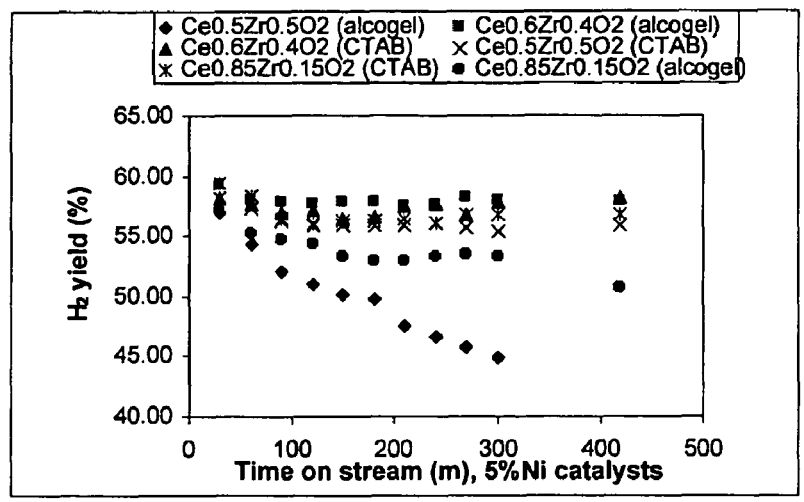
FIG. 41 is a graph showing the effect of preparation methods for the $Ce_xZr_{1-x}O_2$ support on $H_2$ yield over 5 wt. % $Ni/Ce_xZr_{1-x}O_2$ catalysts for CDR at 700° C. with a feed ($CH_4:CO_2:N_2=2:2:1$) rate of $4.70\times10^4$.
Figure 42:
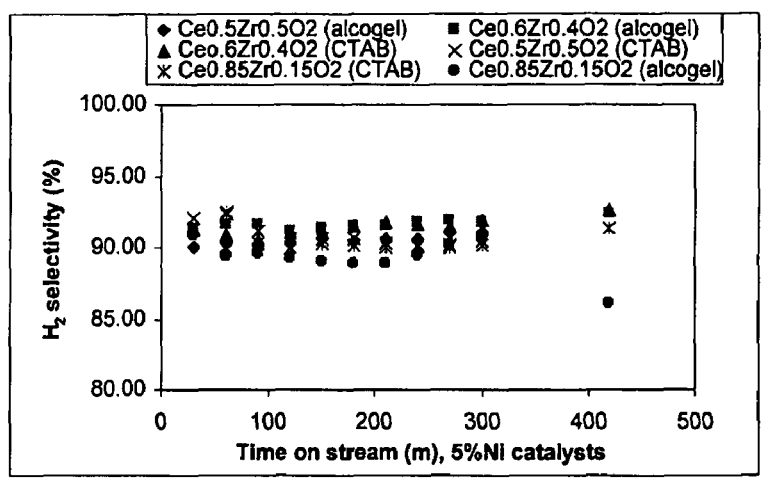
FIG. 42 is a graph showing the effect of the preparation method for the $Ce_xZr_{1-x}O_2$ support on $H_2$ selectivity over 5 wt. % $Ni/Ce_xZr_{1-x}O_2$ catalysts for CDR at 700° C. with a feed ($CH_4:CO_2:N_2=2:2:1$) rate of $4.70\times10^4$ ml/(h·g-cat).

(j) The Effect of Preparation Methods of $Ce_xZr_{1-x}O_2$ Support on Catalytic activity of $Ni/Ce_xZr_{1-x}O_2$ Catalysts for CDR $Ce_xZr_{1-x}O_2$ was prepared by a surfactant-assisted method (CTAB) and a sol-gel method (alcogel) respectively. The effect of preparation methods of $Ce_xZr_{1-x}O_2$ support on catalytic activity of 5 wt. % $Ni/Ce_xZr_{1-x}O_2$ catalysts are shown in FIGS. 40-42. FIGS. 40-42 show that 5 wt. % $Ni/Ce_xZr_{1-x}O_2$ (CTAB) catalysts have a high and stable activity in the broad range of x=0.5 to 0.85 while 5 wt. % $Ni/Ce_xZr_{1-x}O_2$ (alcogel) catalysts exhibit a high and stable activity only at x=0.6. Table 10 lists the comparison of catalytic activity and properties of 5 wt. % Ni/Ce$_x$Zr$_{1-x}$O$_2$ (CTAB) catalysts and 5 wt. % Ni/Ce$_x$Zr$_{1-x}$O$_2$ (alcogel) catalysts. Table 10 clearly shows that for the same x in both catalyst systems, 5 wt. % Ni/Ce$_x$Zr$_{1-x}$O$_2$ (CTAB) catalysts show higher stability as well as higher (or at worst similar) CH$_4$ conversions and H$_2$ yields than 5 wt. % Ni/Ce$_x$Zr$_{1-x}$O$_2$ (alcogel) catalysts. There is no big difference in H$_2$ selectivity for these two catalyst systems. The high stability and high catalytic activity of 5 wt. % Ni/Ce$_x$Zr$_{1-x}$O$_2$ (CTAB) catalysts are attributed to their higher surface areas with the resultant high dispersion of the Ni species on the support, and thermal stability. These results show that the surfactant-assisted method (CTAB) is more effective to prepare highly active and stable Ni/Ce$_x$Zr$_{1-x}$O$_2$ catalysts than the sol-gel method (alcogel).

(k) Catalytic Activity of 5 wt. % Ni Based Catalysts for CO$_2$ Reforming of Methane Table 11 summarizes the activity and H$_2$ selectivity of 5 wt. % Ni based catalysts for CDR. The catalysts with an * mark in Table 11 deactivate with time on stream, so they are not optimal catalysts for CDR. From the results in the table, it is seen that 5 wt % Ni/Ce$_x$Zr$_{1-x}$O$_2$ (CTAB) catalysts (x=0.5, 0.6, 0.68, 0.78, 0.85, 0.92) and 5 wt % Ni/Ce$_{0.6}$Zr$_{0.4}$O$_2$ (alcogel) have the highest activities and stability among all the tested catalysts.

(l) The Effect of Catalyst Support Composition on Catalytic Activity for CDR

Figure 43:
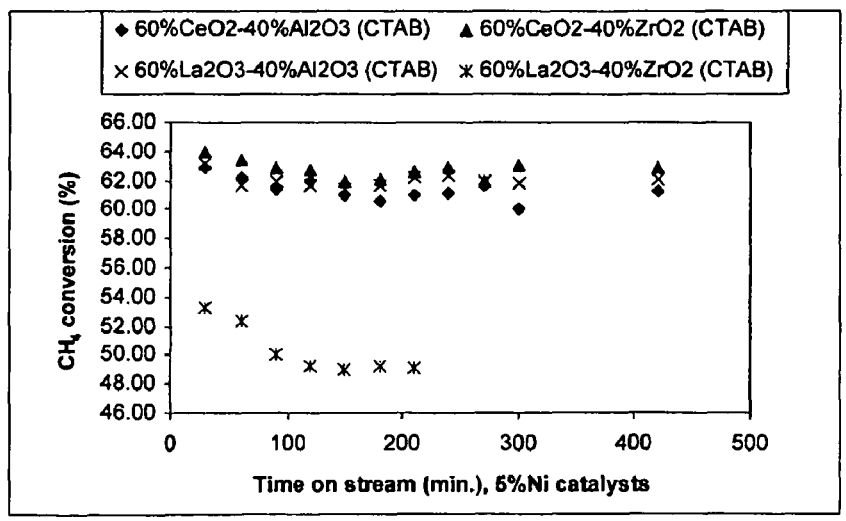
FIG. 43 is a graph showing the effect of catalyst composition on $CH_4$ conversion over 5 wt. % Ni catalysts for CDR at 700° C. with a feed ($CH_4:CO_2:N_2=2:2:1$) rate of $4.70\times10^4$ ml/(h·g-cat).
Figure 44:
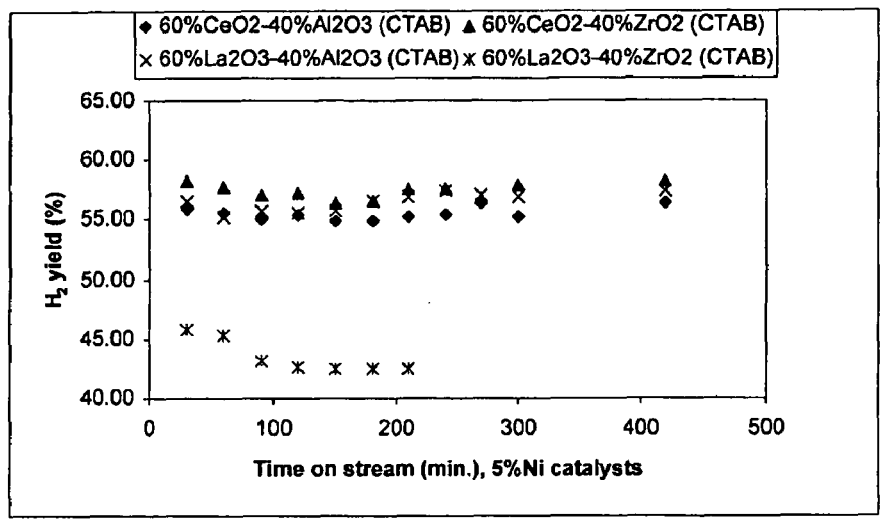
FIG. 44 is a graph showing the effect of catalyst composition on $H_2$ yield over 5 wt. % Ni catalysts for CDR at 700° C. with a feed ($CH_4:CO_2:N_2=2:2:1$) rate of $4.70\times10^4$ ml(h·g-cat).
Figure 45:
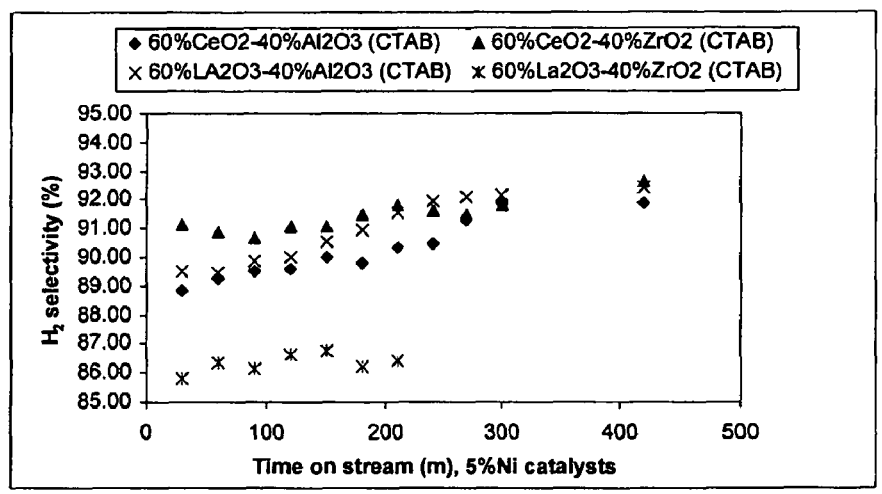
FIG. 45 is a graph showing the effect of catalyst composition on $H_2$ selectivity over 5 wt. % Ni catalysts for CDR at 700° C. with a feed ($CH_4:CO_2:N_2=2:2:1$) rate of $4.70\times10^4$ ml/(h·g-cat).
Figure 46:
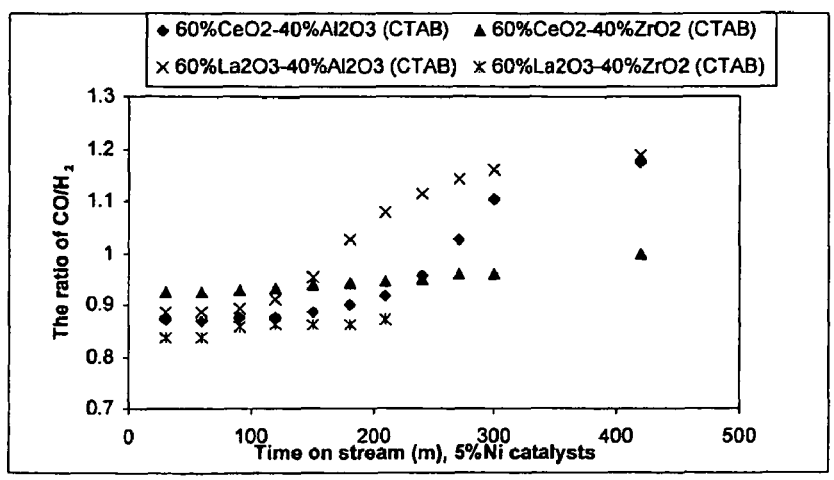
FIG. 46 is a graph showing the effect of catalyst composition on the ratio of $CO/H_2$ over 5 wt. % Ni catalysts for CDR at 700° C. with a feed ($CH_4:CO_2:N_2=2:2:1$) rate of $4.70\times10^4$ ml/(h·g-cat).

The effect of catalyst support composition on catalytic activity over 5 wt. % Ni catalysts for CDR at 700° C. is shown in FIGS. 43-46. FIGS. 43-45 illustrate that 60% CeO$_2$-40% ZrO$_2$ (CTAB), 60% CeO$_2$-40% Al$_2$O$_3$ (CTAB), 60% La$_2$O$_3$-40% Al$_2$O$_3$ (CTAB) supported Ni catalysts exhibit high and stable CH$_4$ conversions, H$_2$ yields and H$_2$ selectivity, which were much higher than Ni/60% La$_2$O$_3$-40% ZrO$_2$ (CTAB) catalyst for CO$_2$ reforming of methane. FIG. 46 demonstrates that the ratio of CO/H$_2$ over Ni/60% CeO$_2$-40% Al$_2$O$_3$ (CTAB) and Ni/60% La$_2$O$_3$-40% Al$_2$O$_3$ (CTAB) catalysts increase quickly with time on stream, higher than the ones over Ni/60% CeO$_2$-40% ZrO$_2$ (CTAB) and Ni/60% La$_2$O$_3$-40% ZrO$_2$ (CTAB) catalysts. It has been reported that the ratio of CO/H$_2$ indicates the degree to which the reverse water-gas shift reaction (RWGS) (CO$_2$+H$_2$→CO+H$_2$O) proceeds. A high CO/H$_2$ ratio indicates a high extent of occurrence of RWGS reaction over the former two catalysts than the latter ones. Thus, it is concluded that 60% CeO$_2$-40% Al$_2$O$_3$ (CTAB), 60% La$_2$O$_3$40% Al$_2$O$_3$ (CTAB) supported Ni catalysts have comparable catalytic activity with Ni/60% CeO$_2$-40% ZrO$_2$ (CTAB) catalyst, but have the disadvantage that they favor the RWGS reaction more than the latter. Our results indicate that Ni/60% La$_2$O$_3$-40% ZrO$_2$ (CTAB) catalyst is not a good catalyst for CDR.

Figure 47:
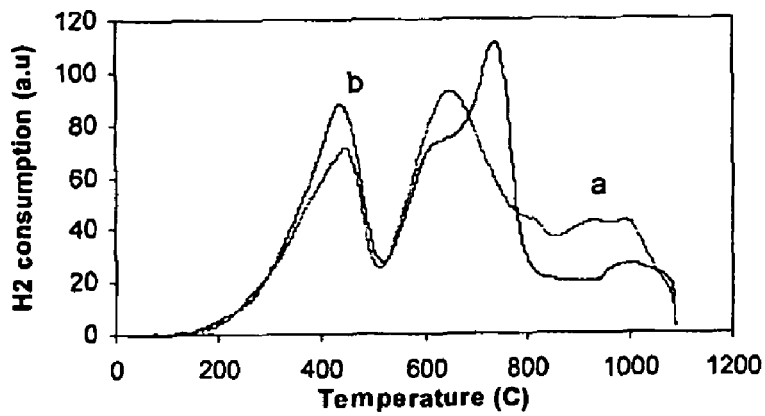
FIG. 47 is a graph showing the Temperature Program Reduction-$H_2$ (TPR-$H_2$) profiles of catalysts: a. 5% $Ni/Ce_{0.6}Zr_{0.4}O_2$ (CTAB); b. 5% $Ni/Ce_{0.6}Zr_{0.4}O_2$ (AL).

(m) Temperature Program Reduction (TPR) Analysis of the Catalyst Prepared:

(i) The Effect of Support Preparation Method on the Reducibility of 5% Ni/Ce$_{0.6}$Zr$_{0.4}$O$_2$ The comparison of TPR patterns for 5% Ni/Ce$_{0.6}$Zr$_{0.4}$O$_2$ alcogel (AL) and 5% Ni/Ce$_{0.6}$Zr$_{0.4}$O$_2$ (CTAB), are presented in FIG. 47. FIG. 47 illustrates that the preparation method of Ce$_{0.6}$Zr$_{0.4}$O$_2$ support affects the reducibility of nickel or ceria. It is seen that the 5% Ni/Ce$_{0.6}$Zr$_{0.4}$O$_2$ (AL) synthesized by an alcogel method shows a reduction peak of NiO centered at 440° C. which is also seen in the case of 5% Ni/Ce$_{0.6}$Zr$_{0.4}$O$_2$ (CTAB) synthesized by a surfactant templating method. On the other hand, the main peak corresponding to the reduction of CeO$_2$ in Ce$_{0.6}$Zr$_{0.4}$O$_2$ in 5% Ni/Ce$_{0.6}$Zr$_{0.4}$O$_2$ (AL) shifts to a higher temperature (747° C.) as compared to 664° C. in 5% Ni/Ce$_{0.6}$Zr$_{0.4}$O$_2$ (CTAB). This shows that Ce$_{0.6}$Zr$_{0.4}$O$_2$ which is prepared by a surfactant templating method is more easily reducible than that by the alcogel method. While not wishing to be limited by theory, it appears that the difference is related to the morphological and physicochemical properties of the two different kinds of catalysts. A surfactant templating method leads to a higher specific surface area, smaller pore size and higher dispersivity of Ni species. The higher reducibility of CeO$_2$ in the CTAB support enables the support to make use of its oxygen storage capacity and participate in the redox function of the catalyst, thus increasing its stability during the dry reforming of methane.

(ii) The Effect of x on the Reducibility of 5% Ni/Ce$_x$Zr$_{1-x}$O$_2$

Figure 48:
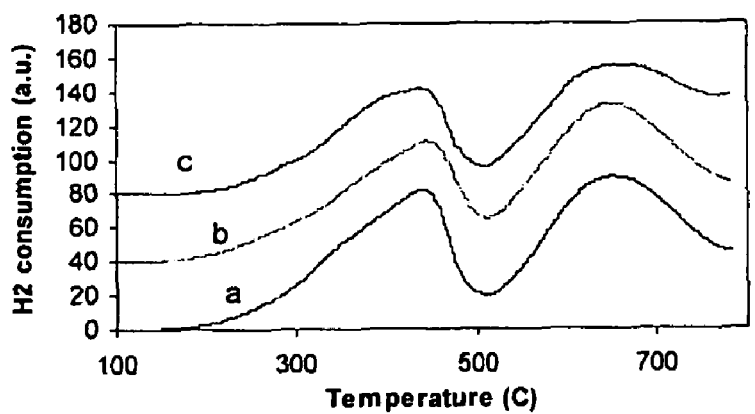
FIG. 48 is a graph showing the TPR-$H_2$ profiles of catalysts: a. 5% $Ni/Ce_{0.5}Zr_{0.5}O_2$ (CTAB); b. 5% $Ni/Ce_{0.6}Zr_{0.4}O_2$ (CTAB); c. 5% $Ni/Ce_{0.68}Zr_{0.32}O_2$ (CTAB).

The TPR-H$_2$ profiles for 5% Ni/Ce$_x$Zr$_{1-x}$O$_2$ (x=0.5 to 0.68) which are synthesized by a surfactant-templating method are presented in FIG. 48. FIG. 48 shows that 5% Ni/Ce$_{0.6}$Zr$_{0.4}$O$_2$ catalysts possess two peaks: one is a sharp peak at 440° C. and the other is a broad peak at about 662° C. In comparison to the TPR curves of NiO and Ce$_{0.6}$Zr$_{0.4}$O$_2$, the first peak is attributed to the reduction of Ni species and the second one is ascribed to the reduction of highly dispersed CeO$_2$ in Ce$_x$Zr$_{1-x}$O$_2$ solid solution. This is because pure ZrO$_2$ is not reducible and the presence of 5% Ni species does not appear to affect the reducibility of CeO$_2$ in Ce$_{0.6}$Zr$_{0.4}$O$_2$. It is seen that the variation of x does not apparently affect the positions of the two peaks with x in the range 0.5 to 0.68. This indicates that 5% Ni/Ce$_x$Zr$_{1-x}$O$_2$ (x=0.5 to 0.68) catalysts have more or less the same reducibility. The similar reducibility of 5% Ni/Ce$_x$Zr$_{1-x}$O$_2$ (x=0.5 to 0.68) is likely associated to the equivalent oxygen storage capacity (OSC) of Ce$_x$Zr$_{1-x}$O$_2$ (x=0.5 to 0.68) and the same cubic fluorite structure as discussed in item (g).

Figure 49:
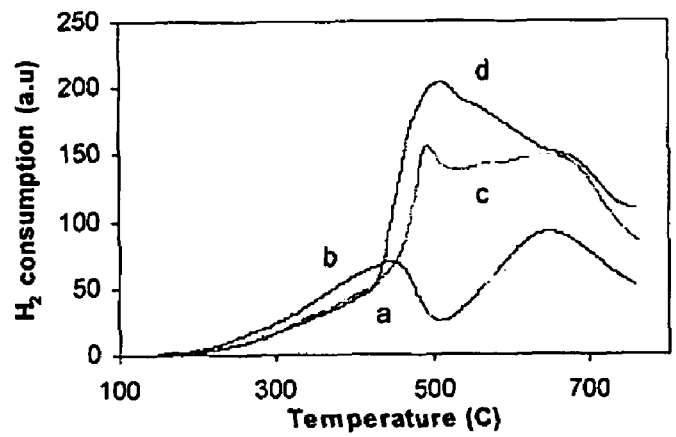
FIG. 49 is a graph showing the TPR-$H_2$ profiles of catalysts: a. $Ce_{0.6}Zr_{0.4}O_2$; b. 5% $Ni/Ce_{0.8}Zr_{0.4}O_2$; C. 15% $Ni/Ce_{0.6}Zr_{0.4}O_2$; d. 20% $Ni/Ce_{0.6}Zr_{0.4}O_2$.
Figure 50:
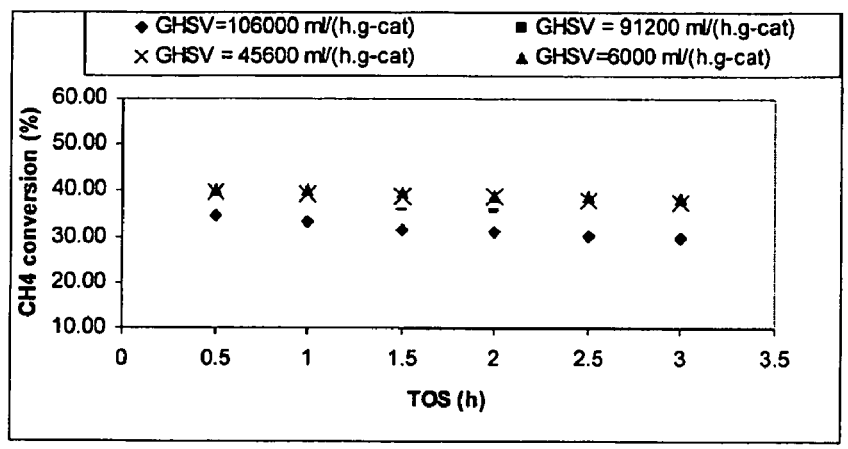
FIG. 50 is a graph showing the conversion of $CH_4$ as a function of time-on-stream (TOS) on 5% $Ni/Ce_{0.6}O_{0.4}O_2$ at 600° C. and at different feed rates.
Figure 51:
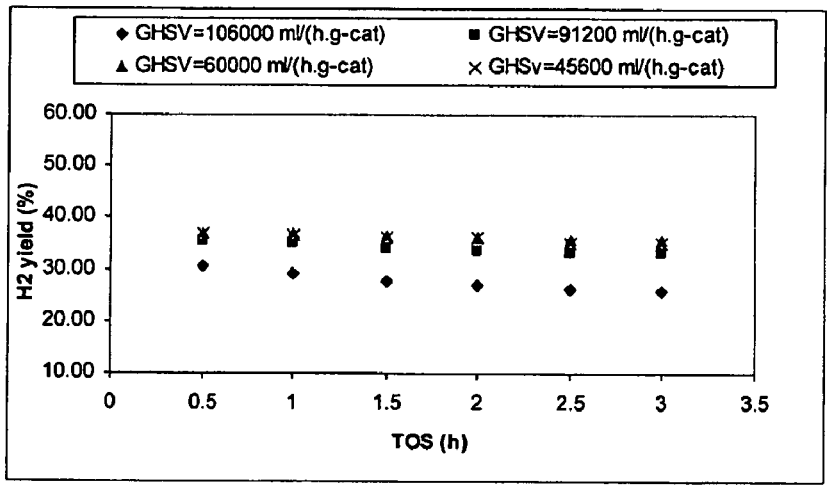
FIG. 51 is a graph showing the $H_2$ yield as a function of time-on-stream (TOS) on 5% $Ni/Ce_{0.6}O_{0.4}O_2$ at 600° C. and at different feed rates.
Figure 52:
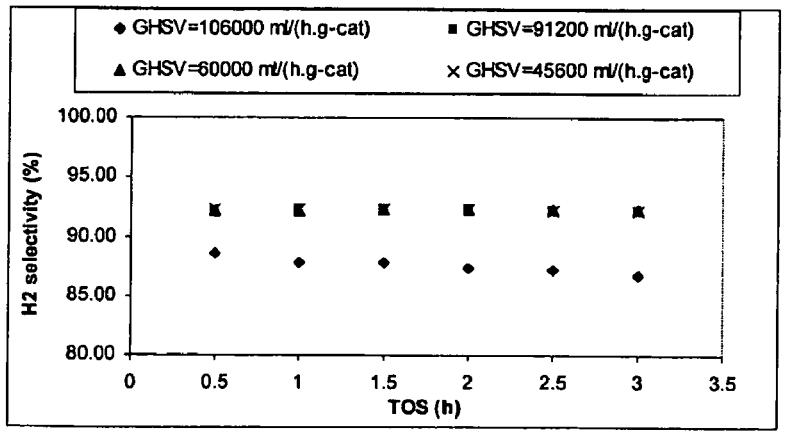
FIG. 52 is a graph showing the $H_2$ selectivity as a function of time-on-stream (TOS) on 5% $Ni/Ce_{0.6}O_{0.4}O_2$ at 600° C. and at different feed rates.
Figure 53:
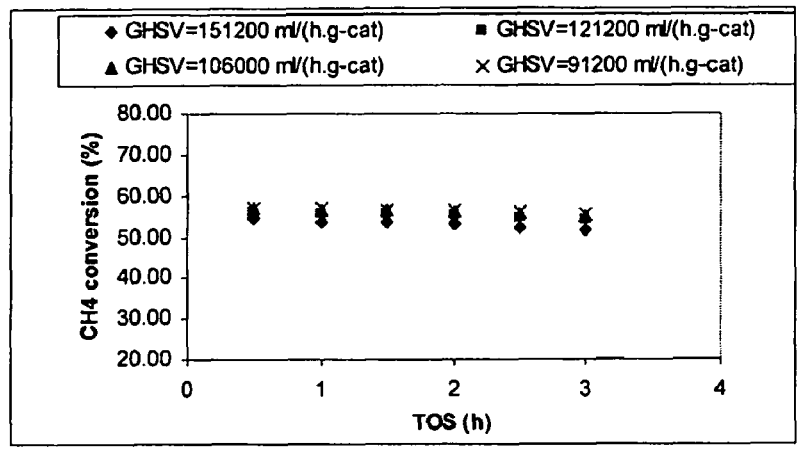
FIG. 53 is a graph showing the conversion of $CH_4$ as a function of time-on-stream (TOS) on 5% $Ni/Ce_{0.6}O_{0.4}O_2$ at 650° C. and at different feed rates.
Figure 54:
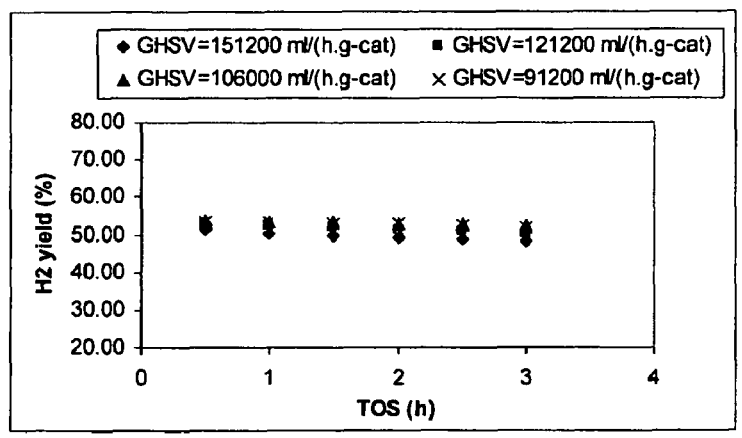
FIG. 54 is a graph showing the $H_2$ yield as a function of time-on-stream (TOS) on 5% $Ni/Ce_{0.6}O_{0.4}O_2$ at 650° C. and at different feed rates.
Figure 55:
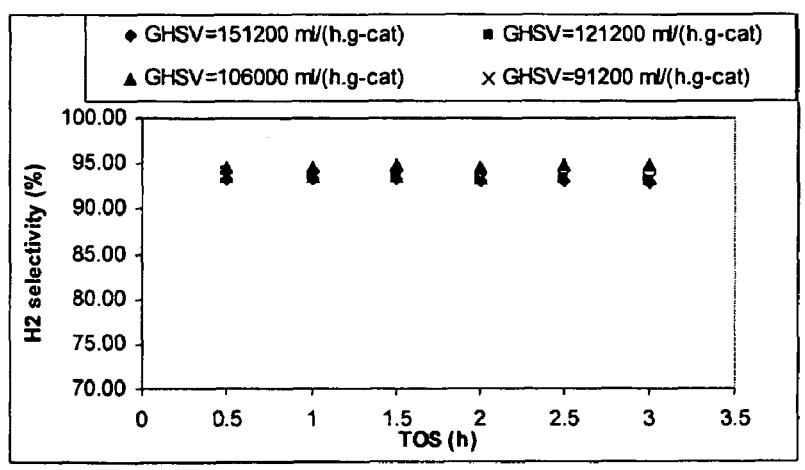
FIG. 55 is a graph showing the $H_2$ selectivity as a function of time-on-stream (TOS) on 5% $Ni/Ce_{0.6}O_{0.4}O_2$ at 650° C. and at different feed rates.
Figure 56:
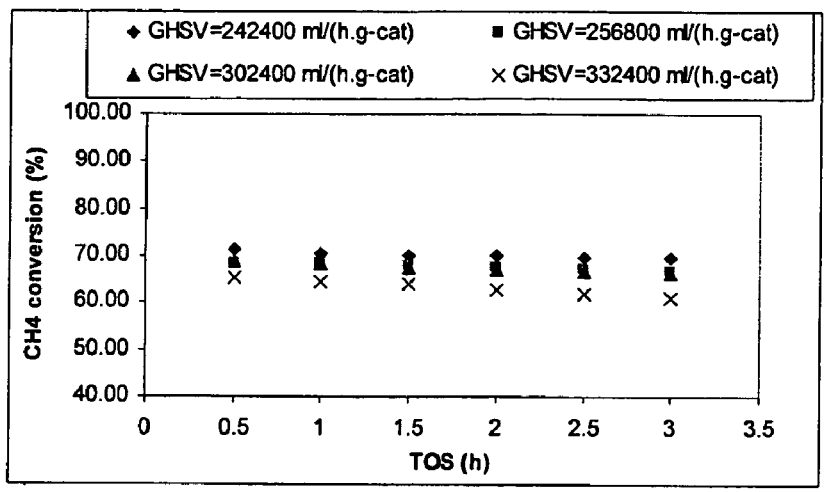
FIG. 56 is a graph showing the conversion of $CH_4$ as a function of time-on-stream (TOS) on 5% $Ni/Ce_{0.6}O_{0.4}O_2$ at 700° C. and at different feed rates.
Figure 57:
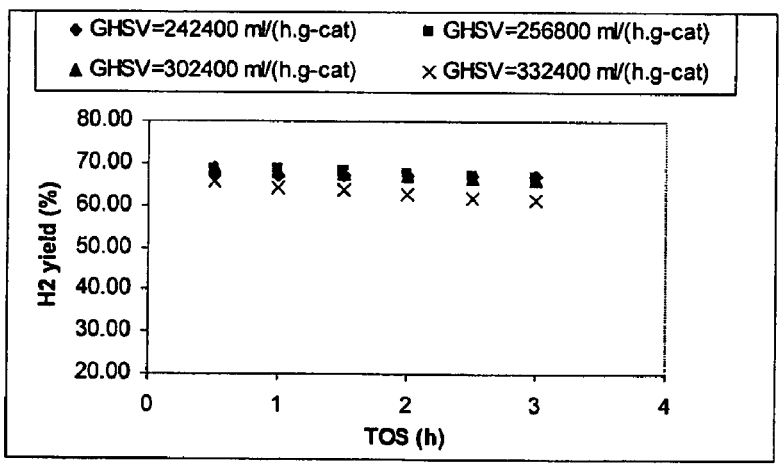
FIG. 57 is a graph showing the $H_2$ yield as a function of time-on-stream (TOS) on 5% $Ni/Ce_{0.6}O_{0.4}O_2$ at 700° C. and at different feed rates.
Figure 58:
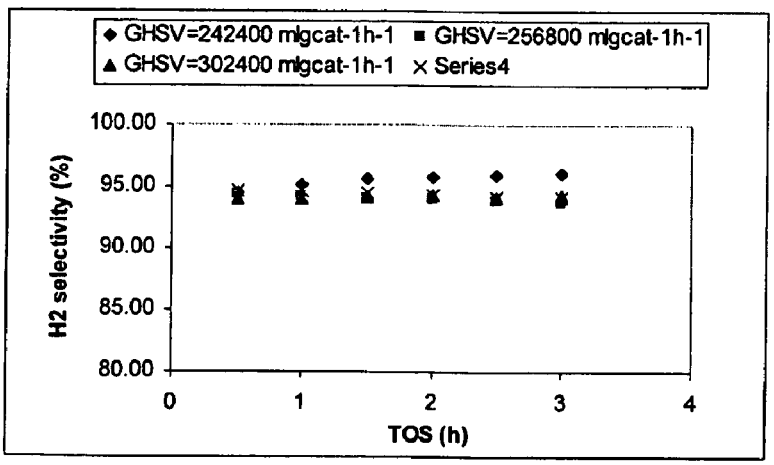
FIG. 58 is a graph showing the $H_2$ selectivity as a function of time-on-stream (TOS) on 5% $Ni/Ce_{0.6}O_{0.4}O_2$ at 700° C. and at different feed rates.

(iii) The Effect of Ni Loading on the Reducibility of 5% Ni/Ce$_x$Zr$_{1-x}$O$_2$ The effect of Ni loading (5-20%) on the reducibility of NiO and Ce$_x$Zr$_{1-x}$O$_2$ is presented in FIG. 49. As indicated above, for 5% Ni/Ce$_{0.6}$Zr$_{0.4}$O$_2$, the peak at 440° C. is assigned to the reduction of NiO while the peak at 662° C. is attributed to the reduction of CeO$_2$ in Ce$_{0.6}$Zr$_{0.4}$O$_2$. In comparison to the TPR curve of Ce$_{0.6}$Zr$_{0.4}$O$_2$ with that of 5% Ni/Ce$_{0.6}$Zr$_{0.4}$O$_2$, it is seen that in the presence of 5% Ni species, the CeO$_2$ reduction peak shifts to a lower temperature from 662° C. to 652° C. Thus, this indicates that CeO$_2$ is easily reducible in the presence of 5% Ni species. However, with the increase of Ni loading from 5% to 15% and then to 20%, the NiO reduction peak shifts to higher temperatures from 440° C. to 500° C. and then to 520° C. respectively. The CeO$_2$ reduction peak also shifts to higher temperatures from 652° C. to 667° C. and then to 679° C. respectively. The low loading appears to indicate an optimum metal support interaction, and thus providing a better nickel dispersion. The increasing NiO loading, on the other hand, leads to a decrease in the reducibility of NiO and CeO$_2$. This may be the result of either formation of metal agglomeration or spinel formation.

(n) The Effect of Gas Hourly Space Velocity (GHSV) of Feed on the Catalytic Activity of 5 wt % Ni/Ce$_{0.6}$Zr$_{0.4}$O$_2$ (CTAB)

The catalytic activity of 5 wt % Ni/Ce$_{0.6}$Zr$_{0.4}$O$_2$ (CTAB) was investigated for CDR at different GHSV in the temperature range of 600-700° C. The effect of GHSV on catalytic activity after 3 h reaction at 600° C., 650° C. and 700° C., respectively, is shown in FIGS. 50-58. FIGS. 50-58 illustrate that the stability of the catalyst is affected by gas hourly space velocity (GHSV). When GHSV is equal to or smaller than 91200 ml/(h·g-cat) at 600° C., 121200 ml/(h·g-cat) at 650° C., and 302400 ml/(h·g-cat) at 700° C. respectively, 5 wt % Ni/Ce$_{0.6}$Zr$_{0.4}$O$_2$ (CTAB) shows high stability and activity with time on stream. In contrast, when GHSV is larger than 91200 ml/(h·g-cat) at 600° C., 121200 ml/(h·g-cat) at 650° C. and 302400 ml/(h·g-cat) at 700° C. respectively, the stability of the catalyst declines with time on stream. It is evident that with increasing temperature, the range of GHSV in which the catalyst stays stable increases. While not wishing to be limited by theory, it appears that with increasing GHSV, the loading rate of CH$_4$ on the catalyst increases. This results in an increase in the rate of carbon formation, which causes deactivation of catalyst. Hence, in order to maintain the stability of catalyst, 5 wt % Ni/Ce$_{0.6}$Zr$_{0.4}$O$_2$ (CTAB) is optimally performed at GHSV of equal or smaller than 91200 ml/(h·g-cat) at 600° C., 121200 ml/(h·g-cat) at 650° C. and 302400 ml/(h·g-cat) at 700° C. respectively.

Figure 59:
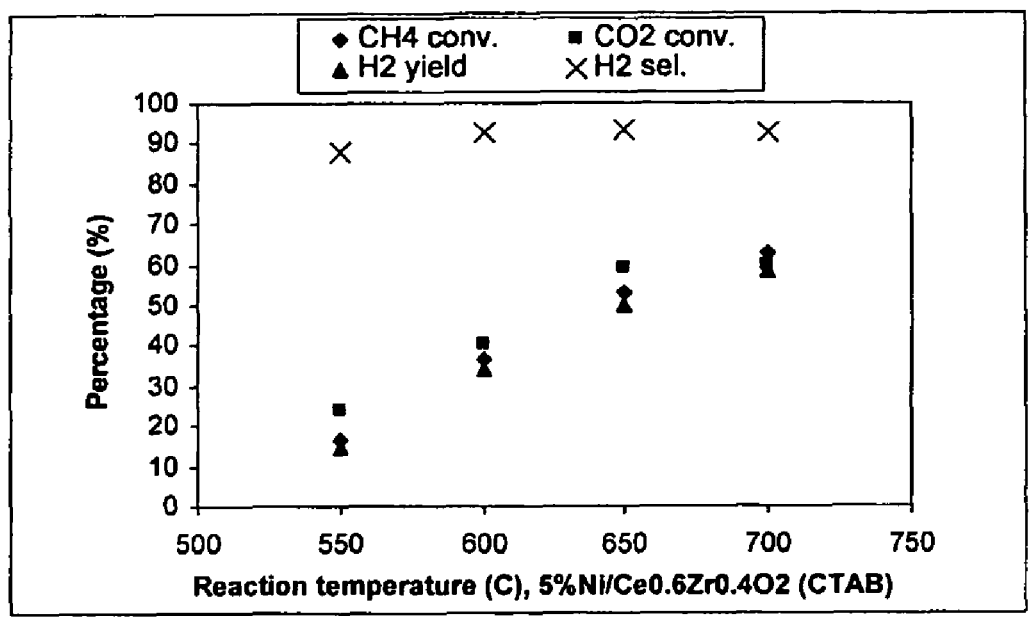
FIG. 59 is a graph showing the effect of reaction temperature on catalytic activity over 5 wt. % $Ni/Ce_{0.6}Zr_{0.4}O_2$ (CTAB) catalyst for CDR with a feed ($CH_4:CO_2:N_2=2:2:1$) rate of $4.70\times10^4$ ml/(h·g-cat) at a reaction time=7 h.

(o) The Effect of Reaction Temperature on Catalytic Activity of 5 wt % Ni/Ce$_{0.6}$Zr$_{0.4}$O$_2$ (CTAB) Catalyst for CDR The catalytic activity of 5 wt % Ni/Ce$_{0.6}$Zr$_{0.4}$O$_2$ (CTAB) catalyst was studied for CDR in the temperature range of 550-700° C. The effect of reaction temperature on catalytic activity after 7 h reaction is presented in FIG. 59. FIG. 59 demonstrates that CH$_4$ conversions and H$_2$ yields for 5 wt % Ni/Ce$_{0.6}$Zr$_{0.4}$O$_2$ (CTAB) catalyst increase as the temperature increase from 550 to 700° C., but the increase in catalyst activity is very slight beyond 650° C. In addition, reaction temperature does not much affect the H$_2$ selectivity. This means that the CDR reaction can occur satisfactorily within the reaction temperature range of 550 to 700° C. The ability to carry out the CDR reaction at temperatures below 700° C. in a catalytic packed bed tubular reactor is a major breakthrough. One significant advantage is that if CDR is performed at any temperature between 600 and 650° C., and is placed upstream and in train with a WGSR which operates at temperatures greater than or equal to 650° C., the exothermic heat from the WGSR can be used as the source of heat for the endothermic CDR reaction without any requirement for external heating.

Figure 60:
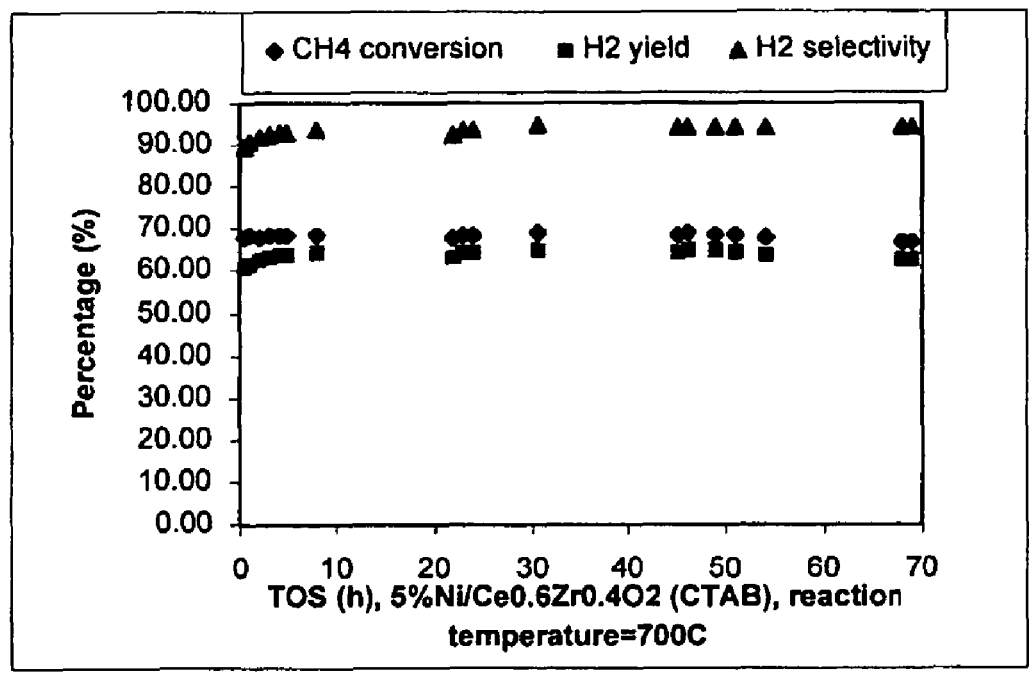
FIG. 60 is a graph showing the long-term catalytic activity of 5 wt. % $Ni/Ce_{0.6}Zr_{0.4}O_2$ (CTAB) catalyst for CDR at 700° C. with a feed ($CH_4:CO_2:N_2=2:2:1$) rate of $4.70\times10^4$ ml/(h·g-cat) and reduction temperature of 710° C.
Figure 61:
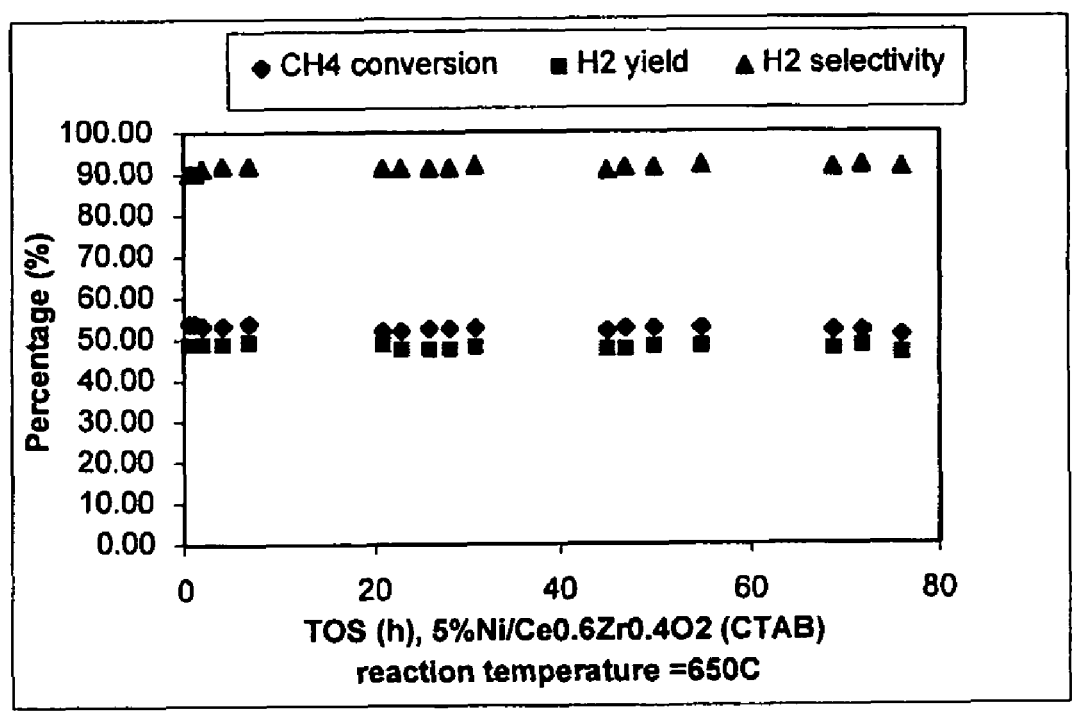
FIG. 61 is a graph showing the long-term catalytic activity of 5 wt. % $Ni/Ce_{0.6}Zr_{0.4}O_2$ (CTAB) catalyst for CDR at 650° C. with a feed ($CH_4:CO_2:N_2=2:2:1$) rate of $4.70\times10^4$ ml/(h·g-cat) and reduction temperature of 650° C.

(p) Long-Term Test of Catalytic Activity of 5 wt. % Ni/Ce$_{0.6}$Zr$_{0.4}$O$_2$ (CTAB) Catalyst for CDR 5 wt. % Ni/Ce$_{0.6}$Zr$_{0.4}$O$_2$ (CTAB) catalyst was tested under two experimental conditions. One was to run CDR over 5 wt. % Ni/Ce$_{0.6}$Zr$_{0.4}$O$_2$ (CTAB) catalyst at a reduction temperature of 710° C. and a reaction temperature of 700° C. The other is at a reduction temperature of 650° C. and a reaction temperature of 650° C. The CO$_2$ reforming reaction data are presented in FIGS. 60-61. FIGS. 60-61 show that 5 wt. % Ni/Ce$_{0.6}$Zr$_{0.4}$O$_2$ (CTAB) catalyst has CH$_4$ conversion of more than 68% up to 70 hours at 700° C. and CH$_4$ conversion of more than 53% up to 80 hours at 650° C. without any deactivation. To our knowledge, it is a rare case that 5 wt. % Ni catalyst shows such a high activity and stability at both 700° C. and 650° C. In addition, the long-term tests were performed with the catalyst in a thermal cycling mode in which the catalyst is alternately heated and allowed to remain at the reaction temperature for about 11 h and then cooled and allowed to remain at room temperature for about 13 h as a cyclic process. This means exposing the catalyst to a harsh temperature environment which is very well known to be devastating to the catalyst. It is quite probable that the high activity and stability of Ni/Ce$_x$Zr$_{1-x}$O$_2$ (CTAB) catalysts (x=0.5-0.92) is related to the high surface area, nano-crystalline nature of cubic Ce$_x$Zr$_{1-x}$O$_2$ (CTAB) (x=0.5-0.92) support from the surfactant-assisted method of catalyst support preparation, resulting in better dispersion of NiO particles and intimate contact between Ni and support, and enhanced oxygen transfer during CDR.

While the present invention has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

Catalyst Systems Investigated for CO$_2$ dry reforming of CH$_4$

| Metal | Support | Reaction Temperature (° C.) | Method and Media | Shortcoming | References |
|---|---|---|---|---|---|
| Ni | SiO$_2$ | 700 | Impregnation | Catalyst deactivation. e.g. CH$_4$ conversion at 3 h/CH$_4$ conversion at 10 min. = 0.87 at 700° C. with a feed of CH$_4$/CO$_2$ = 1:1 | 1 |
| Ni | ZrO$_2$ | 757 | Impregnation, Sol-gel (NH$_3$•H$_2$O) | Catalyst deactivation Low H$_2$ selectivity (82.8% at TOS = 6 h) | 2 |
| Ni | La$_2$O$_3$ | 700 | Impregnation | Catalyst deactivation. e.g. CH$_4$ conversion at 3 h/CH$_4$ conversion at 10 min. = 0.97 at 700° C with a feed of CH$_4$/CO$_2$ = 1:1 | 1 |
| Ni | MgO | 850 | Co-precipitation | High reaction temperature | 3 |
| Ni | TiO$_2$ | | Impregnation | Catalyst deactivation. | 4 |
| Ni | Al$_2$O$_3$—CaO | 650 | Impregnation | Catalyst deactivation. | 5 |

TABLE 1-continued

Catalyst Systems Investigated for $CO_2$ dry reforming of $CH_4$

| Metal | Support | Reaction Temperature (° C.) | Method and Media | Shortcoming | References |
|---|---|---|---|---|---|
| Ni | $CeO_2$ | 800 | Co-precipitation (KOH) | Catalyst deactivation High reaction temperature | 6 |
| Ni | $Al_2O_3$ | 700 | Impregnation | Serious catalyst deactivation. e.g. $CH_4$ conversion at 3 h/$CH_4$ conversion at 10 min. = 0.72 at 700° C. with a feed of $CH_4/CO_2$ = 1:1 | 1 |
| Ni | Ce—$ZrO_2$ | 800 | Co-precipitation (KOH) | Catalyst deactivation High reaction temperature | 7 |
| Ni | Ce—ZrO2/Al2O3 | 800 | Impregnation | High reaction temperature | 8 |
| Ni | La2O2/Al2O3 | 900 | Sol-gel | High reaction temperature | 9 |
| Ni | $La_2O_2/Al_2O_3$ | 700 | Co-precipitation | No long-term test | 10 |
| Ni—MnO | $MnAl_2O_4$ | 650 | Impregnation | Catalyst deactivation | 11 |
| Ni—K | MgO | 650 | Impregnation | Catalyst deactivation | 12 |
| Ni | Zr-laponite pillared clays | 750 | Surfactant-assisted | Catalyst deactivation | 13 |
| Ni | $CeO_2/Al_2O_3$ | 700 | Impregnation | No long-term test | 14 |
| Pt | Ce—$ZrO_2$, $ZrO_2$ | 800 | Impregnation | High reaction temperature and high pressure | 15 |
| Pt | $Al_2O_3$ | 852 | Impregnation | High reaction temperature | 16 |
| Re, Rh | ZSM-5, KZSM-5, $Al_2O_3$ | 700 | Impregnation | Low $H_2$ selectivity (63%-75%) | 17 |

TABLE 2

Prior art catalyst developed for WGSR

| Support | Synthesis approach | Metal (M) | Temp (° C.) | WGSR * | Comments | Ref. |
|---|---|---|---|---|---|---|
| Alumina | Co-ppt | Cu & Zn | <250 | yes | commercial | 18 |
| Alumina | Co-ppt | Fe & Cr | 350-450 | yes | Commercial | 18 |
| PMR [2] | Deposition | Ni | Unknown | yes | Exploratory | 19 |
| Ceria | Precipitation | Ni, Co, Pd Fe | <250 | yes | Exploratory | 20 |
| Ce(La)O$_x$ | urea | Cu, Ni | <300 | Yes [1] | Exploratory | 21-22 |
| Ce(Zr)O$_x$ | urea | Cu | <450 | yes | Exploratory | 23 |
| Ceria | Films & CVD | Pt, Pd, Rh | <250 | yes | Exploratory | 24 |
| MnO | Co-ppt | Cu | 200-350 | yes | Exploratory | 25 |
| Ceria | Urea & ammonia | Pt, Au, Pd, Ni, Co, Fe | <350 | yes | Role of metal | 20, 26-28 |
| Ceria | Co-ppt or urea | Cu | <300 | No | Exploratory | 29-30 |
| Ceria/Alumina/ Yttria/Samaria | Co-imprgnation | Rh, Cu | 600 | No | Exploratory | 31 |
| ZrO2/Ceria | Unknown | Pt | | Yes | | 32 |
| Ceria/Zirconia | Co-ppt and ammonia | Pt | 500 | No | Oxygen Storage materials measurement | 33 |
| Ceria/Zirconia | CTAB | Pd | <200 | No | Methanol decomposition | 34 |
| 3A Zeolite | Impregnation | Pt, Ru, Pd | 260 | No | Exploratory | 35 |
| Ceria/Zirconia | KOH | Cu | 150 | No | Exploratory | 36 |
| Ceria/Zirconia | Co-ppt | Cu | | No | Exploratory | 37 |

* Other reactions are CO oxidation using molecular oxygen (PROX) and methanol decomposition.
[1] Catalytic partial oxidation of methane @ 550° C.
[2] Palladium membrane reactor

| Support | Synthesis media | Metal (M) | Temp (° C.) | WGSR | Comments | Ref |
|---|---|---|---|---|---|---|
| Alumina/Ceria | impregnation | Cu, Pt | <220 | Yes | Bifunctional | a, d |
| Ceria/zirconia | unknown | Ni, Pt | <300 | Yes * | Bifunctional | b |
| Ceria/zirconia | impregnation | Sn, Pt | <350 | Yes | Bifunctional | c |
| Zirconia | impregnation | Ru, K | <400 | Yes | Noble metal | e, h |
| Ceria/zirconia | impregnation | Pt, Re | unknown | Yes | Noble metal | f |

TABLE 2-continued

Prior art catalyst developed for WGSR

| | | | | | | |
|---|---|---|---|---|---|---|
| Ceria/ZnO | impregnation | Pt | <350 | Yes | $CH_4$ Suppression | g |
| Membrane | impregnation | Ni | 200-800 | Yes [1] | Hydrocarbon reforming | i |
| Ceria/zirconia | urea | Pt, Re | Pt, Re | Yes [2] | Noble metal | j |
| Ceria/zirconia | urea | Pt, Re | Pt, Re | Yes | Low pore volume support | k |

* Oxygen assisted WGSR
[1] Combined with steam reforming and dry reforming
[2] Coupled with preferential oxidation reaction (PROX)

References [#]:
a) USP 20020147103 A1
b) USP 20030026747 A1
c) USP 20030230029 A1
d) USP 20020141938 A1
e) WO 02/066380 A2
f) WO 03/082461 A1
g) USP 20030064887 A1
h) USP 20020114762 A1
i) U.S. Pat. No. 6,090,312 (2000)
j) WO 2004/087304 A2
k) WO 03/082740 A1

TABLE 3

Summary of the proposed metal loading

| | Support | | | |
|---|---|---|---|---|
| Metals | $CeO_2$ | $CeO_2$:$ZrO_2$ | $CeO_2$:$La_2O_3$ | $La_2O_3$:$ZrO_2$ |
| WI | Ni, Cu | Ni, Cu | Ni, Cu | Ni, Cu |
| DP | Ni, Cu | Ni, Cu | Ni, Cu | Ni, Cu |
| Decantation | Ni, Cu | Ni, Cu | Cu, Cu | Ni, Cu |
| Co-precipitation | | Ni, Cu | Ni, Cu | Ni, Cu |

TABLE 4

Summary of the catalyst developed for modified WGSR at 400° C.

| | Support | | Catalyst * | Average catalyst activity (mol %) | | | | |
|---|---|---|---|---|---|---|---|---|
| Ex. # | (PKC#) | Media | $M(y)N(z)$-$[A_xB_{(1-x)}]O_2$ | X | S | Y | $CH_4$ | SA |
| 1 | PKC2 | Urea | Ni(5)-$CeO_2^{WI}$ | 65 | 50 | 32 | yes | 38 |
| 2 | PKC3A | Urea | Ni(5)-$[Ce_{0.68}Zr_{0.32}]O_2$ | 4 | 30 | 12 | no | 10 |
| 3 | PKC7 | Urea | Cu(5)-$[Ce_{0.68}La_{0.32}]O_2^{CP}$ | 40 | 85 | 35 | no | 61 |
| 4 | PKC8 | Urea | Cu(5)-$[Ce_{0.68}Zr_{0.32}]O_2^{CP}$ | 50 | 95 | 48 | no | 82 |
| 5 | PKC9 | KOH | Cu-$CeO_2^{CP}$ | 30 | 95 | 29 | no | 129 |
| 6 | PKC1A | CTAB | Ni-$CeO_2$ | 55 | 75 | 40 | yes | 158 |
| 7 | PKC1B | CTAB | Ni-$CeO_2$ | 52 | 70 | 38 | yes | 148 |
| 8 | PKC4A | CTAB | Ni(5)-$[Ce_{0.68}Zr_{0.32}]O_2$ | 60 | 80 | 48 | yes | 135 |
| 9 | PKC4B | CTAB | Cu(5)-$[Ce_{0.68}Zr_{0.32}]O_2$ | 50 | 90 | 45 | no | 106 |
| 10 | PKC18 | CTAB | Ni(5)-$[Ce_{0.85}Zr_{0.15}]O_2$ | 55 | 85 | 42 | yes | 130 |
| 11 | PKC17 | CTAB | Ni(1-5)Cu(1-3)-$[Ce_{0.70}Zr_{0.30}]O_2$ | 65 | 90 | 56 | yes | 138 |
| 12 | PKC17B | CTAB | Ni(1-3)Cu(1-5)-$[Ce_{0.70}Zr_{0.30}]O_2$ | 68 | 96 | 66 | no | 123 |
| 13 | PKC20 | CTAB | Ni-$[CeZr]O_{2\ (CP)}$ | Not active | | | | 90 |
| 14 | PKC21 | CTAB | Ni(1-3)Cu(1-5)-$[Ce_{0.50}Zr_{0.50}]O$ | 50 | 92 | 46 | yes | 185 |
| 15 | PKC22 | CTAB | Ni(1-3)Cu(1-5)-$[Ce_{0.60}Zr_{0.40}]O$ | 58 | 92 | 53 | yes | 175 |

TABLE 4-continued

Summary of the catalyst developed for modified WGSR at 400° C.

| | Support | | Catalyst * | Average catalyst activity (mol %) | | | | |
|---|---|---|---|---|---|---|---|---|
| Ex. # | (PKC#) | Media | M(y)N(z)-[$A_xB_{(1-x)}$]$O_2$ | X | S | Y | $CH_4$ | SA |
| 16 | PKC23 | CTAB | Ni(1-3)Cu(1-5)-[$Ce_{0.50}Y_{0.50}$]O | 55 | 92 | 59 | yes | 130 |
| 17 | PKC24 | CTAB | Ni(1-3)Cu(1-5)-[$Y_{0.50}La_{0.50}$]O | 22 | 95 | 19 | no | 101 |
| 18 | PKC25 | P123 | Ni(1-3)Cu(1-5)-[$Ce_{0.50}Zr_{0.50}$]O | 61 | 88 | 54 | yes | 135 |

* x = 1-0.5 at %
y = 0-5 at %
z = 0-5 at %
M = Ni
N = Cu
A = Ce or Y
B = Zr or La
CP = Co-precipitation
WI = Wetness impregnation
$X = X_{CO}$ = (moles of $CO_{in}$ − moles of $CO_{out}$/moles of $CO_{in}$) * 100
$S = S_{H2}$ = ($H_{2\,out}/X_{CO}$ * moles of $CO_{in}$) * 100
$Y = Y_{H2}$ = ($H_{2\,out}$/moles of $CO_{in}$) * 100
$CH_4$ = Methane formation during the reaction condition as established.
SA = Surface area ($m^2/g$) of the support only

TABLE 5

Summary of the activity on WGSR of the bi-functional catalysts at 400° C.

| | | Ni | Cu | Activity Test (mol %) | | | SA |
|---|---|---|---|---|---|---|---|
| Catalyst | Support | At % | At % | X | S | Y | ($m^2/g$) |
| Ni(5)Cu(0)-[$Ce_{0.70}Zr_{0.30}$]$O_2$ | PKC17 | 5 | 0 | 65 | 90 | 56 | 138 |
| Ni(0)Cu(5)-[$Ce_{0.70}Zr_{0.30}$]$O_2$ | PKC17 | 0 | 5 | 53 | 96 | 51 | 123 |
| Ni(5)Cu(1)-[$Ce_{0.70}Zr_{0.30}$]$O_2$ | PKC17 | 5 | 1 | 44 | 95 | 42 | 137 |
| Ni(5)Cu(3)-[$Ce_{0.70}Zr_{0.30}$]$O_2$ | PKC17 | 5 | 3 | 60 | 97 | 59 | 123 |
| Ni(5)Cu(5)-[$Ce_{0.70}Zr_{0.30}$]$O_2$ | PKC17B | 5 | 5 | 60 | 96 | 58 | 118 |
| Ni(1)Cu(5)-[$Ce_{0.70}Zr_{0.30}$]$O_2$ | PKC17B | 1 | 5 | 65 | 97 | 63 | 129 |
| Ni(3)Cu(5)-[$Ce_{0.70}Zr_{0.30}$]$O_2$ | PKC17B | 3 | 5 | 68 | 96 | 66 | 123 |
| Ni(5)Cu(0)-[$Ce_{0.50}Zr_{0.50}$]$O_2$ | PKC21 | 5 | 0 | 73 | 78 | 58 | 187 |
| Ni(3)Cu(5)-[$Ce_{0.50}Zr_{0.50}$]$O_2$ | PKC21 | 3 | 5 | 50 | 88 | 85 | 168 |
| Ni(3)Cu(5)-[$Ce_{0.60}Zr_{0.40}$]$O_2$ | PKC22 | 3 | 5 | 58 | 92 | 53 | 119 |
| Ni(3)Cu(5)-[$Ce_{0.50}Y_{0.50}$]$O_2$ | PKC23 | 3 | 5 | 55* | 92 | 59 | 90 |
| Ni(3)Cu(5)-[$Y_{0.50}La_{0.50}$]$O_2$ | PKC24 | 3 | 5 | 22* | 95 | 19 | 52 |
| Ni(3)Cu(5)-[$Ce_{0.50}Zr_{0.50}$]$O_2$ | PKC25 | 3 | 5 | 61* | 88 | 54 | 75 |

*Activity test carried out at 500° C.

TABLE 6

Summary of the high temperature activity test for WGSR on selected catalysts

| Catalyst | Temperature (° C.) | Average Activity (mol %) | | | $CH_4$ Formation (ppm) |
|---|---|---|---|---|---|
| | | X | S | Y | |
| Ni(5)Cu(0)-[$Ce_{0.68}Zr_{0.32}$]$O_2$ | 400 | 60 | 85 | 50 | 350 |
| Ni(5)Cu(0)-[$Ce_{0.68}Zr_{0.32}$]$O_2$ | 500 | 70 | 65 | 42 | 1750 |
| Ni(0)Cu(5)-[$Ce_{0.70}Zr_{0.30}$]$O_2$ | 400 | 53 | 96 | 51 | 0.0 |
| Ni(0)Cu(5)-[$Ce_{0.70}Zr_{0.30}$]$O_2$ | 500 | 65 | 95 | 52 | 200 |
| Ni(5)Cu(3)-[$Ce_{0.70}Zr_{0.30}$]$O_2$ | 400 | 60 | 97 | 59 | 150 |
| Ni(5)Cu(3)-[$Ce_{0.70}Zr_{0.30}$]$O_2$ | 500 | 90 | 93 | 85 | 700 |
| Ni(5)Cu(3)-[$Ce_{0.70}Zr_{0.30}$]$O_2$ | 600 | 80 | 92 | 75 | 900 |
| Ni(3)Cu(5)-[$Ce_{0.70}Zr_{0.30}$]$O_2$ | 400 | 68 | 96 | 66 | 60 |
| Ni(3)Cu(5)-[$Ce_{0.70}Zr_{0.30}$]$O_2$ | 500 | 85 | 94 | 82 | 640 |
| Ni(3)Cu(5)-[$Ce_{0.70}Zr_{0.30}$]$O_2$ | 600 | 80 | 93 | 77 | 710 |
| Ni(3)Cu(5)-[$Ce_{0.60}Zr_{0.40}$]$O_2$ | 400 | 58 | 92 | 53 | 90 |
| Ni(3)Cu(5)-[$Ce_{0.60}Zr_{0.40}$]$O_2$ | 500 | 81 | 93 | 76 | 310 |
| Ni(3)Cu(5)-[$Ce_{0.60}Zr_{0.40}$]$O_2$ | 600 | 79 | 94 | 75 | 490 |
| Ni(3)Cu(5)-[$Ce_{0.50}Zr_{0.50}$]$O_2$ | 300 | 3.5 | 100 | 3.5 | 0 |
| Ni(3)Cu(5)-[$Ce_{0.50}Zr_{0.50}$]$O_2$ | 400 | 50 | 92 | 46 | 40 |
| Ni(3)Cu(5)-[$Ce_{0.50}Zr_{0.50}$]$O_2$ | 500 | 88 | 94 | 83 | 150 |
| Ni(3)Cu(5)-[$Ce_{0.50}Zr_{0.50}$]$O_2$ | 600 | 85 | 93 | 79 | 180 |
| Ni(3)Cu(5)-[$Ce_{0.50}Zr_{0.50}$]$O_2$ | 650 | 77 | 94 | 72 | 158 |
| Ni(3)Cu(5)-[$Ce_{0.50}Zr_{0.50}$]$O_2$ | 700 | 75 | 94 | 71 | 40 |

TABLE 7

Physicochemical properties of $ZrO_2$ supports and Ni/$ZrO_2$ catalysts

| Support/Catalyst | BET surface areas ($m^2/g$) ±0.5 | Pore diameter (nm) ±0.3 | Pore average volume ($cm^3/g$) ±0.05 |
|---|---|---|---|
| $ZrO_2$ (commercial) | 2.4 | 25.9 | 0.018 |
| $ZrO_2$ (hydrogel) | 38.0 | 7.4 | 0.10 |
| $ZrO_2$ (alcogel) | 56.3 | 12.6 | 0.23 |
| 13 wt % Ni/$ZrO_2$ (hydrogel) | 28.7 | 14.4 | 0.13 |
| 13 wt % Ni/$ZrO_2$ (co-precip.) | 27.9 | 7.5 | 0.10 |
| 13 wt % Ni/$ZrO_2$ (alcogel) | 33.0 | 16.6 | 0.17 |

TABLE 7-continued

Physicochemical properties of $ZrO_2$ supports and $Ni/ZrO_2$ catalysts

| Support/Catalyst | BET surface areas ($m^2/g$) ±0.5 | Pore diameter (nm) ±0.3 | Pore average volume ($cm^3/g$) ±0.05 |
|---|---|---|---|
| 20 wt % $Ni/ZrO_2$ (alcogel) | 27.9 | 19.9 | 0.17 |
| 7 wt % $Ni/ZrO_2$ (alcogel) | 36.0 | 16.7 | 0.19 |
| 5 wt % $Ni/ZrO_2$ (alcogel) | 37.62 | 17.3 | 0.19 |

TABLE 8

Physicochemical properties of $ZrO_2$ (alcogel), 5 wt % $Ni/ZrO_2$ (alcogel), $CeO_2$ (CTAB) and their catalysts

| Support/Catalysts | BET surface area ($m^2/g$) ±0.5 | Pore average volume ($cm^3/g$) ±0.05 | Pore diameters (nm) ±0.3 |
|---|---|---|---|
| $ZrO_2$ (alcogel) | 56.3 | 0.23 | 12.6 |
| 3.8 mol % $CeO_2$—$ZrO_2$ (alcogel) | 60.3 | 0.24 | 12.2 |
| $CeO_2$ (CTAB) | 164.0 | 0.60 | 11.8 |
| 5 wt % $Ni/ZrO_2$ (alcogel) | 37.6 | 0.19 | 17.3 |
| 5 wt % Ni/3.8 mol. % $CeO_2$—$ZrO_2$ (alcogel) | 44.7 | 0.21 | 14.7 |
| 5 wt % $Ni/CeO_2$ (CTAB) | 158 | 0.50 | 11.1 |

TABLE 9

Physicochemical properties of $Ce_xZr_{1-x}O_2$ and $Ni/Ce_xZr_{1-x}O_2$ catalysts

| Support/Catalyst | Synthesis method of support | BET surface area ($m^2/g$) ±0.5 | Pore average volume ($cm^3/g$) | Pore diameters (nm) ±0.3 |
|---|---|---|---|---|
| $Ce_{0.50}Zr_{0.50}O_2$—AL | Sol-gel (alcogel) | 36.9 | 0.07 | 4.1 |
| $Ce_{0.60}Zr_{0.40}O_2$—AL | | 99.0 | 0.17 | 4.8 |
| $Ce_{0.85}Zr_{0.15}O_2$—AL | | 110.4 | 0.31 | 8.7 |
| *5 wt. % Ni/$Ce_{0.50}Zr_{0.50}O_2$—AL | | 8.90 | 0.03 | 7.77 |
| *5 wt. % Ni/$Ce_{0.60}Zr_{0.40}O_2$—AL | | 36.5 | 0.14 | 11.8 |
| *5 wt. % Ni/$Ce_{0.85}Zr_{0.15}O_2$—AL | | 68.9 | 0.24 | 10.8 |
| $Ce_{0.40}Zr_{0.60}O_2$ | CTAB | 216.5 | 0.23 | 3.4 |
| $Ce_{0.50}Zr_{0.50}O_2$ | | 206.8 | 0.23 | 3.5 |
| $Ce_{0.60}Zr_{0.40}O_2$ | | 149.5 | 0.23 | 4.5 |
| $Ce_{0.68}Zr_{0.32}O_2$ | | 189.6 | 0.24 | 3.9 |
| $Ce_{0.78}Zr_{0.22}O_2$ | | 154.0 | 0.24 | 4.7 |
| $Ce_{0.85}Zr_{0.15}O_2$ | | 159.8 | 0.28 | 5.3 |
| $Ce_{0.92}Zr_{0.02}O_2$ | | 139.0 | 0.24 | 5.1 |
| *5 wt. % Ni/$Ce_{0.40}Zr_{0.60}O_2$ | | 168.2 | 0.19 | 3.5 |
| *5 wt. % Ni/$Ce_{0.50}Zr_{0.50}O_2$ | | 154.3 | 0.19 | 3.8 |
| *5 wt. % Ni/$Ce_{0.60}Zr_{0.40}O_2$ | | 115.8 | 0.19 | 5.0 |
| *5 wt. % Ni/$Ce_{0.68}Zr_{0.32}O_2$ | | 145.3 | 0.19 | 4.1 |
| *5 wt. % Ni/$Ce_{0.78}Zr_{0.22}O_2$ | | 109.8 | 0.2 | 5.5 |
| *5 wt. % Ni/$Ce_{0.85}Zr_{0.15}O_2$ | | 129.8 | 0.22 | 5.4 |
| *5 wt. % Ni/$Ce_{0.92}Zr_{0.02}O_2$ | | 86.9 | 0.17 | 5.6 |

*Ni was incorporated into support by impregnation.

TABLE 10

Comparison of catalytic activity of $Ni/Ce_xZr_{1-x}O_2$ catalysts after 5 h $CO_2$ reforming reaction at 700° C. and their physicochemical properties

| 5 wt. % Ni/ $Ce_xZr_{1-x}O_2$ | Ni dispersion (%) | $CH_4$ conv. (%) | $H_2$ yield (%) | $H_2$ sel. (%) | BET surface areas $m^2/g$ | Catalyst stability |
|---|---|---|---|---|---|---|
| X = 0.85 (CTAB) | 1.99 | 62.93 | 56.72 | 90.12 | 129.8 | High |
| X = 0.85 (alcogel) | 1.53 | 58.83 | 53.32 | 90.63 | 68.9 | Low |
| X = 0.60 (CTAB) | 1.86 | 63.04 | 57.89 | 91.83 | 136.1 | High |
| X = 0.60 (aclgoel) | 1.35 | 63.22 | 58.01 | 91.76 | 36.5 | High |
| X = 0.50 (CTAB) | 2.77 | 61.26 | 55.39 | 90.41 | 154.3 | High |
| X = 0.50 (alcogel) | 0.90 | 49.41 | 44.93 | 90.94 | 8.9 | Lowest |

TABLE 11

Comparison of activity of 5 wt % Ni based catalysts for CDR at reaction time = 5 h

| Catalysts | $CH_4$ conv. (%) | $H_2$ yield (%) | $H_2$ sel. (%) |
|---|---|---|---|
| *5 wt. % $Ni/ZrO_2$ (alcogel) | 57.6 | 55.3 | 96.0 |
| *5 wt. % Ni/3.8 mol. % $CeO_2$—$ZrO_2$ (alcogel) | 66.7 | 62.4 | 93.6 |
| *5 wt. %/Ni/$Ce_{0.50}Zr_{0.50}O_2$ (alcogel) | 49.4 | 44.9 | 90.9 |
| 5 wt. % Ni/$Ce_{0.60}Zr_{0.40}O_2$ (alcogel) | 63.2 | 58.0 | 91.8 |
| 5 wt. % Ni/$Ce_{0.85}Zr_{0.15}O_2$ (alcogel) | 58.8 | 53.3 | 90.6 |
| *5 wt. % Ni/$Ce_{0.40}Zr_{0.60}O_2$ (CTAB) | 59.0 | 53.1 | 89.9 |
| 5 wt. % Ni/$Ce_{0.50}Zr_{0.50}O_2$ (CTAB) | 61.3 | 55.4 | 90.4 |
| 5 wt. % Ni/$Ce_{0.60}Zr_{0.40}O_2$ (CTAB) | 63.1 | 57.9 | 91.8 |
| 5 wt. % Ni/$Ce_{0.68}Zr_{0.32}O_2$ (CTAB) | 61.2 | 55.2 | 90.2 |
| 5 wt. % Ni/$Ce_{0.78}Zr_{0.22}O_2$ (CTAB) | 61.0 | 54.3 | 89.2 |
| 5 wt. % Ni/$Ce_{0.85}Zr_{0.15}O_2$ (CTAB) | 62.9 | 56.7 | 90.2 |
| 5 wt. % Ni/$Ce_{0.92}Zr_{0.08}O_2$ (CTAB) | 62.4 | 58.6 | 93.9 |
| *5 wt. % $Ni/CeO_2$ (CTAB) | 66.3 | 47.9 | 71.3 |

FULL CITATIONS FOR REFERENCES REFERRED TO IN THE SPECIFICATION

1. S. Wang, G. Q. Lu. *Energy Fuel*, 1998, 12, 248.
2. J-M. Wei, B.-Q. X., J.-L. Li, Z.-X. Cheng, Q.-M. Zhu. *Appl. Cataly. A: General* 2000, 196, L167.
3. K. Tomishige, O. Y., Y. Chen, K. Yokoyama, X. Li, K. Fujimoto. *Catal. Today* 1998, 45, 35.
4. T. Osaki, *J. Chem. Soc., Faraday Trans.*, 1997, 93, 343.
5. J. A. C. Dias, J. M. Assaf, *Catal. Today* 2003, 85, 59.
6. H. S. Roh, H. S. Potdar, K. W. Jun, *Catal. Today* 2004, 93-95, 39.
7. H. S. Potdar, H. S. Potdar, K. W. Jun, M. Ji, Z. W. Liu. *Catal. Lett.* 2002, 84, 95.
8. H.-S. Roh, K.-W. Jun, S.-C. Baek, S.-E. Park. *Catal. Lett.* 2002, 81, 14
9. Z. Xu, Y. Li, J. Zhang, L. Chang, R. Chang, Z. Duan *Appl. Catal. A: General* 2001, 213, 65.
10. R. Martinez, E. Romero, C. Guimon, R. Bilbao *Appl. Catal. A: General* 2004, 274, 139.
11. S-H, Seok, S-H. Choi, E-D. Park, S-H. Han, J-S. Lee, *J. Catal.* 2002, 209, 6.
12. F. Frusteri, F. Arena, G. Calogero, T. Torre, A. Parmaliana, *Catal. Comm.* 2001, 2, 49.
13. Z. Hao, H. Y. Zhu, G. Q. Lu *Appl. Catal. A: General* 2003, 242, 275.
14. S. Wang, G. Q. Lu, *Applied Catalysis B: Environmental* 1998, 19, 267.
15. F. B. Noronha, A. Shamsi, C. Taylor, E. C. Fendley, S. Stagg-William, D. E. Resasco *Catal. Lett.* 2003, 90, 13.
16. K. Nagaoka, K. Seshan, K. Aika, J. A. Lercher *J. Catal.* 2001, 197, 34.
17. L. Wang, K. Murata, M. Inaba *Catal. Comm.* 2003, 4, 147.
18. D. S. Newsome, *Catal. Rev. Sci. Eng.*, 1980, 21, 275.
19. Z. D. Ziaka & S. Vasileiadis, U.S. Pat. No. 6,090,312 (2000).
20. S. Hilaire, X. Wang, T. Luo, R. J. Gorte & J. Wagner, *Appl. Catal. A: General*, 2001, 215, 271.
21. Y. Li, Q. Fu, M. Flytzani-Stephanopoulos, *Appl. Catal. B: Environmental*, 2000, 27, 179.
22. T. Zhu, M. Flytzani-Stephanopoulous, *Appl. Catal. A: General*, 2001, 208, 403.
23. X. Qi, M. Flytzani-Stephanopoulos, *Ind. Eng. Chem. Res.* 2004, 43(12), 3055.
24. T. Bunluesin, R. J. Gorte, G. W. Graham, *Appl. Catal. B: Environmental*, 1998, 15, 107.
25. Y. Tanaka, T. Utaka, R. Kikuchi, T. Takeguchi, K. Sasaki, K. Eguchi, *J. Catal*, 2003, 215, 271.
26. J. M. Zalc, V. Sokolovskii, D. G. Loffler, J. Catal., 2002, 206, 169.
27. X. Wang, R. J. Gorte, J. P. Wagner, *J. Catal.*, 2002, 212, 225.G.
28. Jacobs, E. Chenu, P. M. Patterson, L. Williams, D. Sparks, G. Thomas, B. H. Davis, *Appl. Catal. A: General*, 2004, 258, 203.
29. G. Avgouropoulos, T. Ioannides, H. K. Matralis, J. Batista, S. Hocevar, *Catal. Lett.* 2001, 73 (1), 33.
30. G. Avgouropoulos, T Ioannides, *Appl. Catal. A: General*, 2003, 244, 155.
31. J. B. Wang, W. H. Shih, T. J. Huang, *Appl. Catal. A: General*, 2000, 203, 191.
32. S. L. Swartz, M. M. Seabaugh, C. T. Holt & W. J. Dawson, *Fuel Cell Bull.*, 2001, 30, 7.
33. C. E. Hori, A. Brenner, K. Y. Simon, K. M. Rahmoeller, D. Belton, *Cataly. Today*, 1999, 50, 299.
34. M. P. Kappor, A. Raj, Y. Matsumara, *Micro. Mesopo. Mater.* 44-45, (2001) 565.
35. I. Rosso, C. Galletti, G. Sarraco, E. Garronr, V. Specchia, *Appl. Catal. B: Environmental*, 2004, 50, 1.
36. P. Ratnasamy, D. Srinivas, C. V. V. Satyanarayana, P. Manikandam, R. S. S. Kumaran, M. Sachin, V. N. Shetti, *J. Catal.* 2004, 221, 455.
37. N. Y. Usachev, I. A. Gorevya, E. P. Belanova, A. V. Kazakov, O. K. Atalyan, V. V. Kharlmov, *Prepr. Pap.—Am. Chem. Soc., Div. Pet. Chem.*, 2004, 49 (3), 358.
38. T. Osaki, T. Mori. *J. Cata.*, 2001, 204, 89.

What is claimed is:

1. A water gas shift reaction (WGSR) catalyst for the production of hydrogen from an input gas stream comprising $H_2O$ and carbon monoxide comprising a catalytically effective amount of nickel and/or copper, or an oxide thereof, dispersed on a support, wherein the support comprises a mixed bi-metal oxide and the support is prepared using a surfactant templating method.

2. The WGSR catalyst according to claim 1 comprising:
   (a) an oxide support comprising a first oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), and a second oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), wherein the ratio of amount of first oxide to second oxide is in the range of about 50:50 to about 70:30 and the first and second oxides are different; and
   (b) about 1 to about 10 wt % of one or more metals, or oxides thereof, dispersed on the oxide support, wherein the one or more metals are selected from the group consisting of copper, nickel and mixtures thereof, wherein the support is prepared using a surfactant templating method.

3. The catalyst according to claim 2, wherein the first oxide is selected from the group consisting of zeolites and oxides of cerium (Ce), silicon (Si), thorium (Th), magnesium (Mg), yttrium (Y), lanthanum (La), zirconium (Zr) and aluminum (Al), and the second oxide is selected from selected from the group consisting of zeolites and oxides of cerium (Ce), silicon (Si), thorium (Th), magnesium (Mg), yttrium (Y), lanthanum (La), zirconium (Zr) and aluminum.

4. The catalyst according to claim 3, wherein the oxide support comprises $CeO_2$ (ceria) as the first oxide, and $ZrO_2$ (zirconia) as the second oxide.

5. The catalyst according to claim 1, comprising both copper and nickel, each being present in an amount in the range of from about 1 to about 5 wt %.

6. The catalyst according to claim 5, wherein the copper and nickel are present in an amount in the range of from about 3 to about 5 wt %.

7. The catalyst according to claim 1, represented by the formula $Ni_yCu_z[A_xB_{(1-x)}]O_2$, wherein x is in the range of about 0.5 to about 0.7, y and z represent the weight percent of Ni and Cu, respectively, and are each, independently, in the range of about 1 to about 5% and A and B are independently selected from the group consisting of Ce, Si, Th, Mg, Y, La, Zr, Al, Ti, Hf, Nb, Ta, Pr, Nd, Sm, Eu, Gd, Tb, Dy, Ho, Er, Tm, Yb, Lu, Mo, W, Re, Rh, Sb, Bi, Mn, Ga, Sr and Ba, with the proviso that A does not equal B.

8. The catalyst according to claim 7, wherein y and z are each, independently, in the range of about 3 to about 5, x is about 0.5 and A is Ce and B is Zr.

9. The catalyst according to claim 7, wherein A and B are present in a ratio A:B in the range of about 70:30 to about 50:50.

10. The catalyst according to claim 9, wherein the A:B ratio is about 60:40 to about 50:50.

11. The catalyst according to claim 1, represented by a formula selected from the group consisting of:

$Ni(3)Cu(5)[Ce_{0.70}Zr_{0.30}]O_2$;

$Ni(5)Cu(3)[Ce_{0.70}Zr_{0.30}]O_2$;

$Ni(3)Cu(5)[Ce_{0.50}Zr_{0.50}]O_2$; and $Ni(5)Cu(3)[Ce_{0.50}Zr_{0.50}]O_2$.

12. The catalyst according to claim 11, which is $Ni(3)Cu(5)[Ce_{0.50}Zr_{0.50}]O_2$.

13. The catalyst according to claim 1, in a form selected from the group consisting of tablet, extrudate, pellet, bead, cylinder, hollow cylinder, powder, washcoat composition deposited on monolith substrate, high mechanical strength particulate and high heat capacity particulate.

14. A reactor comprising a catalyst according to claim 1.

15. The reactor according to claim 14, comprising a reactor inlet, a reaction chamber and a reactor exhaust outlet.

16. A method of preparing a WGSR catalyst according to claim 1 comprising (a) preparing a mixed bi-metal oxide support using a surfactant templating method; and (b) dispersing a catalytically effective amount of nickel and/or copper, or an oxide thereof, on the support.

17. The method according to claim 16, further comprising step (c) in which the WGSR catalyst is shaped into a form.

18. The method according to claim 17, wherein the form of the WGSR catalyst is selected from the group consisting of tablet, extrudate, pellet, bead, cylinder, hollow cylinder, powder, washcoat composition deposited on monolith substrate, high mechanical strength particulate and high heat capacity particulate.

19. The method according to claim 16, wherein the surfactant templating method in (a) comprises:
(i) combining aqueous solutions of metal oxide precursors, with an aqueous solution of at least one surfactant;
(ii) stirring the combination;
(iii) adding a base to adjust the pH of the combined solutions to about 10 to about 13 to produce a slurry comprising precipitated support;
(iv) allowing said slurry to sit at elevated temperatures;
(v) isolating the precipitated support from the slurry; and
(vi) optionally washing said isolated support to remove residual solvent.

20. The method according to claim 19, wherein the combined solution is mixed at room temperature.

21. The method according to claim 20, wherein the combined solution is mixed for about 60 to 120 minutes.

22. The method according to claim 19, wherein the base is ammonia.

23. The method according to claim 19, wherein the pH of the combined solution is adjusted to about 11 to about 12.

24. The method according to claim 19, wherein the precipitate is separated from the slurry by filtration.

25. The method according to claim 19, wherein the slurry is heated to elevated temperatures of about 80 to 100° C. in (iv).

26. The method according to claim 19, wherein the slurry is heated for about 1 to 10 days in (iv).

27. The method according to claim 19, wherein the pH of the slurry is readjusted by the addition of a further amount of a base after (iv).

28. The method according to claim 19, wherein the slurry is cooled prior to isolation of the support in (v).

29. The method according to claim 19, wherein the surfactant is an oligomeric surfactant or a tetraalkyl ammonium salt.

30. The method according to claim 29, wherein the oligomeric surfactant is a co-polymer of the formula $(EO)_a$—$(PO)_b$-$(EO)_c$, in which EO is a hydrophilic polyethylene oxide block and PO is a polypropylene oxide block (EO), and wherein a, b, and c are independently selected from integers between 1 to 100.

31. The method according to claim 30, wherein the molar ratio of metal oxide precursors to the oligomeric surfactant is about 2.5 to 3.0.

32. The method according to claim 29, wherein the tetraalkyl ammonium salt is selected from alkyltrimethyl ammonium chloride, alkyltrimethyl bromide and alkyltrimethyl ammonium hydroxide.

33. The method according to claim 32, wherein the alkyl group has six to eighteen carbon atoms.

34. The method according to claim 32, wherein the molar ratio of metal oxide precursors to the tetraalkylammonium salt is about 0.7 to 0.9.

35. The method according to claim 16, wherein the dispersion of the nickel and/or copper on the mixed bi-metal support is done using incipient impregnation, deposition-precipitation, decantation or co-precipitation.

36. A process for producing hydrogen, comprising contacting an input gas stream comprising $H_2O$ and carbon monoxide with a WGSR catalyst above 300° C., wherein the WGSR catalyst is a catalyst according to claim 1.

37. The process according to claim 36, wherein the input gas stream further comprises $CO_2$, $H_2$ and a hydrocarbon fuel.

38. The process according to claim 37, wherein the input gas stream is contacted with a WGSR catalyst at a temperature between about 300° C. and about 700° C.

39. A carbon dioxide reforming (CDR) catalyst for the production of hydrogen from an input gas stream comprising a hydrocarbon fuel and carbon dioxide comprising a catalytically effective amount of nickel, or an oxide thereof, dispersed on a support, wherein the support comprises a mixed bi-metal oxide and the support is prepared using a surfactant templating method.

40. The carbon dioxide reforming (CDR) catalyst according to claim 39 comprising:
(a) an oxide support comprising a first oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafnium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), and a second oxide selected from the group consisting of zeolites and oxides of cerium (Ce), silicon (Si), thorium (Th), magnesium (Mg), yttrium (Y), lanthanum (La), zirconium (Zr), aluminum (Al), titanium (Ti), hafium (Hf), niobium (Nb), tantalum (Ta), praseodymium (Pr), neodymium (Nd), samarium (Sm), europium (Eu), gadolinium (Gd), terbium (Tb), dysprosium (Dy), holium (Ho), erbium (Er), thulium (Tm), ytterbium (Yb), lutetium (Lu), molybdenum (Mo), tungsten (W), rhenium (Re), rhodium (Rh), antimony (Sb), bismuth (Bi), manganese (Mn), gallium (Ga), strontium (Sr) and barium (Ba), wherein the ratio of amount of first oxide to second oxide is in the range of about 95:5 to about 50:50 and the first and second oxides are different; and (b) about 1 to about 5 wt % of nickel, or an oxide thereof, dispersed on the oxide support;

wherein the support is prepared using a surfactant templating method.

41. The catalyst according to claim 40, wherein the first oxide is selected from the group consisting of zeolites and oxides of cerium (Ce), silicon (Si), thorium (Th), magnesium (Mg), yttrium (Y), lanthanum (La), zirconium (Zr) and aluminum (Al), and the second oxide is selected from the group consisting of zeolites and oxides of cerium (Ce), silicon (Si), thorium (Th), magnesium (Mg), yttrium (Y), lanthanum (La), zirconium (Zr) and aluminum.

42. The catalyst according to claim 41, wherein the first oxide is an oxide of cerium and the second oxide is an oxide of zirconium.

43. The catalyst according to claim 39, comprising about 5 wt % nickel.

44. The catalyst according to claim 39, further comprising 0 to about 1 wt % of an alkali metal, or an oxide thereof.

45. The catalyst according to claim 44, wherein the alkali metal is selected from the group consisting of potassium, cesium and sodium.

46. The catalyst according to claim 44, represented by the formula $Ni-M[A_xB_{(1-x)}]O_2$, wherein M is an alkali metal in an amount of 0 to about 1 wt %, x is in the range of about 0.5 to about 0.9, and A and B are independently selected from the group consisting of Ce, Si, Th, Mg, Y, La, Zr, Al, Ti, Hf, Nb, Ta, Pr, Nd, Sm, Eu, Gd, Tb, Dy, Ho, Er, Tm, Yb, Lu, Mo, W, Re, Rh, Sb, Bi, Mn, Ga, Sr and Ba, with the proviso that A does not equal B.

47. The catalyst according to claim 46, wherein M is in an amount of 0 wt %, x is about 0.6 and A is Ce and B is Zr.

48. The catalyst according to claim 46, wherein A and B are present in a ratio A:B in a range of about 90:10 to about 50:50.

49. The catalyst according to claim 48, wherein the A:B ratio is about 92:8 to about 60:40.

50. The catalyst according to claim 39, represented by a formula selected from the group consisting of:

$Ni[Ce_{0.50}Zr_{0.50}]O_2$;

$Ni[Ce_{0.60}Zr_{0.40}]O_2$;

$Ni[Ce_{0.68}Zr_{0.32}]O_2$;

$Ni[Ce_{0.78}Zr_{0.22}]O_2$;

$Ni[Ce_{0.85}Zr_{0.15}]O_2$; and $Ni[Ce_{0.92}Zr_{0.08}]O_2$.

51. The catalyst according to claim 50 which is $Ni[Ce_{0.60}Zr_{0.40}]O_2$.

52. The catalyst according to claim 39, wherein the catalyst is stable at a gas hourly space velocity (GHSV) of equal or less than 91200 ml/(h·g-cat) at 600° C., 121200 ml/(h·g-cat) at 650° C., and 302400 ml/(h·g-cat) at 700° C.

53. The catalyst according to claim 39, in a form selected from the group consisting of tablet, extrudate, pellet, bead, cylinder, hollow cylinder, powder, washcoat composition deposited on monolith substrate, high mechanical strength particulate and high heat capacity particulate.

54. A reactor comprising a catalyst according to claim 39.

55. The reactor according to claim 54, comprising a reactor inlet, a reaction chamber and a reactor exhaust outlet.

56. A method of preparing a CDR catalyst according to claim 39 comprising (a) preparing a mixed bi-metal oxide support using a surfactant templating method; and (b) dispersing a catalytically effective amount of nickel and/or copper, or an oxide thereof, on the support.

57. The method according to claim 56, further comprising step (c) in which the CDR catalyst is shaped into a form.

58. The method according to claim 57, wherein the form of the CDR catalyst is selected from the group consisting of tablet, extrudate, pellet, bead, cylinder, hollow cylinder, powder, washcoat composition deposited on monolith substrate, high mechanical strength particulate and high heat capacity particulate.

59. The method according to claim 56, wherein the surfactant templating method in (a) comprises:

(i) combining aqueous solutions of metal oxide precursors, with an aqueous solution of at least one surfactant;

(ii) stirring the combination;

(iii) adding a base to adjust the pH of the combined solutions to about 10 to about 13 to produce a slurry comprising precipitated support;

(iv) allowing said slurry to sit at elevated temperatures;

(v) isolating the precipitated support from the slurry; and (vi) optionally washing said isolated support to remove residual solvent.

60. The method according to claim 59, wherein the combined solution is mixed at room temperature.

61. The method according to claim 60, wherein the combined solution is mixed for about 60 to 120 minutes.

62. The method according to claim 59, wherein the base is ammonia.

63. The method according to claim 59, wherein the pH of the combined solution is adjusted to about 11 to about 12.

64. The method according to claim 59, wherein the precipitate is separated from the slurry by filtration.

65. The method according to claim 59, wherein the slurry is heated to elevated temperatures of about 80 to 100° C. in (iv).

66. The method according to claim 59, wherein the slurry is heated for about 1 to 10 days in (iv).

67. The method according to claim 59, wherein the pH of the slurry is readjusted by the addition of a further amount of a base after (iv).

68. The method according to claim 59, wherein the slurry is cooled prior to isolation of the support in (v).

69. The method according to claim 59, wherein the surfactant is an oligomeric surfactant or a tetraalkyl ammonium salt.

70. The method according to claim 69, wherein the oligomeric surfactant is a co-polymer of the formula $(EO)_a—(PO)_b-(EO)_c$, in which EO is a hydrophilic polyethylene oxide block and PO is a polypropylene oxide block (EO), and wherein a, b, and c are independently selected from integers between 1 to 100.

71. The method according to claim 70, wherein the molar ratio of metal oxide precursors to the oligomeric surfactant is about 2.5 to 3.0.

72. The method according to claim 69, wherein the tetraalkyl ammonium salt is selected from alkyltrimethyl ammonium chloride, alkyltrimethyl bromide and alkyltrimethyl ammonium hydroxide.

73. The method according to claim 72, wherein the alkyl group has six to eighteen carbon atoms.

74. The method according to claim 72, wherein the molar ratio of metal oxide precursors to the tetraalkylammonium salt is about 0.7 to 0.9.

75. The method according to claim 56, wherein the dispersion of the nickel and/or copper on the mixed bi-metal support is done using incipient impregnation, deposition-precipitation, decantation or co-precipitation.

76. A process for producing hydrogen, comprising contacting an input gas stream comprising a hydrocarbon fuel and carbon dioxide with a carbon dioxide reforming (CDR) catalyst at a temperature between 550 and 700° C., wherein the CDR catalyst is a catalyst according to claim 39.

77. The process according to claim 76, wherein when the hydrocarbon fuel is natural gas, the hydrocarbon fuel and carbon dioxide are in a molar ratio of about 1:1.

78. A process for producing hydrogen, comprising:

contacting a first input gas stream comprising a hydrocarbon fuel and carbon dioxide with a CDR catalyst at a temperature between 550 and 700° C. to produce a first output stream comprising carbon monoxide and hydrogen, wherein the CDR catalyst comprises a catalytically effective amount of nickel, or an oxide thereof, dispersed on a support, wherein the support comprises a mixed bi-metal oxide and the support is prepared using a surfactant templating method; and subsequently contacting the first output gas stream with a WGSR catalyst in the presence of $H_2O$ at a temperature above 300° C. to produce a second output stream comprising carbon dioxide and hydrogen, comprises a catalytically effective amount of nickel and/or copper, or an oxide thereof, dispersed on a support, wherein the support comprises a mixed bi-metal oxide and the support is prepared using a surfactant templating method.

79. The process according to claim 78, wherein the second output stream is contacted with a carbon monoxide oxidant.

* * * * *

UNITED STATES PATENT AND TRADEMARK OFFICE
CERTIFICATE OF CORRECTION

| | | |
|---|---|---|
| PATENT NO. | : 7,824,656 B2 | Page 1 of 1 |
| APPLICATION NO. | : 11/375088 | |
| DATED | : November 2, 2010 | |
| INVENTOR(S) | : Idem et al. | |

It is certified that error appears in the above-identified patent and that said Letters Patent is hereby corrected as shown below:

In claim 3 at column 50, line 55, change "is selected from selected from the" to --is selected from the--.

In claim 3 at column 50, line 58, insert --(Al)-- after --aluminum--.

In claim 25 at column 52, line 8, change "100° C. in" to --100 °C in--.

In claim 36 at column 52, line 43, change "300° C.," to --300 °C,--.

In claim 38 at column 52, line 49, change "300° C. and" to --300 °C and--.

In claim 41 at column 53, line 29, insert --(Al)-- after --aluminum--.

In claim 52 at column 54, lines 5 to 6, change "at 600° C., 121200 ml/(h.g-cat) at 650° C.," to --at 600 °C, 121200 ml/(h.g-cat) at 650 °C,--.

In claim 65 at column 54, line 51, change "100° C. in" to --100 °C in--.

In claim 76 at column 55, line 20, change "700° C.," to --700 °C,--.

In claim 78 at column 56, line 4, change "700° C." to --700 °C--, and at line 14, change "300° C." to --300 °C--.

Signed and Sealed this
Fifteenth Day of March, 2011

David J. Kappos
*Director of the United States Patent and Trademark Office*